(12) United States Patent
Aoki et al.

(10) Patent No.: US 8,106,622 B2
(45) Date of Patent: Jan. 31, 2012

(54) CONTROL SYSTEM FOR MULTIPHASE ROTARY MACHINES

(75) Inventors: Yasuaki Aoki, Kariya (JP); Hideji Yoshida, Hashima (JP)

(73) Assignee: Denso Corporation, Kariya (JP)

( * ) Notice: Subject to any disclaimer, the term of this patent is extended or adjusted under 35 U.S.C. 154(b) by 816 days.

(21) Appl. No.: 12/078,804

(22) Filed: Apr. 4, 2008

(65) Prior Publication Data
US 2008/0246426 A1 Oct. 9, 2008

(30) Foreign Application Priority Data

Apr. 5, 2007 (JP) .................................. 2007-099163
Nov. 28, 2007 (JP) .................................. 2007-307309

(51) Int. Cl.
*H02P 27/00* (2006.01)
(52) U.S. Cl. ........ 318/812; 318/445; 318/461; 318/466; 318/474; 318/494; 318/495; 318/496; 318/727; 318/767
(58) Field of Classification Search .................. 318/461, 318/466, 474, 496, 812, 445, 494, 495, 727, 318/767
See application file for complete search history.

(56) References Cited

U.S. PATENT DOCUMENTS

| | | | | |
|---|---|---|---|---|
| 4,449,087 A | * | 5/1984 | Lippitt et al. | 318/723 |
| 4,562,396 A | * | 12/1985 | Espelage et al. | 318/809 |
| 4,996,470 A | * | 2/1991 | Rowan et al. | 318/772 |
| 5,451,846 A | * | 9/1995 | Peterson et al. | 318/400.32 |
| 5,663,627 A | * | 9/1997 | Ogawa | 318/803 |
| 6,121,736 A | * | 9/2000 | Narazaki et al. | 318/400.35 |
| 6,281,656 B1 | | 8/2001 | Masaki et al. | |
| 6,456,030 B1 | | 9/2002 | Masaki et al. | |
| 6,828,751 B2 | * | 12/2004 | Sadasivam et al. | 318/729 |
| 2006/0208688 A1 | * | 9/2006 | Hsieh et al. | 318/807 |

FOREIGN PATENT DOCUMENTS

| | | | |
|---|---|---|---|
| JP | 2000-175485 | | 9/1999 |
| JP | 2004289971 A | * | 10/2004 |
| JP | 2005-102350 | | 4/2005 |

OTHER PUBLICATIONS

Machine translation of JP2004289971A.*
Machine translation of JP2005102350A.*

* cited by examiner

*Primary Examiner* — Walter Benson
*Assistant Examiner* — Kawing Chan
(74) *Attorney, Agent, or Firm* — Nixon & Vanderhye P.C.

(57) ABSTRACT

A control system aims at converting, via a switching circuit, a direct current voltage into an alternating current voltage to be applied to multiphase windings of a multiphase rotary machine to thereby control rotation of the multiphase rotary machine. In the control system, a command voltage determiner determines a command voltage value for an alternating current voltage to be applied to the multiphase windings based on a zero crossing of a line-to-line current and a zero crossing of the amount of change in the line-to-line current. A driving unit drives the switching circuit on and off based on the determined command voltage value to thereby modulate the direct current voltage to the alternating current voltage to be applied to the multiphase windings.

24 Claims, 39 Drawing Sheets

FIG.3
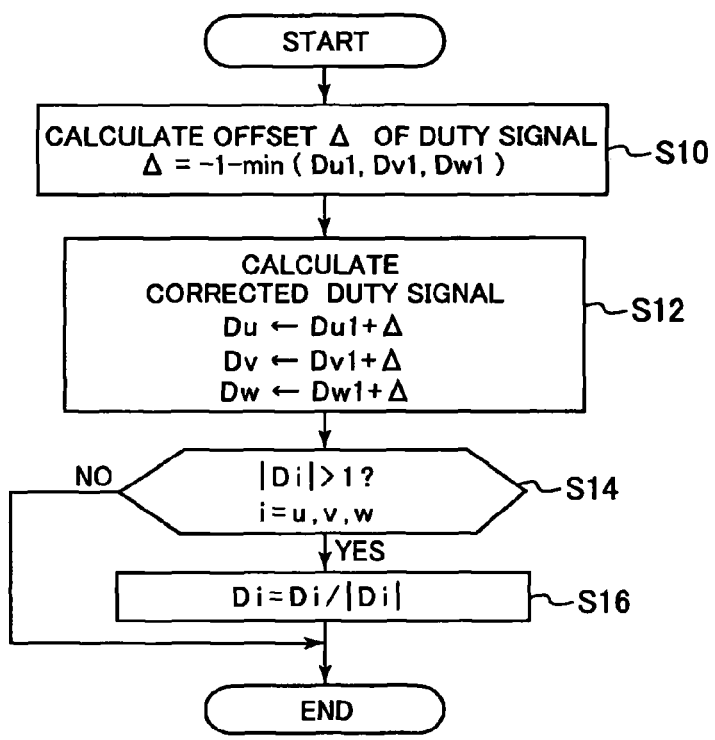
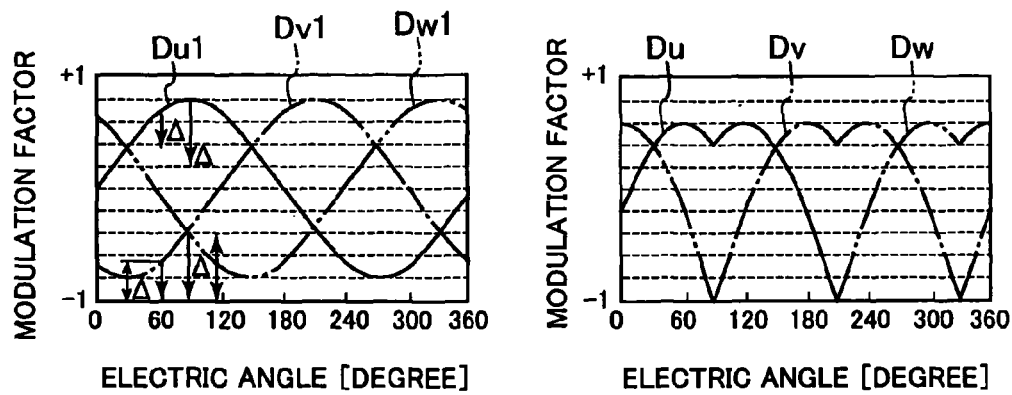

(a) CARRIER SIGNAL (b) CALCULATION TIMING OF Vuc, Vvc, and Vwc (a) CARRIER SIGNAL (b) gun (c) gvn (d) gwn

| VOLTAGE VECTOR | SWITCHING ELEMENT IN ON | | |
|---|---|---|---|
| | U PHASE | V PHASE | W PHASE |
| V0 | L | L | L |
| V1 | H | L | L |
| V2 | H | H | L |
| V3 | L | H | L |
| V4 | L | H | H |
| V5 | L | L | H |
| V6 | H | L | H |
| V7 | H | H | H |

V-W LINE-TO-LINE CURRENT DETECTION

W-U LINE-TO-LINE CURRENT DETECTION

U-V LINE-TO-LINE CURRENT DETECTION

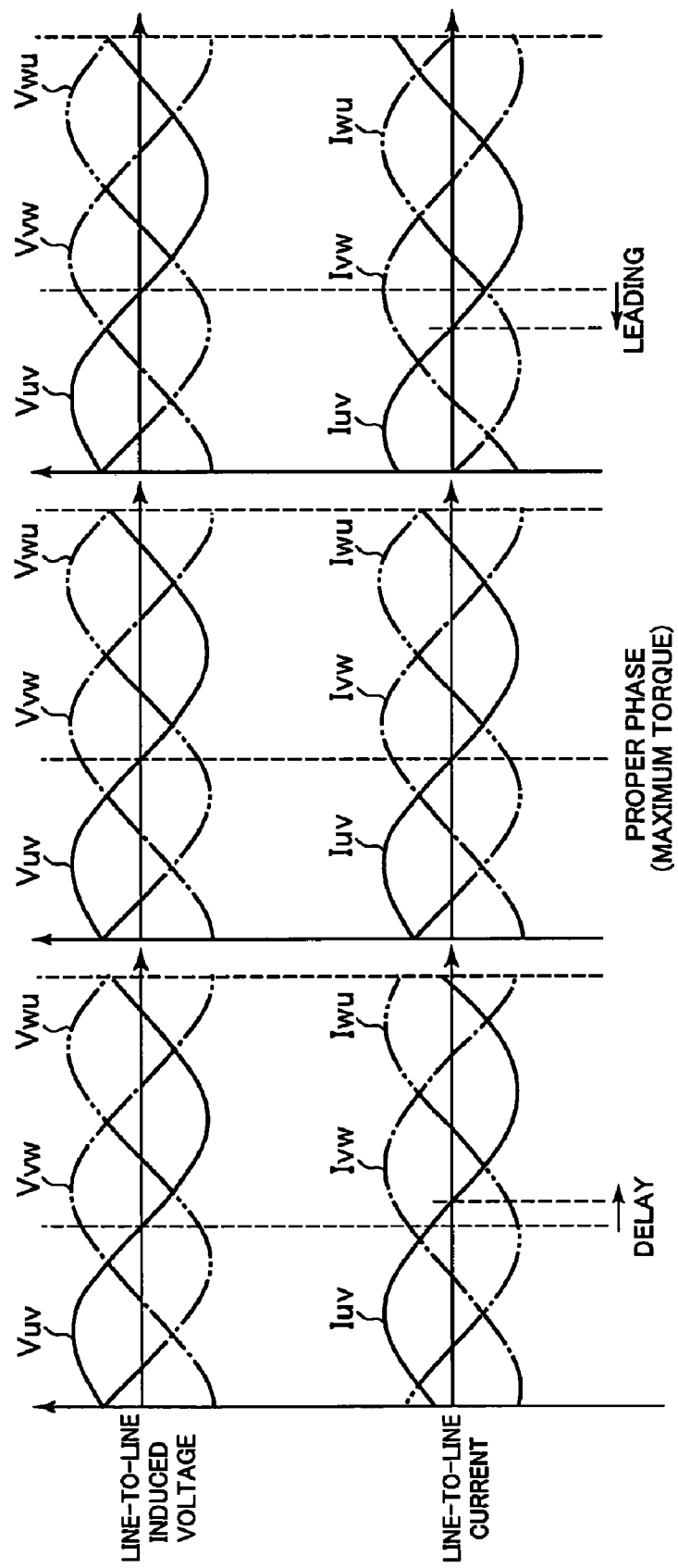

CONTROL SYSTEM FOR MULTIPHASE ROTARY MACHINES

CROSS REFERENCE TO RELATED APPLICATIONS

This application is based on Japanese Patent Applications 2007-99163 and 2007-307309 filed on Apr. 5, 2007 and Nov. 28, 2007, respectively. This application claims the benefit of priority from the Japanese Patent Applications, so that the descriptions of which are all incorporated herein by reference.

FIELD OF THE INVENTION

The present invention relates to control systems for multiphase rotary machines, which are designed to control rotation of a rotor of a multiphase rotary machine without using sensors for measuring rotational positions of the rotor.

BACKGROUND OF THE INVENTION

Conventional control systems for multiphase rotary electric machines are designed to drive a plurality of switching elements connected to a multiphase rotary electric machine as a controlled object to thereby control rotation of the multiphase rotary electric machine.

One example of such conventional control systems is disclosed in Japanese Patent Application Publication No. 2005-102350.

A control system for a three-phase rotary electric machine disclosed in the Japanese Patent Application Publication is designed to drive a pair of high and low side switching elements for each phase winding of the machine to output a sinusoidal PWM (Pulse Width Modulated) voltage to be applied to each of the three-phase windings. This allows torque to be created in the three-phase windings with little ripples.

The control system of the patent application Publication focuses on the fact:

When the low side switching elements are all on, the three-phase windings are short-circuited to a negative terminal of a battery. In this state, an induced voltage in one phase winding of the three-phase rotary electric machine at a timing when a phase current to flow through the one phase winding becomes zero depends on the amount of change in the phase current. A timing of a wave signal changed to become zero will be referred to as "zero crossing" hereinafter.

Specifically, at the zero crossing of the phase current, the zero crossing of the amount of change in the phase current is matched with that of an induced voltage in the one phase winding. The zero crossing of the induced voltage has a predetermined positional relationship with respect to the rotational position of the rotor.

Based on the fact, the control system is designed to:

measure a phase current to flow through each of the three-phase windings when the low side switching elements are all on;

match the zero crossing of the measured phase current to flow through each of the three-phase windings with that of the amount of change in the corresponding phase current; and determine the zero crossing of an induced voltage in one of the three-phase windings based on the zero crossing of the amount of change in the phase current to flow through the one of the three-phase windings to thereby determine rotational positions of the rotor based on the determined zero crossing of the induced voltage.

As described above, the zero crossing of an induced voltage in one of the three-phase windings is associated with rotational positions of the rotor of the three-phase rotary electric machine. For this reason, it is possible for the control system to control rotation of the rotor based on the determined rotational positions of the rotor without using sensors for measuring the rotational positions of the rotor. Such rotation control of a rotor of a multiphase rotary electric machine without using sensors for measuring rotational positions of the rotor will be referred to as "sensorless control" hereinafter.

Another example of such conventional control systems is disclosed in U.S. Pat. No. 6,456,030 corresponding to Japanese Examined Patent Publication No. 3598909.

As set forth above, the control system disclosed in the patent application Publication needs to measure a phase current to flow through each of the three-phase windings only when the low side switching elements are all on. This reduces periods during which the phase current to flow each of the three-phase windings can be measured as a modulation factor of the sinusoidal PWM voltage increases, causing the measurement of the phase current to become difficult. For this reason, the more the modulation factor of the sinusoidal PWM voltage increases, the more the difficulty of performing the sensorless control may increase.

SUMMARY OF THE INVENTION

In view of the background, an object of at least one aspect of the present invention is to provide control systems for a multiphase rotary machine. These control systems are capable of performing the sensorless control with little influence from the modulation factor of a modulated voltage to be applied to each phase winding of the multiphase rotary machine.

According to one aspect of the present invention, there is provided a control system for converting, via a switching circuit, a direct current voltage into an alternating current voltage to be applied to multiphase windings of a multiphase rotary machine to thereby control rotation of the multiphase rotary machine. The control system includes, when at least first and second phase windings of the multiphase windings are short-circuited to a predetermined voltage, a first zero crossing detector configured to detect a zero crossing of an alternating line-to-line current in the multiphase rotary machine. The line-to-line phase current represents a difference between a first phase current flowing through the first phase winding and a second phase current flowing through the second phase winding based on the alternating current voltage. The control system includes a second zero crossing detector configured to detect a zero crossing of an amount of change in the line-to-line current when the at least first and second phase windings of the multi-phase windings are short-circuited to the predetermined potential. The control system includes a command voltage determiner configured to determine a command voltage value for the alternating current voltage to be applied to the multiphase windings based on the detected zero crossing of the line-to-line current and the detected zero crossing of the amount of change in the line-to-line current. The control system includes a driving unit configured to drive the switching circuit on and off based on the determined command voltage value to thereby modulate the direct current voltage to the alternating current voltage to be applied to the multiphase windings.

In the one aspect of the present invention, a line-to-line voltage between the first and second phase windings is represented by the amount of change in the line-to-line current.

For this reason, the zero crossing of the line-to-line current and that of the amount of change in the line-to-line current include information indicative of a relationship between the line-to-line current and the line-to-line voltage. The inventors of this application have focused on the fact set forth above. Specifically, the one aspect of the present invention is to determine the command voltage value for the alternating current voltage to be applied to the multiphase windings based on the detected zero crossing of the line-to-line current and the detected zero crossing of the amount of change in the line-to-line current. This allows control of rotation of the multiphase rotary machine.

In particular, the line-to-line current has a difference in phase with respect to each of the first phase current and the second phase current. For this reason, using the phase difference between the line-to-line current and each of the first and second phase currents can ensure sufficient time required for each of the first and second zero crossing detectors to detect the corresponding zero closing. For this reason, it is possible to reliably control rotation of the multiphase rotary machine independently of the modulation factor.

According to another aspect of the present invention, there is provided a control system for converting, via a switching circuit, a direct current voltage into an alternating current voltage to be applied to multiphase windings of a multiphase rotary machine to thereby control rotation of the multiphase rotary machine. The control system includes a control mode determiner configured to determine whether the control system is operating in any one of power running control mode for the rotary machine and regenerative control mode therefor. The control system includes a command voltage determiner configured to determine a command voltage value for the alternating current voltage to be applied to the multiphase windings based on:

a zero crossing of a first current parameter associated with an alternating phase current, the alternating phase current flowing through at least one of a first phase winding and a second phase winding of the multiphase windings based on the alternating current voltage, the zero crossing appearing when the at least first and second phase windings are short-circuited to a predetermined voltage; and a zero crossing of a second current parameter associated with an amount of change in the phase current when the at least first and second phase windings are short-circuited to the predetermined potential. The control system includes a driving unit configured to drive the switching circuit on and off based on the determined command voltage value to thereby modulate the direct current voltage to the alternating current voltage to be applied to the multiphase windings.

BRIEF DESCRIPTION OF THE DRAWINGS

Other objects and aspects of the invention will become apparent from the following description of embodiments with reference to the accompanying drawings in which:

FIG. 3 is a flowchart schematically illustrating a two-phase modulation routine to be executed by the controller illustrated in FIG. 1 according to the first embodiment;

FIG. 8 is a time chart schematically illustrating a phase difference (phase leading or phase delay) between three-phase line-to-line induced voltages and three-phase line-to-line induced currents according to the first embodiment;

DETAILED DESCRIPTION OF EMBODIMENTS OF THE INVENTION

Embodiments of the present invention will be described hereinafter with reference to the accompanying drawings. In each embodiment, the present invention is, for example, applied to a control system for a three-phase motor with which an air conditioner installed in a motor vehicle is equipped; this three-phase motor is an example of various types of multiphase rotary electric machines.

First Embodiment

Figure 1:
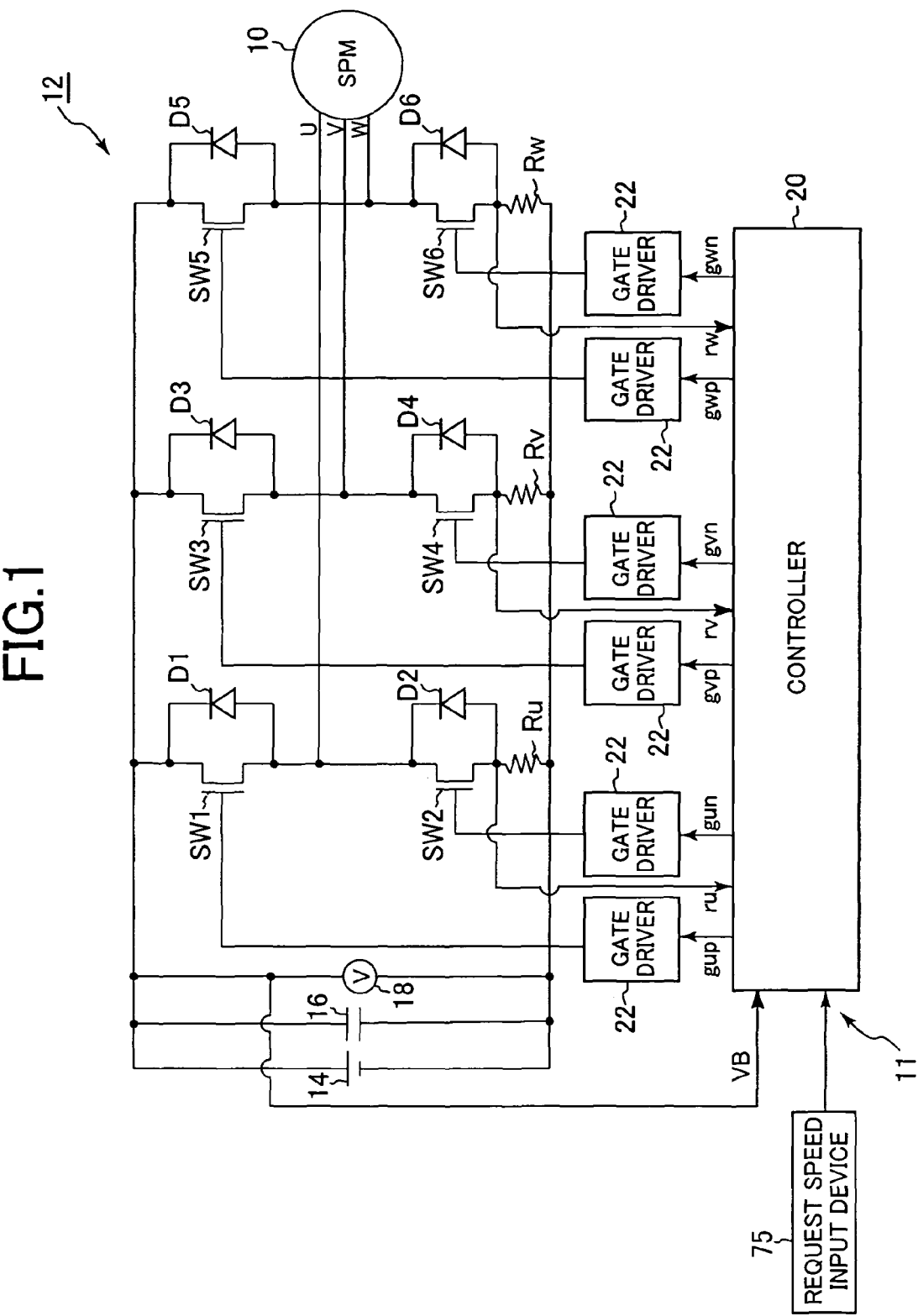
FIG. 1 is a circuit diagram of a control system for a motor according to a first embodiment of the present invention.

Referring to the drawings, particularly to FIG. 1, there is illustrated an interior magnet synchronous motor, referred to simply as "motor" 10, and a control system 11 for controlling the motor 10. The motor 10 serves as, for instance, a blower motor of the in-vehicle air conditioner.

For example, the motor 10 is provided with an annular rotor having a rotor core. The rotor core of the rotor is provided at its circumferential portion with at least one N and S pole pair (see FIG. 7B).

The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

The stator core also has a plurality of slots. The slots are formed through the stator core and are circumferentially arranged at given intervals. The stator also includes a set of three-phase windings wound in the slots of the stator.

The three-phase windings are wound in the slots such that the U-phase winding, V-phase winding, and W-phase winding are shifted by an electrical angular position of, for example, 2π/3 radian in phase from each other.

The motor 10 is operative to receive at its three-phase windings three-phase currents to thereby generate a rotating magnetic flux (see FIG. 7B); this allows the rotor to turn based on magnetic attractive force between the rotating magnetic flux and a magnetic flux of the rotor.

One ends of the U-, V-, and W-phase windings are connected to each other in, for example, star configuration to constitute an individual neutral point.

On the other hand, the control system 3 includes an inverter 12.

The inverter 12 is designed as a three-phase inverter. The inverter 12 is composed of a first pair of series-connected switching elements SW1 and SW2, a second pair of series-connected switching elements SW3 and SW4, and a third pair of series-connected switching elements SW5 and SW6. The inverter 12 is also composed of flywheel diodes D1, D2, D3, D4, D5, and D6 connected in antiparallel with the switching elements SW1, SW2, SW3, SW4, SW5, and SW6, respectively.

The cathode of each of the flywheel diodes D1, D2, D3, D4, D5, and D6 is connected with the drain of a corresponding one of the switching elements, and the anode thereof is connected with the source of a corresponding one of the switching elements.

The first to third pairs of switching elements are parallely connected with each other in bridge configuration.

A connecting point through which the switching elements SW1 and SW2 of the first pair are connected with each other in series is connected with an output lead extending from the other end of the U-phase winding. Similarly, a connecting point through which the switching elements SW3 and SW4 of the second pair are connected with each other in series is connected with an output lead extending from the other end of the V-phase winding. Moreover, a connecting point through which the switching elements SW5 and SW6 of the third pair are connected with each other in series is connected with an output lead extending from the other end of the W-phase winding.

The control system 11 includes a battery 14, a smoothing capacitor 16, and a voltmeter 18.

One end of the series-connected switching elements SW1 and SW2 of the first pair, such as the drain of the switching element SW1, is connected with a positive terminal of the battery 14, and the other end thereof, such as the source of the second switching element SW2, is connected with a negative terminal of the battery 14.

Similarly, one end of the series-connected switching elements SW3 and SW4 of the second pair is connected with the positive terminal of the battery 14, and the other end thereof is connected with the negative terminal of the battery 14. Moreover, one end of the series-connected switching elements SW5 and SW6 of the third pair is connected with the positive terminal of the battery 14, and the other end thereof is connected with the negative terminal of the battery 14.

In other words, the battery 14 is parallely connected with the first, second, and third pairs of switching elements, and each of the smoothing capacitor 16 and the voltmeter 18 is parallely connected with the battery 14.

The control system 11 includes shunt resistors Ru, Rv, and Rw. The shunt resistor Ru is connected between the negative terminal of the battery 14 and the switching element SW2 so as to be in series with the switching element SW2 and operative to detect a current flowing through the switching element SW2 or the flywheel diode D2.

The shunt resistor Rv is connected between the negative terminal of the battery 14 and the switching element SW4 so as to be in series with the switching element SW4 and operative to detect a current flowing through the switching element SW4 or the flywheel diode D4.

The shunt resistor Rw is connected between the negative terminal of the battery 14 and the switching element SW6 so as to be in series with the switching element SW6 and operative to detect a current flowing through the switching element SW6 or the flywheel diode D6.

This connecting configuration between the inverter 12 and the battery 14 allows an output voltage of the battery 14 to be applied, via the smoothing capacitor 16, across:

both ends of the first paired series-connected switching elements SW1 and SW2;

both ends of the second paired series-connected switching elements SW3 and SW4; and both ends of the third paired series-connected switching elements SW5 and SW6.

The control system 3 includes a controller 20 and three pairs of drivers 22. The controller 20 is for example designed as a common microcomputer circuit consisting of a CPU, an I/O interface, and a memory unit.

The controller 20 is connected with an output terminal of the voltmeter 18 and arranged to detect an output voltage VB of the battery 14 (battery voltage VB) measured by the voltmeter 18. The controller 20 is arranged to measure an amount ru of voltage drop across the shunt resistor Ru, measure an amount rv of voltage drop across the shunt resistor Rv, and measure an amount rw of voltage drop across the shunt resistor Rw.

The controller 20 is connected with a request speed input device 75 installed in the motor vehicle. The request speed input device 75 is operative to input, to the controller 20, a request speed ωd for the motor 10. The data representing a variable request speed will be referred to as "request speed data or request speed" hereinafter.

Each of the switching elements SW1 to SW6 has a control terminal, such as the gate, connected with a corresponding one of the gate drivers 22. The gate drivers 22 are connected with the controller 20.

The controller 20 is operative to cause the gate drivers 22 to individually drive on and off the switching elements SW1, SW2, SW3, SW4, SW5, and SW6.

Figure 2:
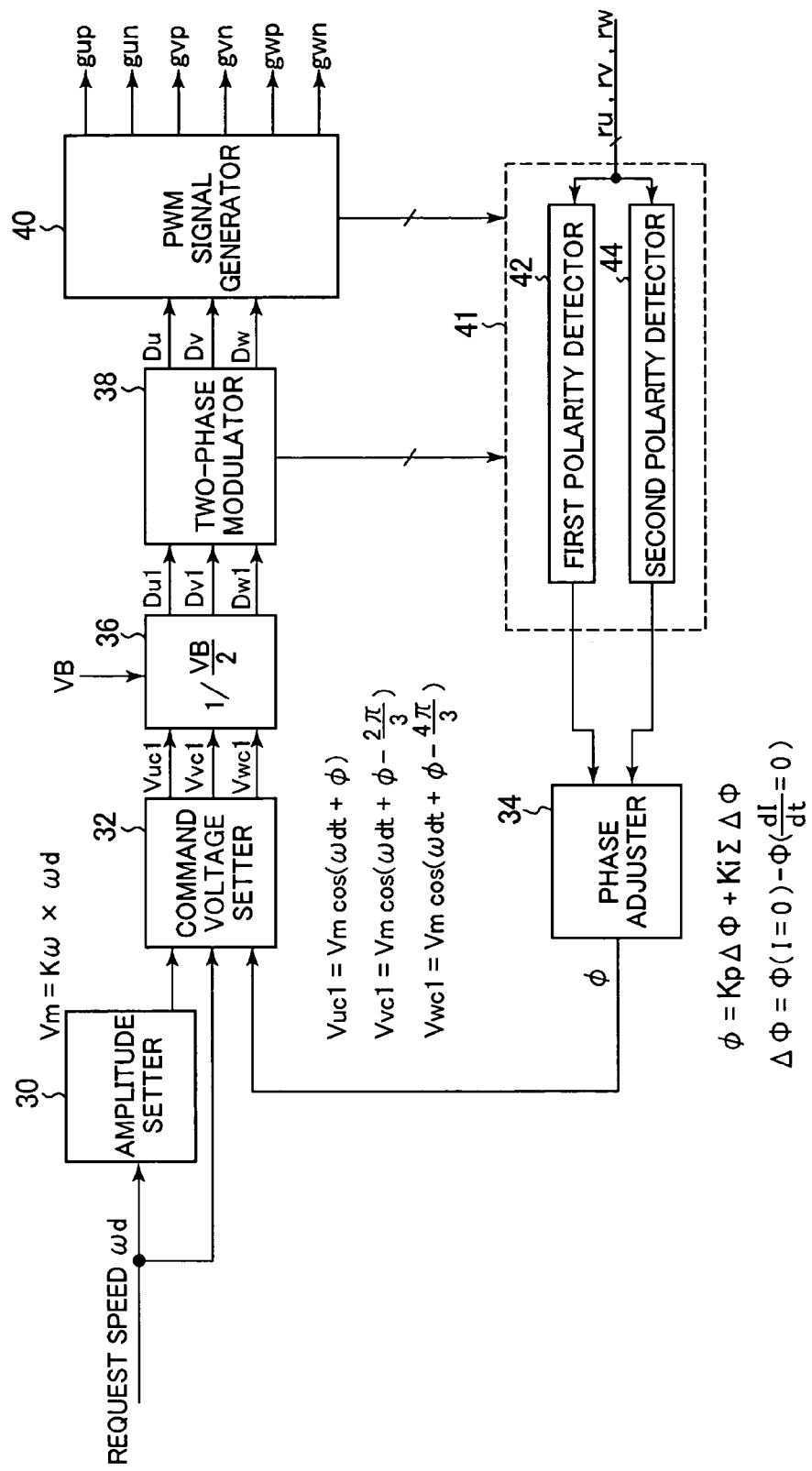
FIG. 2 is a block diagram schematically illustrating functional modules of a controller illustrated in FIG. 1 according to the first embodiment.

FIG. 2 schematically illustrates functional modules of the controller 20 equivalent to tasks to be executed thereby.

The controller 20 includes an amplitude setter 30, a command-voltage setter 32, a phase adjuster 34, a duty signal generator 36, a two-phase modulator 38, a PWM signal generator 40, and a polarity detecting module 41.

Note that the functional modules can be implemented by one or more program modules installed in the microcomputer of the controller 20 or can be implemented by one or more hardwired-logic circuits installed therein.

The amplitude setter 30 works to determine an amplitude Vm of each of a U-phase command voltage Vuc1, a V-phase command voltage Vvc1, and a W-phase command voltage Vwc1.

In the first embodiment, because speed of the motor 10 is proportional to voltage to be supplied to the motor 10, the amplitude setter 30 works to multiply the request speed ωd by a gain Kω to determine the amplitude Vm of each of the U-phase command voltage Vuc1, the V-phase command voltage Vvc1, and the W-phase command voltage Vwc1. The amplitude Vm is expressed by the following equation "Vm=ωd×Kω". The gain Kω is proportional to an electric angular rate ω of rotation of the rotor of the motor 10.

The command-voltage setter 32 is operatively connected with the amplitude setter 30 and the phase adjuster 34 and operative to determine each of the U-, V-, and W-phase command voltages Vuc1, Vvc1, and Vwc1 based on the amplitude Vm determined by the amplitude setter 30, the request speed ω, and a phase φ determined by the phase adjuster 34 described hereinafter.

For example, each of the U-, V-, and W-phase command voltages Vuc1, Vvc1, and Vwc1 is determined as a cosine wave voltage expressed as follows:

$$Vuc1 = Vm\cos(\omega d \cdot t + \phi)$$
$$Vvc1 = Vm\cos\left(\omega d \cdot t + \phi - \frac{2\pi}{3}\right)$$
$$Vwc1 = Vm\cos\left(\omega d \cdot t + \phi - \frac{4\pi}{3}\right)$$

Specifically, the request speed ωd corresponds to an electric angular rate of each of the command voltages Vuc1, Vvc1, and Vwc1 corresponding to a rotational position (electrical angular position) of the rotor of the motor 10.

The U-, V-, and W-phase command voltages Vuc1, Vvc1, and Vwc1 have a phase difference of an electrical angular position of 2π/3 [radian] from each other.

The duty signal generator 36 is operatively connected with the command voltage setter 32 and operative to:

receive the U-, V-, and W-phase command voltages Vuc1, Vvc1, and Vwc1 passed from the command voltage setter 32; and divide, by the half (½) level of the output voltage VB of the battery 14, the command voltages Vuc1, Vvc1, and Vwc1 to thereby generate normalized U-, V-, and W-phase duty signals Du1, Dv1, and Dw1, respectively.

Note that the positive peak of each of the U-, V-, and W-phase command voltages corresponds to +½·VB, and the negative peak thereof corresponds to −½·VB. Thus, the normalized U-, V-, and W-phase duty signals Du1, Dv1, and Dw1 are illustrated in FIG. 3.

The two-phase modulator 38 is operatively connected with the duty signal generator 36 and operative to:

receive the normalized U-, V-, and W-phase duty signals Du1, Dv1, and Dw1 passed from the duty signal generator 36; and two-phase modulate the received normalized duty signals Du1, Dv1, and Dw1 so as to match one of the duty signals Du1, Dv1, and Dw1 that is the lowest in level therein with the potential of a negative terminal of the battery 14 while holding the difference in voltage among the duty signals Du1, Dv1, and Dw1.

FIG. 3 schematically illustrates such a two-phase modulation routine to be executed by the two-phase modulator 38.

Specifically, when starting the two-phase modulation routine, the two-phase modulator 38 calculates an offset correction level Δ for each of the duty signals Du1, Dv1, and Dw1 in step S10. The offset correction level Δ represents the deviation of a minimum one of the duty signals Du1, Dv1, and Dw1 in level from the level at the negative terminal of the battery 14 at each electrical angular position of rotation of the rotor.

In other words, the offset correction level Δ represents the deviation of a minimum one of the duty signals Du1, Dv1, and Dw1 in level from "−1". The offset correction level Δ can be given by the following equation "Δ=−1−min (Du1, Dv1, and Dw1). The function min (a, b, c) works to output a minimum one of the "a", "b", and "c".

For example, in FIG. 3, at an electrical angular position of 60 degrees, because the duty signal Dv1 is a minimum one of the duty signals Du1, Dv1, and Dw1, the correction offset level Δ at the electrical angular position of 60 degrees is computed in accordance with "Δ=−1−Dv1 (60 degrees)".

Next, the two-phase modulator 38 adds the calculated offset correction level Δ to each of the duty signals Du1, Dv1, and Dw1 to calculate corrected duty signals Du, Dv, and Dw representing a modulation factor.

For example, at the electrical angular position of 60 degrees, addition of the offset correction level Δ to the duty signal Dv1 allows the duty signal Dv1 to become "−1". Similarly, at the electrical angular position of 60 degrees, addition of the offset correction level Δ to the duty signal Du1 allows the duty signal Du1 to decrease in level by the offset correction level.

In addition, at the electrical angular position of 90 degrees, addition of the offset correction level Δ to the duty signal Du1 allows the duty signal Du1 to decrease in level by the offset correction level.

Thereafter, the two-phase modulator 38 determines whether an absolute value of each of the corrected duty signals Du, Dv, and Dw is higher in level than "1" in step S14.

When it is determined that the absolute value of part of one of the corrected duty signals Du, Dv, and Dw is higher in level than "1" (the determination in step S14 is YES), the two-phase modulator 38 proceeds to step S16. In step S16, the two-phase modulator 38 limits the part of one of the corrected duty signals Du, Dv, and Dw to "1" in level in step S16, terminating the two-phase modulation task.

Otherwise, when it is determined that no absolute values of each of the corrected duty signals Du, Dv, and Dw are higher in level than "1" (the determination in step S14 is NO), the two-phase modulator 38 exits the two-phase modulation task.

The duty signals Du, Dv, and Dw finally obtained by the two-phase modulation task correspond to signals obtained by normalizing ultimate command voltages Vuc, Vvc, and Vwc by the half of the output voltage VB of the battery 14 (see FIG. 3).

Returning to FIG. 2, the PWM signal generator 40 compares each of the duty signals Du, Dv, and Dw in level with a periodical carrier signal with a triangular waveform or sawtooth waveform to thereby generate drive pulses gup, gun, gvp, gvn, gwp, and gwn for the switching elements SW1, SW2, SW3, SW4, SW5, and SW6, respectively.

Each of the drive pulses gup, gun, gvp, gvn, gwp, and gwn can transition between a predetermined high voltage level (HIGH or H) and a predetermined low voltage level (LOW or L). When one of the drive pulses gup, gun, gvp, gvn, gwp, and gwn is HIGH, a corresponding one of the switching elements SW1 to SW6 is ON by a corresponding one of the gate drivers 22.

The PWM signal generator 40 also works to individually drive each of the switching elements SW1, SW2, SW3, SW4, SW5, and SW6 via a corresponding one of the gate drivers 22 based on a corresponding one of the drive pulses gup, gun, gvp, gvn, gwp, and gwn. This allows the three-phase inverter 12 to chop the output voltage VB of the battery 14 to thereby generate the ultimate U-, V-, and W-phase command voltages Vuc, Vvc, and Vwc. The three-phase AC command voltages Vuc, Vvc, and Vwc are supplied to the respective U-, V-, and W-phase windings of the motor 10 during power-running control mode of the motor 10.

In particular, in the first embodiment, calculation of each of the command voltages Vuc1, Vvc1, and Vwc1 and each of the duty signals Du, Dv, and Dw is performed in synchronization with the periodic carrier signal.

Figure 4:
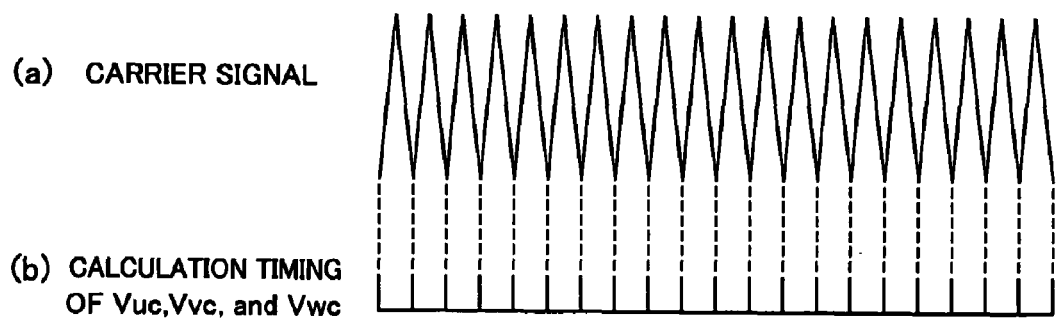
FIG. 4 is a time chart schematically illustrating timings at which each of three-phase command voltages are calculated according to the first embodiment.

For example, FIG. 4 schematically illustrates the waveform of the periodic carrier signal according to the first embodiment, and timings at which each of the command voltages Vuc1, Vvc1, and Vwc1 and each of the duty signals Du, Dv, and Dw are calculated. The waveform of one wave of the periodic carrier signal has a substantially isosceles triangle in that a predetermined rate of rise is equal to that of fall.

Figure 5:
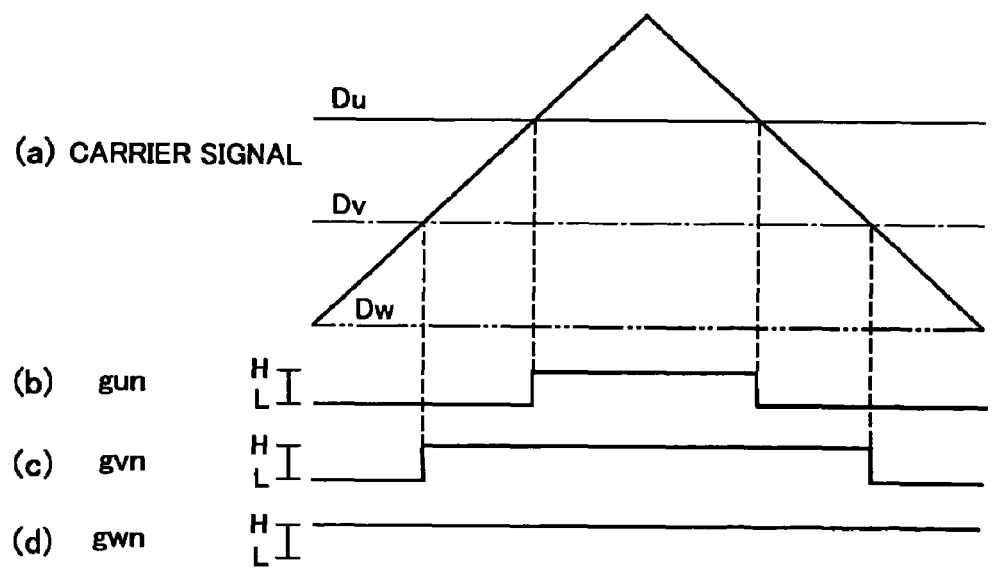
FIG. 5 is a view schematically demonstrating how to generate drive pulses by a PWM signal generator illustrated in FIG. 2 according to the first embodiment.

FIG. 5 schematically demonstrates how to generate the drive pulses gup, gun, gvp, gvn, gwp, and gwn by the PWM signal generator 40. (a) in FIG. 5 illustrates 1 cycle of the carrier signal in enlarged form and the duty signals Du, Dv, and Dw corresponding thereto, and (b) illustrates a transient of the drive pulse gun. (c) in FIG. 5 illustrates a transient of the drive pulse gun, and (d) in FIG. 5 illustrates a transient of the drive pulse gwn.

FIG. 5 shows that each of the duty signals Du, Dv, and Dw is kept unchanged within 1 cycle of the carrier signal. For this reason, a magnitude correlation between the carrier signal and the duty signals Du, Dv, and Dw is linearly symmetric with respect to a timing (an electrical angular position) when the carrier signal reaches its upper limit.

Figures 6A, 6B:
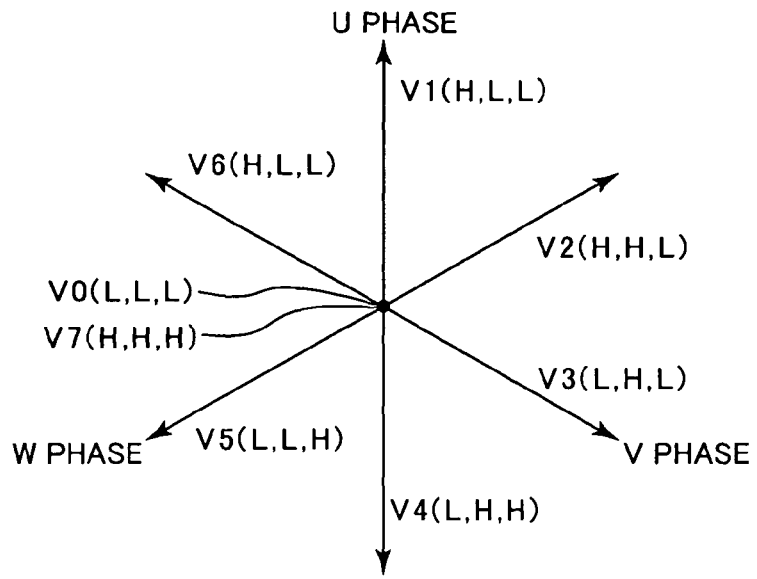
FIG. 6A is a space vector diagram schematically illustrating eight space voltage vectors according to the first embodiment.
FIG. 6B is a table schematically illustrating eight on-off switching modes corresponding to the eight space voltage vectors according to the first embodiment.

ON-off mode for the switching elements SW1 to SW6 are expressed by eight space voltage vectors V0 to V7 illustrated in FIGS. 6A and 6B. In FIGS. 6A and 6B, for example, reference character "H" represents that the high-side switching element of each pair of the switching elements is ON, and reference character "L" represents that the low-side switching element of each pair of the switching elements is ON. Specifically, the voltage vector V1 (H, L, L) represents that the first switching element (higher leg) SW1 is ON, the fourth switching element (lower leg) SW4 is ON, and the sixth switching element (lower leg) SW6 is ON.

The voltage vector V0 represents a switching mode V0 in which all of the lower legs SW2, SW4, and SW6 are ON, and each of the odd voltage vectors V1, V3, and V5 represents a switching mode in which a corresponding one of the higher legs SW1, SW3, and SW5 is only ON. Each of the even voltage vectors V2, V4, and V6 represents a switching mode in which a corresponding one of the lower legs SW2, SW4, and SW6 is only ON. The voltage vector V7 represents a switching mode V7 in which all of the higher legs SW1, SW3, and SW5 are ON.

When all of the lower legs SW2, SW4, and SW6 are ON in the switching mode V0, each of the U-, V-, and W-phase windings of the motor 10 is short-circuited to the ground level of the negative terminal of the battery 14. In this state, an induced voltage in the motor 10 allows a phase current to flow through each of the lower legs SW2, SW4, and SW6. At that time, the shunt resistors Ru, Rv, and Rw are operative to detect the U-phase, V-phase, and W-phase currents flowing through the switching elements SW2, SW4, and SW6, respectively. Thus, during the switching mode V0, the controller 20 measures the U-phase, V-phase, and W-phase currents flowing through the respective U-phase, V-phase, and W-phase windings.

In addition, when the lower legs SW4, and SW6 are ON in the switching mode V1, the shunt resistors Rv and Rw are operative to detect V-phase and W-phase currents flowing through the switching elements SW4 and SW6, respectively. Thus, during the switching mode V1, the controller 20 measures the V-phase and W-phase currents flowing through the respective V-phase, and W-phase windings. The controller 20 also estimates a U-phase current flowing through the U-phase winding based on the measured V-phase and W-phase currents in accordance with the Kirchhoff's law.

Figure 7A:
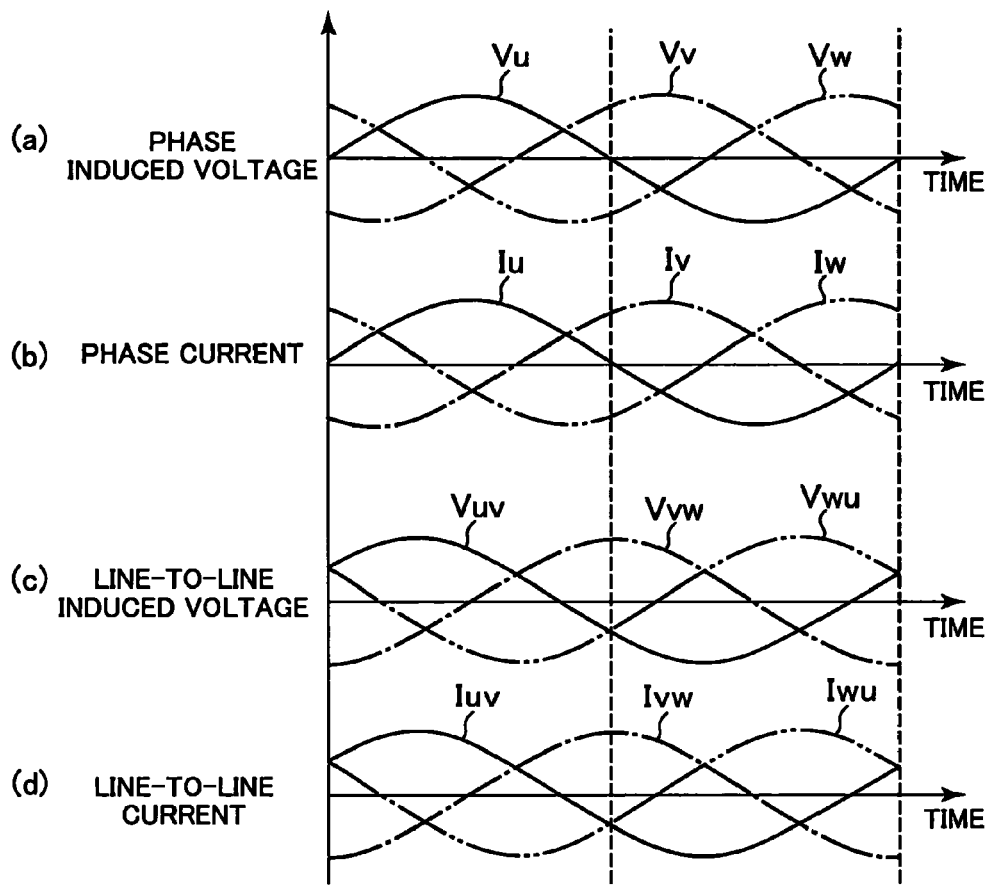
FIG. 7A is a time chart schematically illustrating transients of three-phase induced voltages, three-phase currents, three-phase line-to-line induced voltages, and three-phase line-to-line currents according to the first embodiment.
Figure 7B:
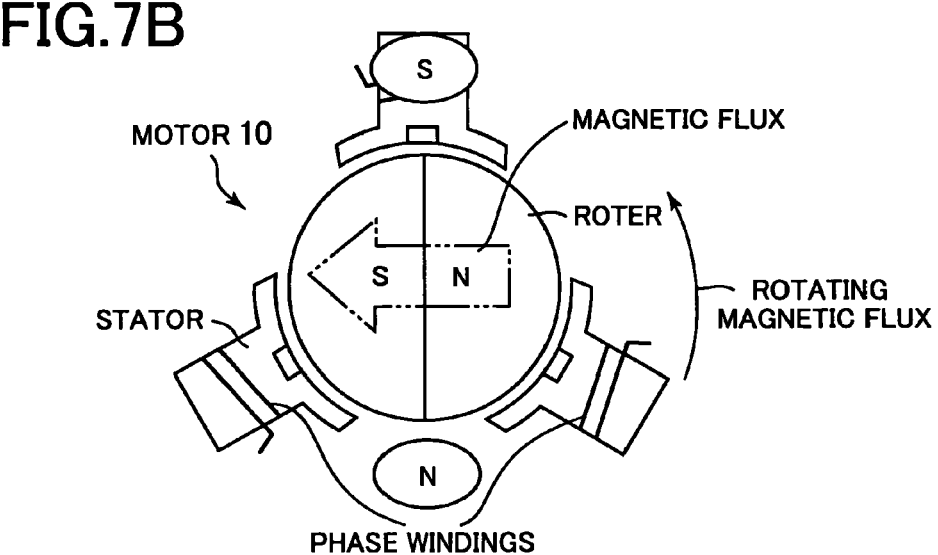
FIG. 7B is a view substantially illustrating an example of the structure of the motor illustrated in FIG. 1 according to the first embodiment.

Referring to FIG. 2, the phase adjuster 34 works to adjust the phase $\phi$ of a current flowing through each phase winding of the motor 10 so as to maximize torque to be generated by the motor 10 while minimizing the current. Note that the torque T to be generated by the motor 10 is expressed by the following equation:

$$T = A \cdot B \cdot \sin \theta$$

where A represents the rotating magnetic flux, B represents the magnetic flux of the rotor, and $\theta$ represents a phase angle between the rotating magnetic flux A and the magnetic flux B of the rotor (see FIG. 7B). The control of the phase $\phi$ of a current flowing through each phase winding of the motor 10 in order to maximize the torque to be created thereby set forth above will be referred to as "maximum torque control" hereinafter.

For this reason, the phase adjuster 34 works to adjust the phase of an instantaneous phase current Iu for the U-phase winding, an instantaneous phase current Iv for the V-phase winding, and an instantaneous phase current Iw for the W-phase winding to 90 degrees (electrical angular position) leading with respect to the magnetic flux B of the rotor.

This results that:

the U-phase, V-phase, and W-phase currents Iu, Iv, and Iw are in phase with U-phase, V-phase, and W-phase induced voltages Vu, Vv, and Vw, respectively (see (a) and (b) of FIG. 7A); and a U-V line-to-line current Iuv, a V-W line-to-line current Ivw, and a W-U line-to-line current Iwu are in phase with a U-V line-to-line induced voltage Vuv, a V-W line-to-line induced voltage Vvw, and a W-U line-to-line induced voltage Vwu (see (c) and (d) of FIG. 7B).

Thus, as illustrated in FIG. 8, when each of the line-to-line currents Iuv, Ivw, and Iwu delays in phase with respect to a corresponding one of the line-to-line induced voltages Vuv, Vvw, and Vwu, the phase adjuster 34 works to advance each of the line-to-line currents Iuv, Ivw, and Iwu in phase. This allows each of the line-to-line currents Iuv, Ivw, and Iwu to be in phase with respect to a corresponding one of the line-to-line induced voltages Vuv, Vvw, and Vwu, thus properly carrying out the maximum torque control.

When each of the line-to-line currents Iuv, Ivw, and Iwu leads in phase with respect to a corresponding one of the line-to-line induced voltages Vuv, Vvw, and Vwu, the phase adjuster 34 works to delay each of the line-to-line currents Iuv, Ivw, and Iwu in phase. This allows each of the line-to-line currents Iuv, Ivw, and Iwu to be in phase with respect to a corresponding one of the line-to-line induced voltages Vuv, Vvw, and Vwu, thus properly carrying out the maximum torque control.

To make possible that the phase adjuster 34 properly performs the maximum torque control, the controller 20 is programmed to match, during the switching mode V0, zero crossing of each of the line-to-line currents Iuv, Ivw, and Iwu with that of the amount of change in a corresponding one of the line-to-line currents Iuv, Ivw, and Iwu. The zero crossing matching task will be described hereinafter.

Figure 9:
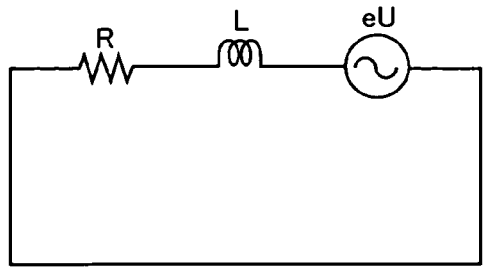
FIG. 9 is a circuit diagram schematically illustrating an equivalent circuit of a U-phase winding of the motor illustrated in FIG. 1 according to the first embodiment.

During the switching mode V0, an equivalent circuit of the U-phase winding of the motor 10 can be illustrated in FIG. 9 as a series circuit consisting of a resistance component R of the U-phase winding, an inductance component L of the U-phase winding, and a voltage source of an induced voltage eU in the U-phase winding. This provides the following equation [c1].

$$R \times Iu + L(dIu/dt) + eU = 0 \qquad [c1]$$

Similarly, an equivalent circuit of V-phase of the motor 10 provides the following equation [c2]:

$$R \times Iv + L(dIv/dt) + eV = 0 \quad [c2]$$

where eV represents an induced voltage in the V-phase winding.

Subtraction of the equation [c2] from the equation [c1] is expressed by the following equation:

$$R \times (Iu - Iv) + L(dIu/dt - dIv/dt) + (eU - eV) = 0$$

Specifically, the following equation [c3] is established:

$$R \times Iuv + L(dIuv/dt) + eUV = 0 \quad [c3]$$

where Iuv represents the U-V line-to-line current, and eUV represents the U-V line-to-line induced voltage.

When the U-V line-to-line current Iuv becomes zero in the equation [c3], the following equation [c4] is established:

$$eUV = -L \times (dIuv/dt) \quad [c4]$$

The equation [c4] shows that the U-V line-to-line induced voltage eUV when the U-V line-to-line current Iuv becomes zero can be expressed by the amount of change in the U-V line-to-line current Iuv.

As well as the relationship between the U-V line-to-line induced voltage eUV and the amount of change in the U-V line-to-line current Iuv, a V-W line-to-line induced voltage eVW when the V-W line-to-line current Ivw becomes zero can be expressed by the amount of change in the V-W line-to-line current Ivw. In addition, a W-U line-to-line induced voltage eWU when the W-U line-to-line current Iwu becomes zero can be expressed by the amount of change in the W-U line-to-line current Iwu.

In particular, in order to set a line-to-line induced voltage at zero when a corresponding line-to-line current becomes zero, it is necessary to set the amount of change in the corresponding line-to-line current at zero when the corresponding line-to-line current becomes zero.

In the first embodiment, therefore, in order to detect zero crossing of each of the line-to-line currents Iuv, Ivw, and Iwu, and zero crossing of each of the line-to-line induced voltages Vuv, Vvw, and Vwu, the polarity detecting module 41 is installed in the controller 20.

Specifically, the polarity detecting module 41 consists of a first polarity detector 42 and a second polarity detector 44 each of which is operatively connected with the two-phase modulator 38, the PWM signal generator 40, and the phase adjuster 34, Referring to FIG. 2, the first polarity detector 42 works to detect a polarity of each of the line-to-line currents Iuv, Ivw, and Iwu based on the amount ru of voltage drop across the shunt resistor Ru, the amount rv of voltage drop across the shunt resistor Rv, and the amount rw of voltage drop across the shunt resistor Rw.

The second polarity detector 44 works to detect a polarity of each of the amount of change in the line-to-line currents Iuv, Ivw, and Iwu.

Specifically, the phase adjuster 34 works to adjust the phase ϕ of each of the command voltages Vuc1, Vvc1, and Vwc1 based on:

a timing of inversion of the detected polarity of each of the line-to-line currents Iuv, Ivw, and Iwu as the zero crossing thereof; and a timing of inversion of the detected polarity of the amount of change of each of the line-to-line currents Iuv, Ivw, and Iwu as the zero crossing of the amount of change thereof.

Figure 10:
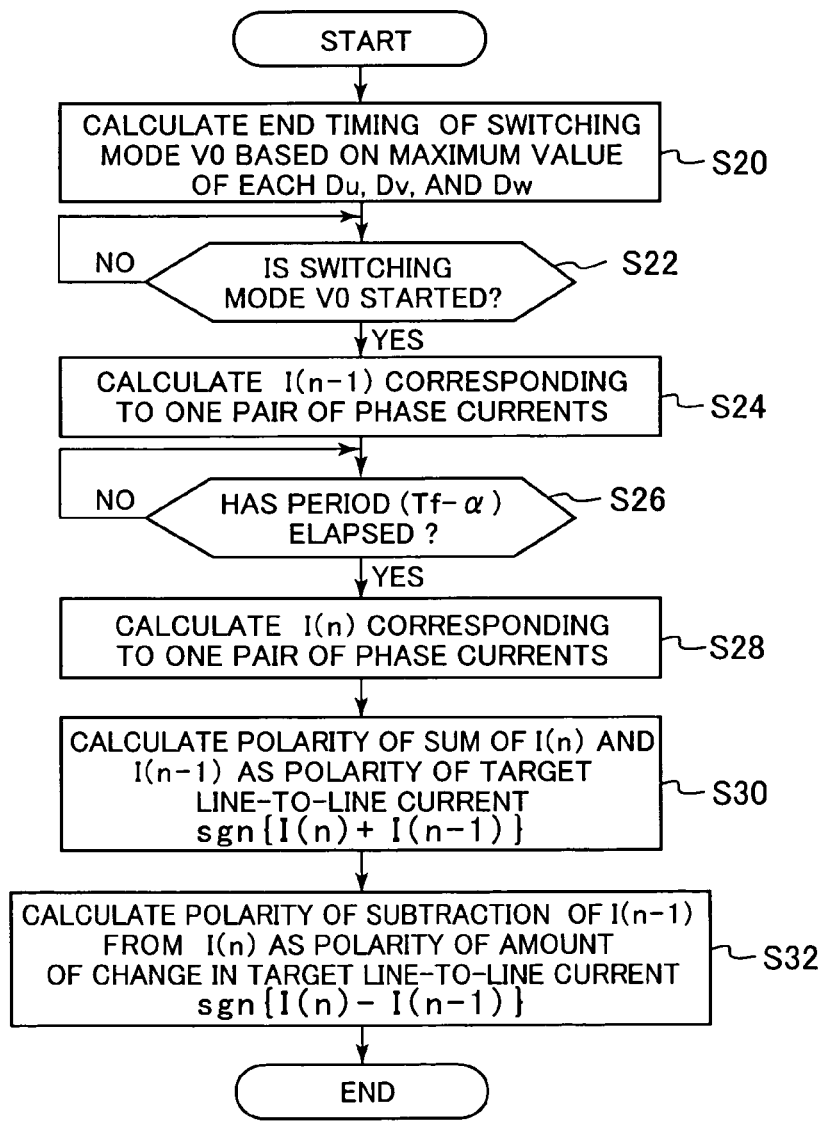
FIG. 10 is a flowchart schematically illustrating a polarity detecting routine to be executed by the controller illustrated in FIG. 1 according to the first embodiment.

FIG. 10 schematically illustrates such a polarity detecting routine to be executed by the polarity detecting module 41 (first and second polarity detectors 42 and 44). The routine is repeatedly executed every predetermined cycle.

Specifically, when starting the polarity detecting routine, the first polarity detector 42 receives the duty signals Du, Dv, and Dw passed from the two-phase modulator 38. Then, the first polarity detector 42 calculates an end timing Tf of the duration of the switching mode V0 based on a maximum value of each of the duty signals Du, Dv, and Dw in step S20.

Specifically, as illustrated in FIG. 5, during the switching mode V0, the maximum value of each of the duty signals Du, Dv, and Dw is lower than the carrier signal.

For this reason, based on the maximum value of each of the duty signals Du, Dv, and Dw, the first polarity detector 42 compares the maximum value of each of the duty signals Du, Dv, and Dw with the carrier signal to determine the end timing Tf of the switching mode V0 in step S20.

Next, the first polarity detector 42 determines whether the switching mode V0 is started in step S22 by executing OR operation among the drive pulses gun, gvn, and gwn passed from the PWN signal generator 40.

Specifically, when the OR operation among the drive pulses gun, gun, and gwn results HIGH, it is determined that the switching mode V0 is started in step S22 (see FIG. 5).

Otherwise, when the OR operation among the drive pulses gun, gvn, and gwn results LOW, it is determined that the switching mode V0 is not started in step S22, repeating the process in step S22 until the OR operation among the drive pulses gun, gvn, and gwn results HIGH.

When the determination in step S22 is affirmative, the first polarity detector 42 calculates a line-to-line current I(n−1) corresponding to one pair of the phase currents Iu, Iv, and Iw in step S24. In other words, the line-to-line current I(n−1) represents a line-to-line current I corresponding to one pair of the phase currents Iu, Iv, and Iw at the start timing of the switching mode V0. Note that one pair of the phase currents Iu, Iv, and Iw is switched to an alternative one pair of the phase currents Iu, Iv, and Iw every rotation of the rotor at an electrical angular position of 60 degrees.

Figure 14:
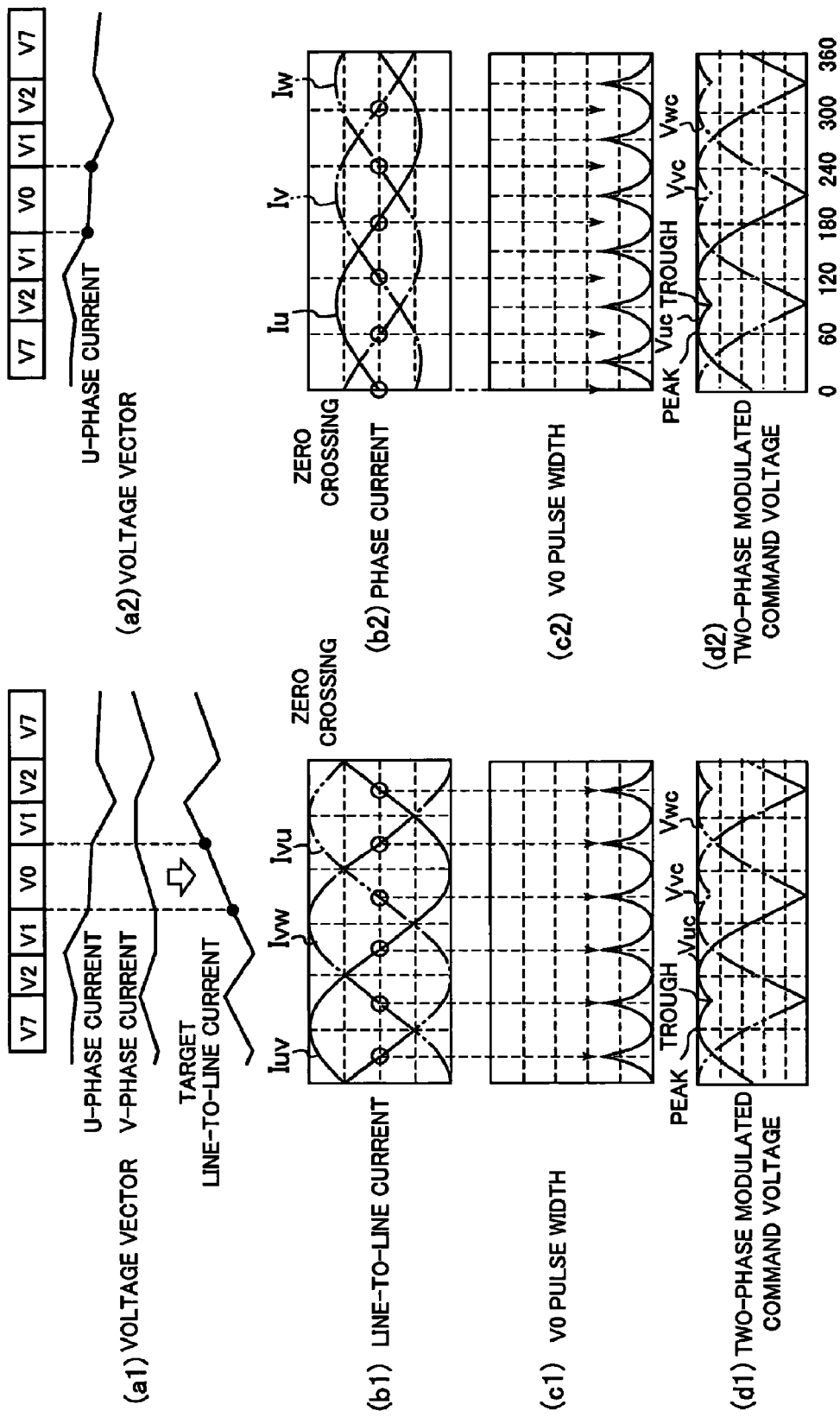
FIG. 14 is a time chart schematically demonstrating a V0 pulse width of two-phase modulated command voltages based on line-to-line currents as compared with that of two-phase modulated command voltages based on three-phase currents according to the first embodiment.

As illustrated in (b1) of FIG. 14, zero crossing of one line-to-line current appears in each region of an electrical angular position of 60 degrees; these zero crossings are illustrated in (b1) of FIG. 14 as circles. Specifically, one pair of the phase currents Iu, Iv, and Iw is expected such that the line-to-line current I(n−1) corresponding thereto is contained in one region of an electrical angular position of 60 degrees.

After completion of the detection of the line-to-line current I(n−1), the first polarity detector 42 waits until a period has elapsed since the start timing of the switching mode V0; this period is obtained by subtracting a predetermined period α from a time interval between the start timing of the switching mode V0 and the end timing Tf (NO in the determination of step S26).

When the period has elapsed since the start timing of the switching mode V0 (the determination in step S26 is YES), the first polarity detector 42 calculates, as a line-to-line current I(n), the same one pair of the phase currents Iu, Iv, and Iw in step S28. Then, the first polarity detector 42 calculates a polarity of the sum of the line-to-line currents I(n−1) and I(n) as a polarity of a target line-to-line current associated with the zero crossing contained in one region of an electrical angular position of 60 degrees in step S30. This calculation is given by the following function "sgn {I(n)+I(n−1)}".

In step S32, the second polarity detector 44 calculates a polarity of the subtraction of the line-to-line current I(n−1) from the line-to-line current I(n) as a polarity of the amount of change in the target line-to-line current. After completion of the process in step S32, the first polarity detector 42 terminates the polarity detecting routine.

Figure 11:
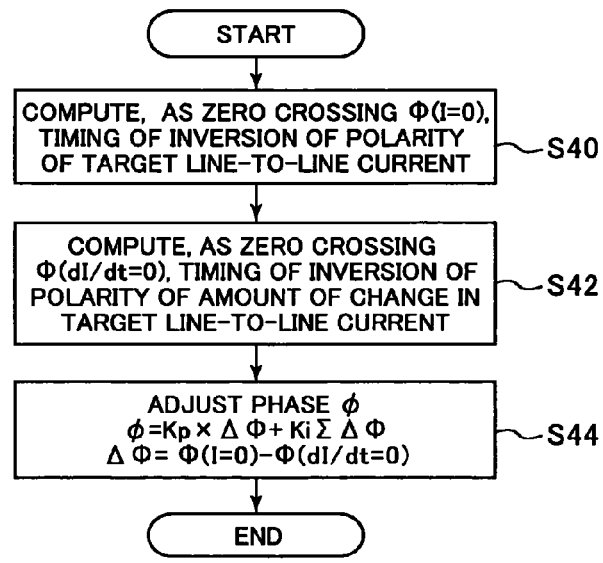
FIG. 11 is a flowchart schematically illustrating a phase adjusting routine to be executed by the controller illustrated in FIG. 1 according to the first embodiment.

FIG. 11 schematically illustrates a phase adjusting routine to be executed by the phase adjuster 34. The phase adjusting routine is repeatedly executed every predetermined cycle.

Specifically, when starting the phase adjusting routine, the phase adjuster 34 receives the polarity of the target line-to-line current and that of the amount of change therein passed from the first and second polarity detectors 42 and 44 every time the polarity detecting routine is executed by them in step S40.

Next, the phase adjuster 34 computes, as the zero crossing $\Phi(I=0)$ of the target line-to-line current, a timing of inversion of the received polarity of the target line-to-line current in step S40.

The phase adjuster 34 subsequently computes, as the zero crossing $\Phi(dI/dt=0)$ of the amount of change in the target line-to-line current, a timing of inversion of the received polarity of the amount of change in the target line-to-line current in step S42.

In step S44, the phase adjuster 34 computes a temporal difference $\Delta\Phi$ of the phase of the target line-to-line current at the zero crossing $\Phi(I=0)$ with respect to the phase of polarity inversion of the amount of change in the target line-to-line current at the zero crossing $\Phi(dI/dt=0)$. The temporal difference $\Delta\Phi$ is expressed by the following equation:

$$\Delta\Phi = \Phi(I=0) - \Phi(dI/dt=0).$$

Then, the phase adjuster 34 computes, based on the temporal difference $\Delta\Phi$, the phase $\phi$ of each of the command voltages Vuc1, Vvc1, and Vwc1.

The reason why the phase of polarity inversion of the amount of change in the line-to-line current is used to compute the temporal difference $\Delta\Phi$ is as follows (see FIG. 12).

Figure 12:
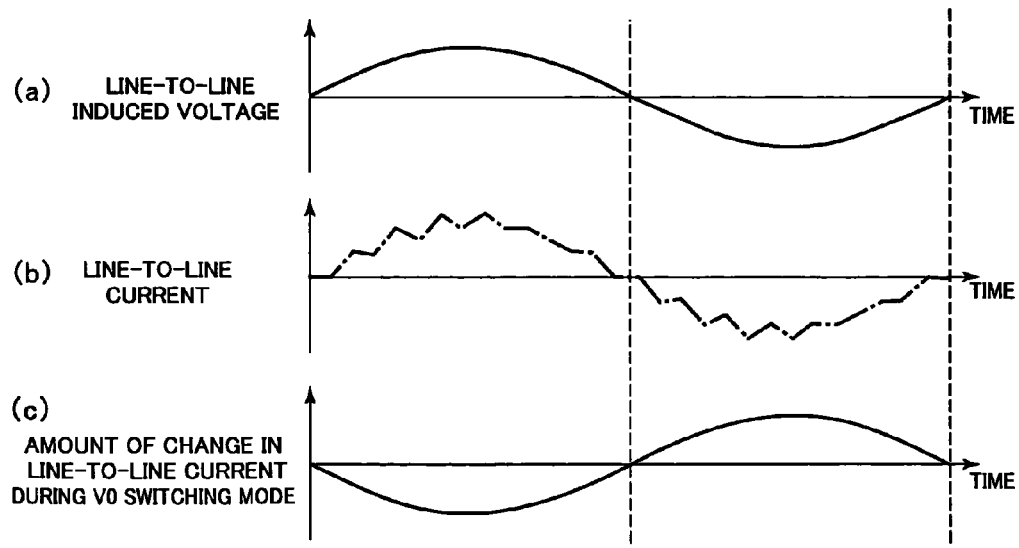
FIG. 12 is a time chart schematically illustrating a relationship in phase between a line-to-line induced voltage and an amount of change in a line-to-line current corresponding to the line-to-line induced voltage according to the first embodiment.

Specifically, (a) of FIG. 12 schematically illustrates the transition of a line-to-line induced voltage, and (b) of FIG. 12 schematically illustrates the discrete transition of a line-to-line current corresponding thereto. (c) of FIG. 12 schematically illustrates the phase of the amount of change in the line-to-line current within the duration of the switching mode V0.

FIG. 12 clearly shows that a line-to-line induced voltage is reversed in phase with respect to the amount of change in a line-to-line current corresponding thereto within the duration of the switching mode V0. This is confirmed by the equation [c4] set forth above.

For this reason, in order to match a line-to-line induced voltage in phase with the amount of change in the target line-to-line current corresponding thereto within the duration of the switching mode V0, it is necessary to reverse the polarity of the amount of change in the target line-to-line current within the duration of the switching mode V0.

Note that, in (b) of FIG. 12, the behavior of the line-to-line current within the duration of the switching mode V0 is illustrated as solid lines, and that thereof within the duration of another switching mode is illustrated as broken lines.

For example, in step S44, the phase adjuster 34 computes the phase $\phi$ of each of the command voltages Vuc1, Vvc1, and Vwc1 using a proportional gain Kp and an integral gain Ki of a proportional integral feedback algorithm for determination of the phase $\phi$. Specifically, in the proportional integral feedback algorithm, the phase $\phi$ is expressed by the following equation:

$$\phi = Kp \times \Delta\Phi + Ki(\Sigma\Delta\Phi)$$

The proportional term "$Kp \times \Delta\Phi$" contributes to change in the phase $\phi$ of each of the command voltages Vuc1, Vvc1, and Vwc1 in proportion to the temporal difference $\Delta\Phi$, and the integral term $Ki(\Sigma\Delta\Phi)$ is proportional to an accumulated offset ($\Sigma\Delta\Phi$) of instantaneous values of the temporal difference $\Delta\Phi$ over time to reset the accumulated offset (steady-state deviation) over time to zero.

Specifically, when the zero crossing $\Phi(I=0)$ of the target line-to-line current delays with respect to the zero crossing $\Phi(dI/dt=0)$ of the amount of change in the target line-to-line current, the phase adjuster 34 advances the phase $\phi$ of each of the command voltages Vuc1, Vvc1, and Vwc1.

In contrast, when the zero crossing $\Phi(I=0)$ of the target line-to-line current advances with respect to the zero crossing $\Phi(dI/dt=0)$ of the amount of change in the target line-to-line current, the phase adjuster 34 delays the phase $\phi$ of each of the command voltages Vuc1, Vvc1, and Vwc1.

After completion of the process in step S44, the phase adjuster 34 terminates the phase adjusting routine.

As described above, the phase adjusting routine allows the controller 20 to execute the maximum torque control.

In particular, in the first embodiment, the controller 20 is configured to:

subject the normalized U-, V-, and W-phase duty signals Du1, Dv1, and Dw1 to two-phase modulation; and execute the maximum torque control based on the zero crossing of each of the line-to-line currents and that of the amount of change in each of the line-to-line currents.

The configuration of the controller 20 allows the duration of the switching mode V0 at or near the zero crossing of each of the line-to-line currents to be expanded as compared with execution of the maximum torque control based on zero crossing of each of the phase currents. This makes it possible to reliably calculate the change in each of the line-to-line currents at or near the zero crossing thereof with greater accuracy.

The reason why the duration of the switching mode V0 at or near the zero crossing of each of the line-to-line currents is expanded will be described as follows.

Note that the duration of the switching mode V0 can be referred to as "pulse width" of the voltage vector V0, and the pulse width of the voltage vector V0 means the duration of all of the lower switching elements SW2, SW4, and SW6 being ON.

Figure 13:
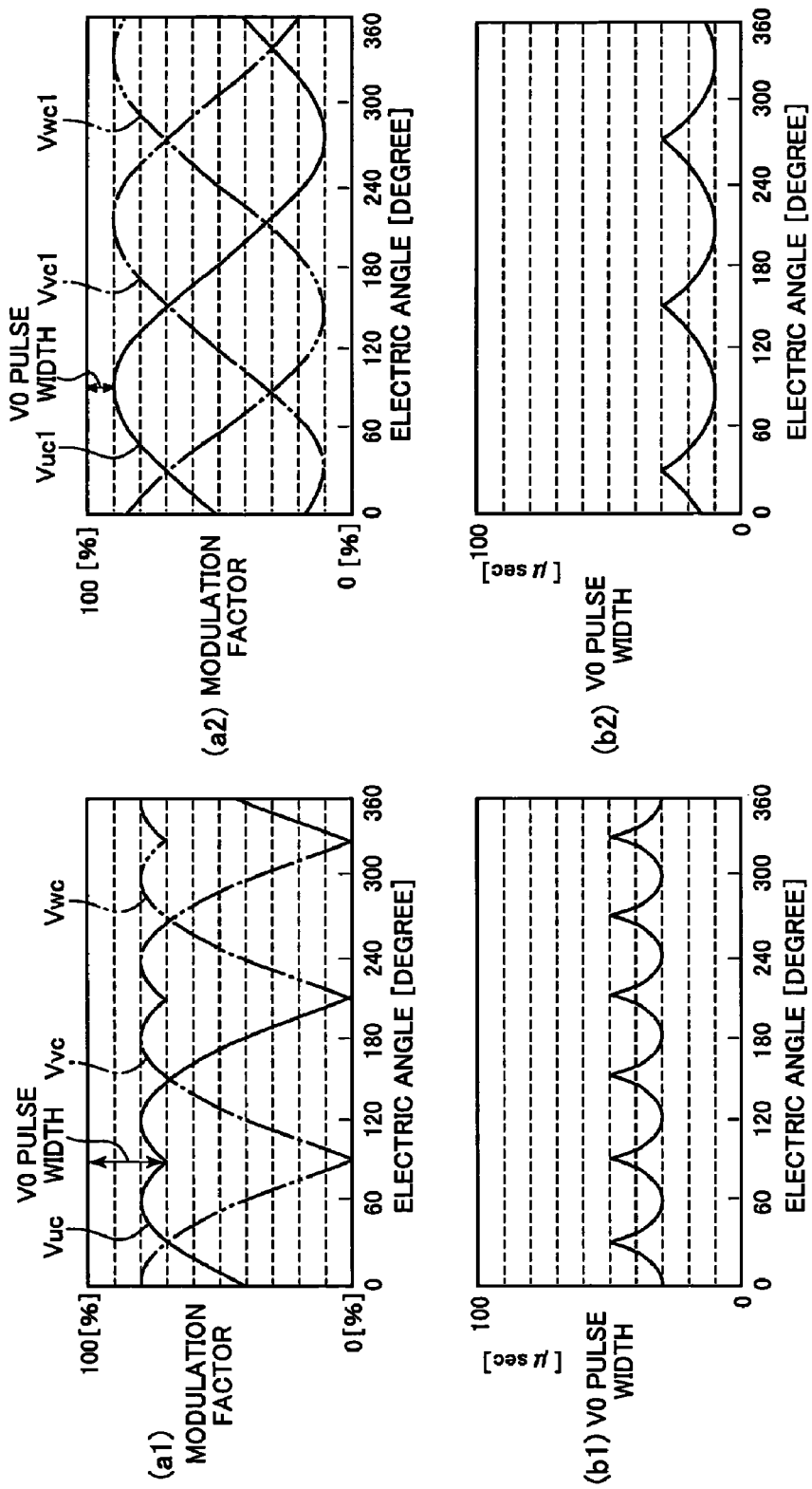
FIG. 13 is a time chart schematically demonstrating a V0 pulse width of two-phase modulated command voltages as compared with that of non-modulated command voltages according to the first embodiment.

(a2) of FIG. 13 illustrates the waveforms of the command voltages Vuc1, Vvc1, and Vwc1. In (a2) and (b2) of FIG. 13, the V0 pulse width of each of the command voltages Vuc1, Vvc1, and Vwc1 is proportional to a length between a maximum one of the command voltages Vuc1, Vvc1, and Vwc1 and the maximum modulation factor (100%).

Similarly, (a1) of FIG. 13 illustrates the waveforms of the two-phase modulated command voltages Vuc, Vvc, and Vwc. In (a1) and (b1) of FIG. 13, the V0 pulse width of each of the two-phase modulated command voltages Vuc, Vvc, and Vwc is proportional to a length between a maximum one of the two-phase modulated command voltages Vuc, Vvc, and Vwc and the maximum modulation factor (100%).

As clearly understood by comparison between (a1) and (a2) of FIG. 13, the V0 pulse width of the two-phase modulated command voltages Vuc, Vvc, and Vwc is greater than that of the command voltages Vuc1, Vvc1, and Vwc1 at any location (electrical angular position) of the rotor.

(a2), (b2), (c2), and (d2) of FIG. 14 illustrate detection of the zero crossings of the phase currents Iu, Iv, and Iw during the switching mode V0 as a comparison example of the first embodiment.

As clearly illustrated in (b2) to (d2) of FIG. 14, the zero crossing of any one of the phase currents Iu, Iv, and Iw appears every rotation cycle of the rotor. In addition, the zero crossing of each of the phase currents Iu, Iv, and Iw is synchronized with a wave peak of a corresponding one of the two-phase modulated command voltages Vuc, Vvc, and Vwc. When the wave peak of each the two-phase modulated command voltages Vuc, Vvc, and Vwc corresponds to the maximum modulation factor of 100%, the V0 pulse width becomes substantially zero at or near a corresponding one of the zero crossings of the two-phase modulated command voltages Vuc, Vvc, and Vwc.

In contrast, (a1), (b1), (c1), and (d1) of FIG. 14 illustrate detection of the zero crossing of the line-to-line currents Iuv, Ivw, and Iwu during the switching mode V0.

As clearly illustrated in (b1) to (d1) of FIG. 14, the zero crossing of any one of the line-to-line currents Iuv, Ivw, and Iwu appears every rotation cycle of the rotor. In addition, the zero crossing of each of the line-to-line currents Iuv, Ivw, and Iwu is synchronized with a wave trough of a corresponding one of the two-phase modulated command voltages Vuc, Vuc, and Vwc. The wave trough of each of the two-phase modulated command voltages Vuc, Vvc, and Vwc is shifted from the wave peak of a corresponding one of them in phase of an electrical angular position of 30 degrees.

For this reason, even if the wave peak of each the two-phase modulated command voltages Vuc, Vvc, and Vwc corresponds to the maximum modulation factor of 100%, the V0 pulse width is maximized at or near a corresponding one of the zero crossings of the two-phase modulated command voltages Vuc, Vvc, and Vwc.

Thus, it is possible to ensure sufficient time required to measure the polarity of each of the line-to-line currents Iuv, Ivw, and Iwu, and that of the amount of change in them.

As described above, the control system 11 according to the first embodiment is configured to ensure the length of time that allows the controller 20 to reliably detect the zero crosses of the line-to-line currents and those of the amount of change in the line-to-line currents independently of the modulation factor of the two-phase modulated command voltages. This achieves a first effect of reliably controlling rotation of the rotor even if no sensors for measuring the rotational positions of the rotor are installed in the control system 11.

The control system 11 is configured to carry out feedback control to match, with zero, the temporal difference between the zero crossing of a target line-to-line current and that of the amount of change in the target line-to-line current. This achieves a second effect of achieving the maximum torque control even if no sensors for measuring the rotational positions of the rotor are installed in the control system 11.

The control system 11 is configured to match a target line-to-line current in phase with polarity inversion of the amount of change in the target line-to-line current. This achieves a third effect of matching the target line-to-line current in phase with a corresponding line-to-line induced voltage.

The control system 11 is configured to adjust the phase of each of the command voltages Vuc1, Vvc1, and Vwc1 based on the temporal difference $\Delta\Phi$ between the zero crossing of a target line-to-line current and that of the amount of change in the target line-to-line current. This achieves a fourth effect of properly matching the zero crossing of a target line-to-line current and that of the amount of change in the target line-to-line current.

The control system 11 is configured to subject the normalized U-, V-, and W-phase duty signals Du1, Dv1, and Dw1 to two-phase modulation. This achieves a fifth effect of:

expanding the duration of the switching mode V0 at or near the zero crossing of each of the line-to-line currents; and allowing the zero crossings of the line-to-line currents to be detected with high accuracy. The two-phase modulation to be applied to the normalized U-, V-, and W-phase duty signals Du1, Dv1, and Dw1 allows the amplitude Vm of each of the two-phase modulated command voltages Vuc, Vvc, and Vwc to increase as compared with that of a corresponding one of the command voltages Vuc1, Vvc1, and Vwc1. This makes it possible to increase the voltage utilization factor of the control system 11.

The control system 11 is configured to calculate the line-to-line currents and the amount of change in the line-to-line currents based on the amounts ru, rv, and rw of voltage drops across the respective shunt resistors Ru, Rv, and Rw. As compared with using current sensors for measuring the phase currents (line-to-line currents), using the resistors Ru, Rv, and Rw achieves a sixth effect of simplifying the configuration of the control system 11 and the manufacturing cost thereof.

The control system 11 is configured to measure the line-to-line currents and the amount of change therein within the duration of the switching mode V0. This achieves a seventh effect of measuring six zero crossings of the line-to-line currents and six zero crossings of the amounts of change in the line-to-line currents within one period of the electrical angular position of the rotor.

Second Embodiment

A control system for a motor according to a second embodiment of the present invention will be described hereinafter. The structure of the control system is substantially identical to that of the control system 11 according to the first embodiment except for some differences described hereinafter.

Thus, like reference characters are assigned to like parts in the control systems according to the first and second embodiments, and therefore, descriptions of the structure of control system, except for some differences, according to the second embodiment are simplified or omitted.

The control system according to the second embodiment is specially designed to adjust, in place of the phase φ, the electrical angular rate ω or ωd of the rotor each of the command voltages Vuc1, Vvc1, and Vwc1 based on the temporal difference $\Delta\Phi$ of the phase of a target line-to-line current at the zero crossing $\Phi(I=0)$ with respect to the phase of polarity inversion of the amount of change in the target line-to-line current at the zero crossing $\Phi(dI/dt=0)$.

Figure 15:
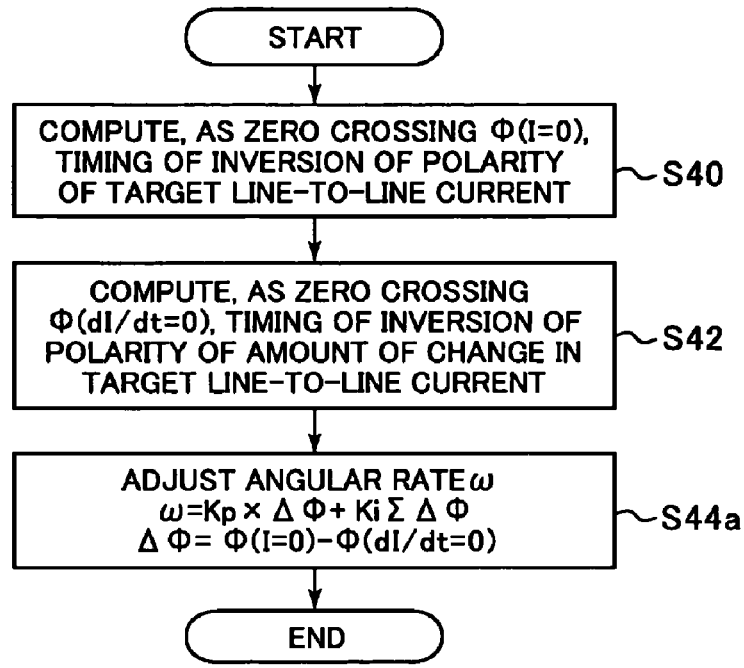
FIG. 15 is a flowchart schematically illustrating an angular rate adjusting routine to be executed by the controller according to a second embodiment of the present invention.

FIG. 15 schematically illustrates an angular rate adjusting routine to be executed by the controller 20. The angular rate adjusting routine is repeatedly executed every predetermined cycle.

Specifically, when starting the angular rate adjusting routine, the controller 20 executes steps S40 and S42 illustrated in FIG. 11.

Next, in step S44a, the controller 20 computes a temporal difference $\Delta\Phi$ of the phase of the target line-to-line current at the zero crossing $\Phi(I=0)$ with respect to the phase of polarity inversion of the amount of change in the target line-to-line current at the zero crossing $\Phi(dI/dt=0)$. The temporal difference $\Delta\Phi$ is expressed by the following equation:

$$\Delta\Phi = \Phi(I=0) - \Phi(dI/dt=0).$$

Then, the controller 20 adjusts, based on the temporal difference $\Delta\Phi$, the electrical angular rate ω of each of the command voltages Vuc1, Vvc1, and Vwc1.

For example, in step S44a, the controller 20 adjusts the electrical angular rate ω of each of the command voltages Vuc1, Vvc1, and Vwc1 using a proportional gain Kp and an integral gain Ki of a proportional integral feedback algorithm for determination of the electrical angular rate ω. Specifically, in the proportional integral feedback algorithm, the electrical angular rate ω is expressed by the following equation:

$$\omega = Kp \times \Delta\Phi + Ki(\Sigma\Delta\Phi)$$

The proportional term "Kp×ΔΦ" contributes to change in the electrical angular rate ω of each of the command voltages Vuc1, Vvc1, and Vwc1 in proportion to the temporal difference ΔΦ, and the integral term Ki(ΣΔΦ) is proportional to an accumulated offset (ΣΔΦ) of instantaneous values of the temporal difference ΔΦ over time.

Specifically, when the zero crossing Φ(I=0) of the target line-to-line current delays with respect to the zero crossing Φ(dI/dt=0) of the amount of change in the target line-to-line current, the controller 20 increases the electrical angular rate ω of each of the command voltages Vuc1, Vvc1, and Vwc1.

In contrast, when the zero crossing Φ(I=0) of the target line-to-line current advances with respect to the zero crossing Φ(dI/dt=0) of the amount of change in the target line-to-line current, the controller 20 delays the electrical angular rate ω of each of the command voltages Vuc1, Vvc1, and Vwc1.

Other operations of the control system according to the second embodiment are substantially identical to the operations of the control system 11 according to the first embodiment.

The control system 11 according to the second embodiment is configured to adjust the electrical angular rate ω of each of the command voltages Vuc1, Vvc1, and Vwc1 based on the temporal difference ΔΦ between the zero crossing of a target line-to-line current and that of the amount of change in the target line-to-line current. This achieves, in addition to the first to third effects and the fifth to seventh effects, an eighth effect of properly matching the zero crossing of a target line-to-line current and that of the amount of change in the target line-to-line current.

Third Embodiment

A control system for a motor according to a third embodiment of the present invention will be described hereinafter. The structure of the control system is substantially identical to that of the control system 11 according to the first embodiment except for some differences described hereinafter.

Thus, like reference characters are assigned to like parts in the control systems according to the first and third embodiments, and therefore, descriptions of the structure of control system, except for some differences, according to the third embodiment are simplified or omitted.

The control system according to the third embodiment is specially designed to adjust, in place of the phase φ, the amplitude Vm of each of the command voltages Vuc1, Vvc1, and Vwc1 based on the temporal difference ΔΦ of the phase of a target line-to-line current at the zero crossing Φ(I=0) with respect to the phase of polarity inversion of the amount of change in the target line-to-line current at the zero crossing Φ(dI/dt=0).

Figure 16:
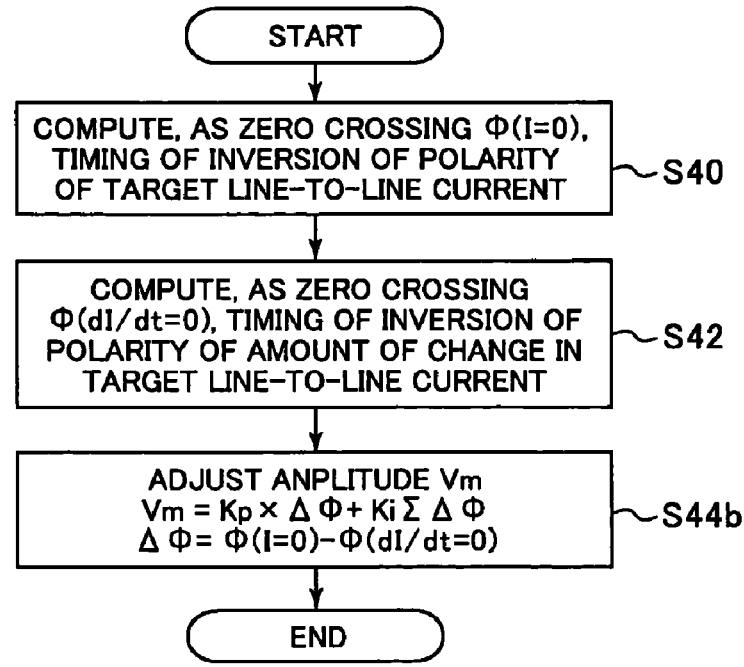
FIG. 16 is a flowchart schematically illustrating an amplitude adjusting routine to be executed by the controller according to a third embodiment of the present invention.

FIG. 16 schematically illustrates an amplitude adjusting routine to be executed by the controller 20. The amplitude adjusting routine is repeatedly executed every predetermined cycle.

Specifically, when starting the amplitude adjusting routine, the controller 20 executes steps S40 and S42 illustrated in FIG. 11.

Next, in step S44b, the controller 20 computes a temporal difference ΔΦ of the phase of the target line-to-line current at the zero crossing Φ(I=0) with respect to the phase of polarity inversion of the amount of change in the target line-to-line current at the zero crossing Φ(dI/dt=0). The temporal difference ΔΦ is expressed by the following equation:

$$\Delta\Phi = \Phi(I=0) - \Phi(dI/dt=0).$$

Then, the controller 20 adjusts, based on the temporal difference ΔΦ, the amplitude Vm of each of the command voltages Vuc1, Vvc1, and Vwc1.

For example, in step S44b, the controller 20 adjusts the amplitude Vm of each of the command voltages Vuc1, Vvc1, and Vwc1 using a proportional gain Kp and an integral gain Ki of a proportional integral feedback algorithm for determination of the amplitude Vm. Specifically, in the proportional integral feedback algorithm, the amplitude Vm is expressed by the following equation:

$$Vm = Kp \times \Delta\Phi + Ki(\Sigma\Delta\Phi)$$

The proportional term "Kp×ΔΦ" contributes to change in the amplitude Vm of each of the command voltages Vuc1, Vvc1, and Vwc1 in proportion to the temporal difference ΔΦ, and the integral term Ki(ΣΔΦ) is proportional to an accumulated offset (ΣΔΦ) of instantaneous values of the temporal difference ΔΦ over time.

Specifically, when the zero crossing Φ(I=0) of the target line-to-line current delays with respect to the zero crossing Φ(dI/dt=0) of the amount of change in the target line-to-line current, the controller 20 increases the amplitude Vm of each of the command voltages Vuc1, Vvc1, and Vwc1.

In contrast, when the zero crossing Φ(I=0) of the target line-to-line current advances with respect to the zero crossing Φ(dI/dt=0) of the amount of change in the target line-to-line current, the controller 20 delays the amplitude Vm of each of the command voltages Vuc1, Vvc1, and Vwc1.

Other operations of the control system according to the third embodiment are substantially identical to the operations of the control system 11 according to the first embodiment.

The control system 11 according to the third embodiment is configured to adjust the amplitude Vm of each of the command voltages Vuc1, Vvc1, and Vwc1 based on the temporal difference ΔΦ between the zero crossing of a target line-to-line current and that of the amount of change in the target line-to-line current. This achieves, in addition to the first to third effects and the fifth to seventh effects, an eighth effect of properly matching the zero crossing of a target line-to-line current and that of the amount of change in the target line-to-line current.

Fourth Embodiment

A control system for a motor according to a fourth embodiment of the present invention will be described hereinafter.

Figure 17:
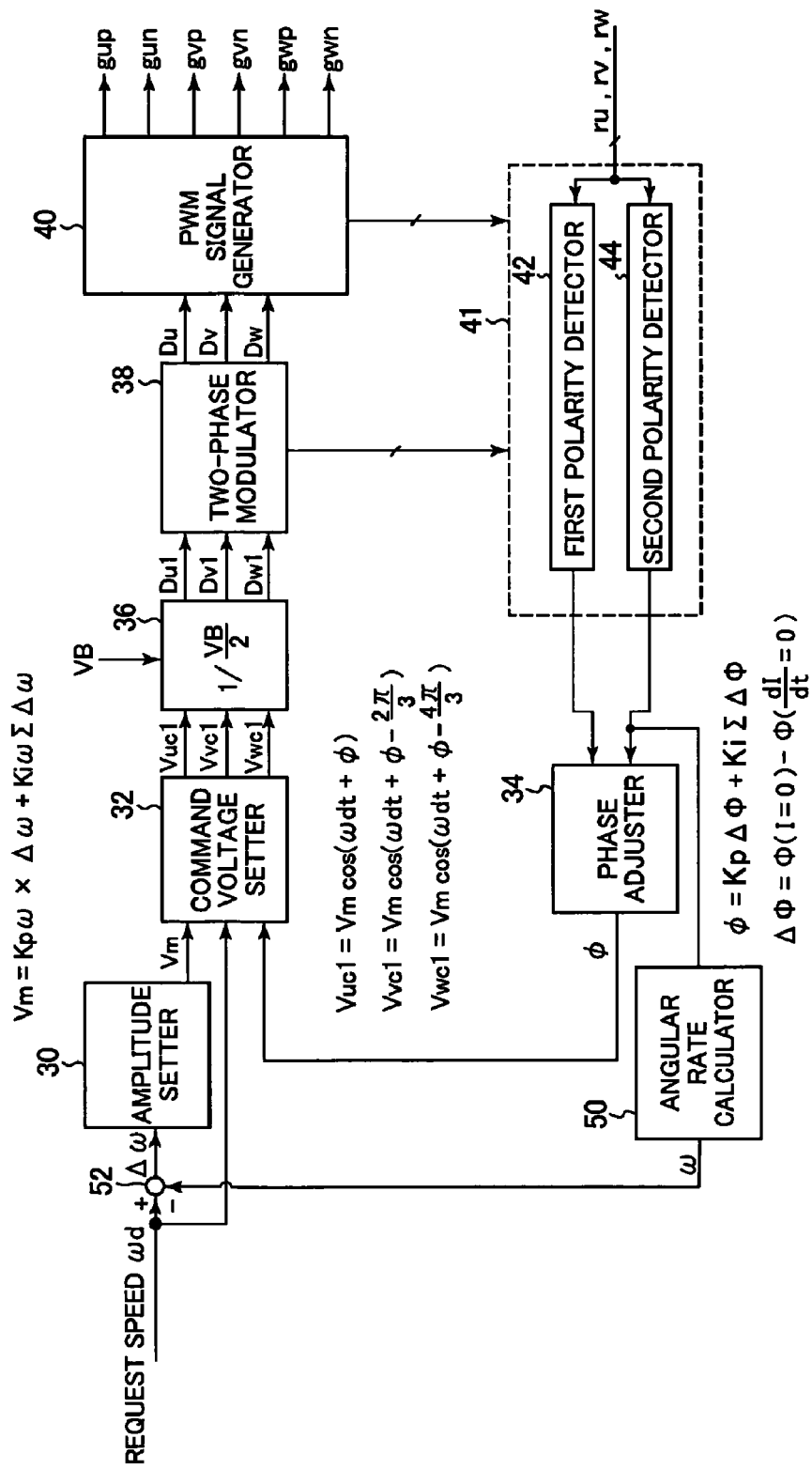
FIG. 17 is a block diagram schematically illustrating functional modules of the controller according to a fourth embodiment of the present invention.

FIG. 17 schematically illustrates functional modules of the controller 20 according to the fourth embodiment.

In addition to the functional modules illustrated in FIG. 2, the controller 20 further includes an angular rate calculator 50 and a rate deviation calculator 52.

The angular rate calculator 50 is operatively connected with the second polarity detector 44 and the rate deviation calculator 52. The angular rate calculator 50 is operative to:

measure a time interval between one zero crossing of the amount of change in one line-to-line current and an alternative zero crossing of the amount of change in an alternative line-to-line current; this alternative zero crossing appears next to the one zero crossing; and calculate the electrical angular rate ω of the rotor of the motor 10 based on the measured time interval.

The rate deviation calculator 52 is operatively connected with an amplitude setter 30a and adapted to calculate the deviation Δω between the request speed ωd and the calculated electrical angular rate ω of the rotor, and pass the calculated deviation Δω to the amplitude setter 30a.

In the fourth embodiment, the amplitude setter 30a works to determine an amplitude Vm of each of a U-phase command voltage Vuc1, a V-phase command voltage Vvc1, and a W-phase command voltage Vwc1 based on the deviation Δω.

Specifically, the amplitude setter 30a adjusts the amplitude Vm of each of the command voltages Vuc1, Vvc1, and Vwc using the proportional gain Kp and the integral gain Ki of the proportional integral feedback algorithm for determination of the amplitude Vm. Specifically, in the proportional integral feedback algorithm, the amplitude Vm is expressed by the following equation:

$$Vm = Kp \times \Delta\omega + Ki(\Sigma\Delta\omega)$$

The proportional term "Kp×Δω" contributes to change in the amplitude Vm of each of the command voltages Vuc1, Vvc1, and Vwc1 in proportion to the deviation Δω, and the integral term Ki(ΣΔω) is proportional to the accumulated offset (ΣΔω) of instantaneous values of the deviation Δω over time.

The remaining structure of the control system according to the fourth embodiment is substantially identical to a corresponding structure of the control system 11 according to the first embodiment. Thus, descriptions of the remaining structure of the control system according to the fourth embodiment are simplified or omitted.

Other operations of the control system according to the fourth embodiment are substantially identical to the operations of the control system 11 according to the first embodiment.

The control system 11 according to the fourth embodiment is configured to:

calculate the electrical angular rate ω of the rotor based on a time interval between one zero crossing of the amount of change in one line-to-line current and an alternative zero crossing of the amount of change in an alternative line-to-line current; and carry out feedback control to match, with the request speed ωd, the electrical angular velocity ω.

The configuration of the control system 11 according to the fourth embodiment achieves, in addition to the first to seventh effects, a tenth effect of properly adjusting the electrical angular velocity ω of the rotor so that it corresponds with the request speed ωd.

The control system 11 according to the fourth embodiment is also configured to adjust the amplitude Vm of each of the command voltages Vuc1, Vvc1, and Vwc1 based on the deviation Δω between the request speed ωd and the calculated electrical angular rate ω of the rotor. This achieves, in addition to the first to the seventh effects, an eleventh effect of easily and properly execute the feedback control of the electrical angular rate of the rotor.

Fifth Embodiment

A control system for a motor according to a fifth embodiment of the present invention will be described hereinafter. The structure of the control system according to the fifth embodiment is substantially identical to that of the control system 11 according to the first embodiment except for some differences.

Thus, like reference characters are assigned to like parts in the control systems according to the first and fifth embodiments, and therefore, descriptions of the structure of control system, except for some differences, according to the fifth embodiment are simplified or omitted.

Figure 18A:
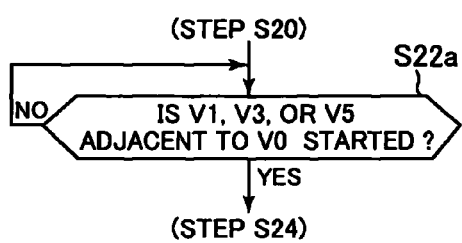
FIG. 18A is a flowchart schematically illustrating a polarity detecting routine according to a fifth embodiment of the present invention.

In the fifth embodiment, in step S22a of the polarity detecting routine, the polarity detecting module 41 determines whether an odd switching mode (V1, V3, or V5) in temporally adjacent to the switching mode V0 is started based on the voltage levels of the drive pulses gun, gvn, and gvwn passed from the PWN signal generator 40 (see FIG. 18A).

Figure 19:
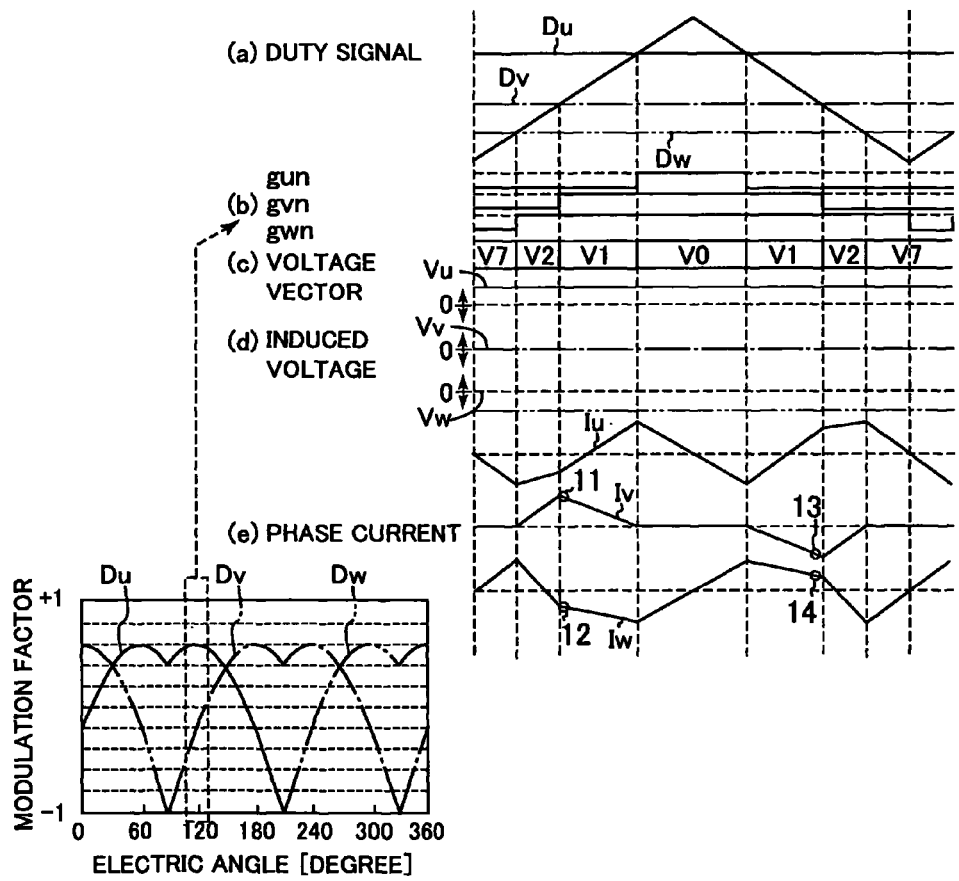
FIG. 19 is a time chart schematically illustrating how to detect a target line-to-line current and an amount of change in the target line-to-line current according to the fifth embodiment.

Referring to FIGS. 6B and 19, in either switching mode V1 temporally adjacent to the switching mode V0, the V- and W-phase windings are short-circuited to the ground level of the negative terminal of the battery 14. Similarly, in one switching mode V3 temporally adjacent to the switching mode V0, the W- and U-phase windings are short-circuited to the ground level of the negative terminal of the battery 14. In either switching mode V5 of the switching mode V0, the U- and V-phase windings are short-circuited to the ground level of the negative terminal of the battery 14.

Figure 18B:
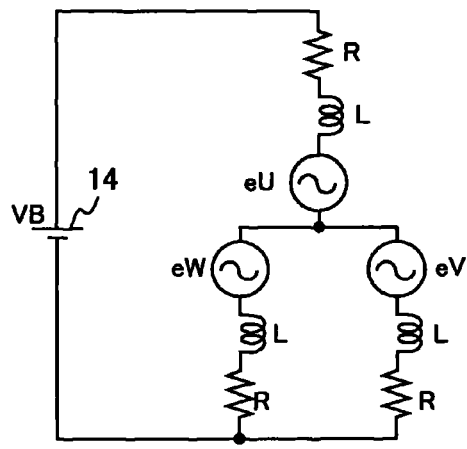
FIG. 18B is a circuit diagram schematically illustrating an equivalent circuit of the motor according to the fifth embodiment.

For example, during either switching mode V1 adjacent to the switching mode V0, an equivalent circuit of the motor 10 is illustrated in is FIG. 18B. The equivalent circuit includes a U-phase winding equivalent circuit consisting of series connected resistance component R, inductance component L, and voltage source of an induced voltage eU in the U-phase winding.

The equivalent circuit also includes a V-phase winding equivalent circuit and a W-phase winding equivalent circuit connected in parallel with each other. The parallel connected V-phase and W-phase winding equivalent circuits are connected in series with the U-phase winding equivalent circuit. The V-phase winding equivalent circuit consists of series connected resistance component R, inductance component L, and voltage source of an induced voltage eV in the V-phase winding. Similarly, the W-phase winding equivalent circuit consists of series connected resistance component R, inductance component L, and voltage source of an induced voltage eW in the W-phase winding.

Specifically, a voltage drop across both ends of the V-phase winding equivalent circuit is equivalent to that across both ends of the W-phase winding equivalent circuit independently of the output voltage VB of the battery 14.

The relationship between the V-phase winding equivalent circuit and W-phase winding equivalent circuit is defined by the following equation:

$$R \times (Iv - Iw) + L(dIv/dt - dIw/dt) + (eV - eW) = 0$$

The equation can be deformed using the V-W line-to-line current Ivw, and the V-W line-to-line induced voltage eVW as follows:

$$R \times Ivw + L(dIvw/dt) + eVW = 0 \quad [d5a]$$

The equation [d5a] is equivalent to the equation [c3]. Similarly, during either switching mode V3 temporally adjacent to the switching mode V0, the following equation is established:

$$R \times Iwu + L(dIwu/dt) + eWU = 0 \quad [d5b]$$

During either switching mode V5 adjacent to the switching mode V0, the following equation is established;

$$R - Iuv + L(dIuv/dt) + eUV = 0 \quad [d5c]$$

Specifically, as well as the first embodiment, it is possible to calculate a target line-to-line current and the amount of change in the target line-to-line current in either odd switching mode (V1, V3, and V5) adjacent to the switching mode V0 in addition to the switching mode V0.

FIG. 19 schematically illustrates how to detect a target line-to-line current and the amount of change in the target line-to-line current according to the fifth embodiment. Specifically, (a) to (e) of FIG. 19 schematically illustrates how to detect a target line-to-line current at a timing corresponding to an electrical angular position of 120 degrees circled as dashed lines in FIG. 19.

(a) of FIG. 19 schematically illustrates the duty signals Du, Dv, and Dw, (b) of FIG. 19 schematically illustrates a transient of each of the drive pulses gun, gvn, and gwn. (c) of FIG. 19 schematically illustrates changes of voltage vectors, and (d) of FIG. 19 schematically illustrates the U-, V-, and W-phase induced voltages Vu, Vv, and Vw. (e) of FIG. 19 schematically illustrates the U-, V-, and W-phase currents Iu, Iv, and Iw.

As illustrated in (e) of FIG. 19, when the determination in step S22a is affirmative, the controller 20 can detect:

values I1 and I2 of the respective V- and W-phase currents Iv and Iw so as to calculate the line-to-line currents I(n−1) and I(n) corresponding to the phase currents Iu and Iw within the duration of the switching mode V1 temporally just before the switching mode V0 (see steps S24 and S26); and values I3 and I4 of the respective V- and W-phase currents Iv and Iw so as to calculate the line-to-line currents I(n−1) and I(n) corresponding to the phase currents Iv and Iw within the duration of the switching mode V1 temporally just after the switching mode V0 (see steps S24 and S26).

In other words, in the fifth embodiment, the controller 20 can calculate one pair of the phase currents Iu, Iv, and Iw within the duration of successive odd switching modes (V1, V3, or V5) across the switching mode V0. That is, it is possible to establish the duration of the successive odd switching modes (V1, V3, or V5) across the switching mode V0 as a period of time allowed for detection of one pair of the phase currents Iu, Iv, and Iw. This expands the period of time allowed for detection of one pair of the phase currents Iu, Iv, and Iw according to the fifth embodiment as compared with the duration of the switching mode V0 according to the first embodiment.

Note that the duration of the successive odd switching modes (V1, V3, or V5) across the switching mode V0 will be also referred to as "three-successive odd pulse width" hereinafter.

Figure 20:
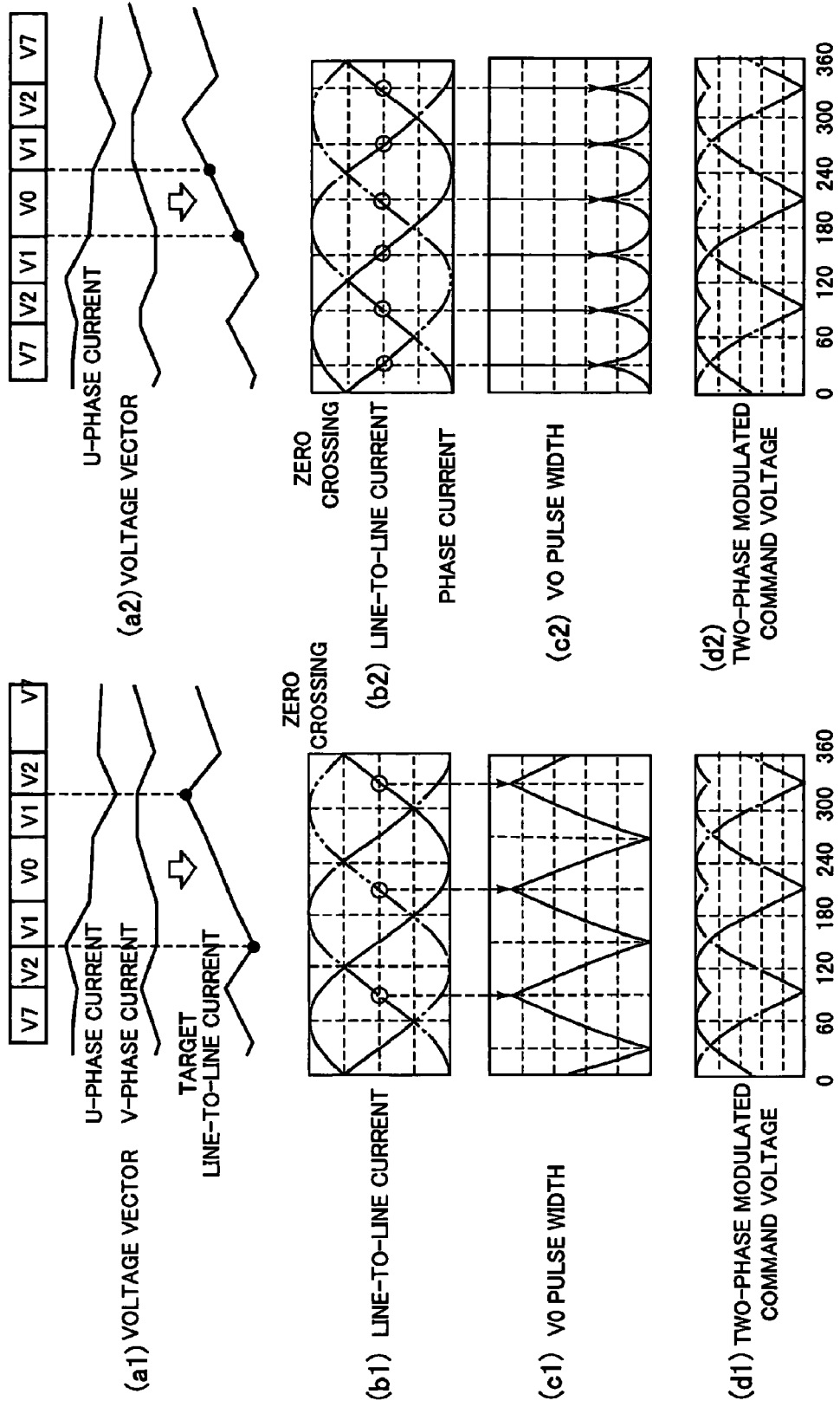
FIG. 20 is a time chart schematically demonstrating a three-successive odd pulse width of two-phase modulated command voltages based on line-to-line currents as compared with the V0 pulse width illustrated in FIG. 14 according to the fifth embodiment.

(a2), (b2), (c2), and (d2) of FIG. 20 illustrate detection of the zero crossings of the line-to-line currents Iuv, Ivw, and Iwu during the switching mode V0 according to the first embodiment as an example of comparison.

In contrast, (a1), (b1), (c1), and (d1) of FIG. 20 illustrate detection of the zero crossings of the line-to-line currents Iuv, Ivw, and Iwu during the duration of successive odd switching modes V1 across the switching mode V0.

As can be apparent from the comparison between (c1), and (c2) of FIG. 20, the control system 11 according to the fifth embodiment expands the length of time (three successive odd pulse width) allowed for reliably detection of the zero crossings of the line-to-line currents and those of the amount of change in the line-to-line currents as compared with the length of time (V0 pulse width) according to the first embodiment.

Note that, in the fifth embodiment, the controller 20 is configured to detect only three zero crossings of the line-to-line currents from negative side to positive side within one period of the electrical angular position of the rotor. That is, when the power factor is about 1, the controller 20 measures three zero crossings of the line-to-line currents and three zero crossings of the amounts of change in the line-to-line currents six times within one period of the electrical angular position of the rotor.

The control system 11 according to the fifth embodiment is configured to measure a target line-to-line current and the amount of change in the target line-to-line current within the duration of successive odd switching modes (V1, V3, or V5) across the switching mode V0. This achieves, in addition to the first to the sixth effects, a twelfth effect of expanding a period of time allowed for detection of one pair of the phase currents Iu, Iv, and Iw as compared with the duration of the switching mode V0 according to the first embodiment.

Sixth Embodiment

A control system for a motor according to a sixth embodiment of the present invention will be described hereinafter. The structure of the control system is substantially identical to that of the control system 11 according to the first embodiment.

Figure 21A:
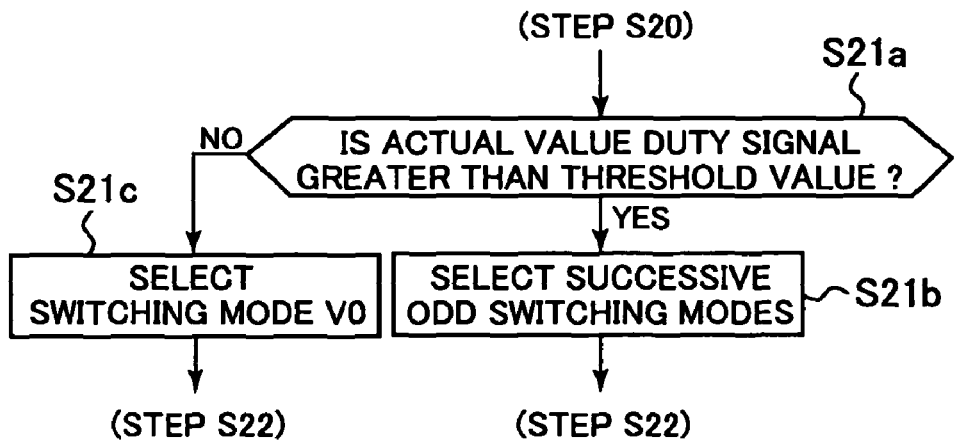
FIG. 21A is a flowchart schematically illustrating a polarity detecting routine to be executed by the controller illustrated in FIG. 1 according to a sixth embodiment of the present invention.

The control system 11 according to the sixth embodiment is specially designed to switch between the switching mode V0 and successive odd switching modes across the switching mode V0 as a period of time allowed for detection of a target line-to-line current and the amount of change therein based on an actual value of a corresponding pair of the duty signals Du, Dv, and Dw (see step S21a in FIG. 21A).

Figure 21B:
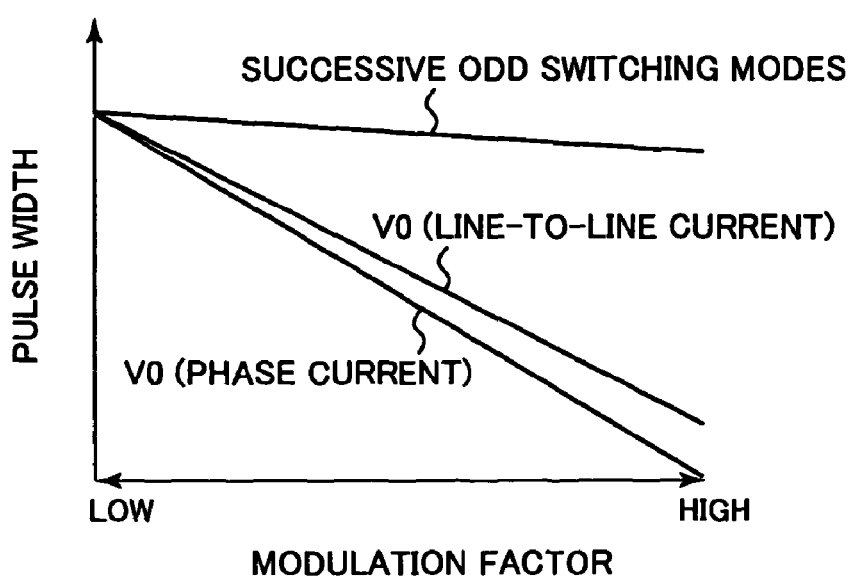
FIG. 21B is a graph schematically illustrating a relationship between a modulation factor and each of a V0 pulse width based on three-phase currents, a V0 pulse width based on three-phase line-to-line currents, and a three-successive odd pulse width according to the sixth embodiment.

This is because the greater the actual value (modulation factor) of a corresponding pair of the duty signals Du, Dv, and Dw is, the shorter the V0 pulse width of a target line-to-line current (see FIG. 21B). Specifically, the V0 pulse width of each of the phase currents is shorter than that of a corresponding one of the line-to-line currents (see (c1) and (c2) of FIG. 14), and the three-successive odd pulse width of each of the line-to-line currents is greater than the V0 pulse width of a corresponding one of them.

On the other hand, the number of detection of zero crossings of the line-to-line currents within one period of the electrical angular position of the rotor within three-successive odd pulse width is halved as compared with the number of detection of zero crossings of the line-to-line currents within one period of the electrical angular position of the rotor within the V0 pulse width.

Thus, in step S21a, when an actual value of a corresponding one pair of the duty signals Du, Dv, and Dw is equal to or greater than a corresponding threshold value (the determination in step S21a is YES), the controller 20 goes to step S21b.

In step S21b, the controller 20 selects successive odd switching modes across the switching mode V0 as a period of time allowed for detection of a target line-to-line current and the amount of change therein. Thereafter, the controller 20 proceeds to step S22 and executes the process in step S22 using the three successive odd pulse width in place of the V0 pulse width.

This maintains the period of time allowed for detection of a target line-to-line current and the amount of change therein even if the modulation factor is equal to or greater than the corresponding threshold value.

Otherwise, when it is determined that the actual value of the corresponding one pair of the duty signals Du, Dv, and Dw is lower than the corresponding threshold value (the determination in step S21a is NO), the controller 20 proceeds to step S21c.

In step S21c, the controller 20 selects the switching mode V0 as a period of time allowed for detection of the target line-to-line current and the amount of change therein, proceeding to step S22. This prevents reduction of the number of detection of zero crossings of the line-to-line currents within one period of the electrical angular position of the rotor.

Figure 22A:
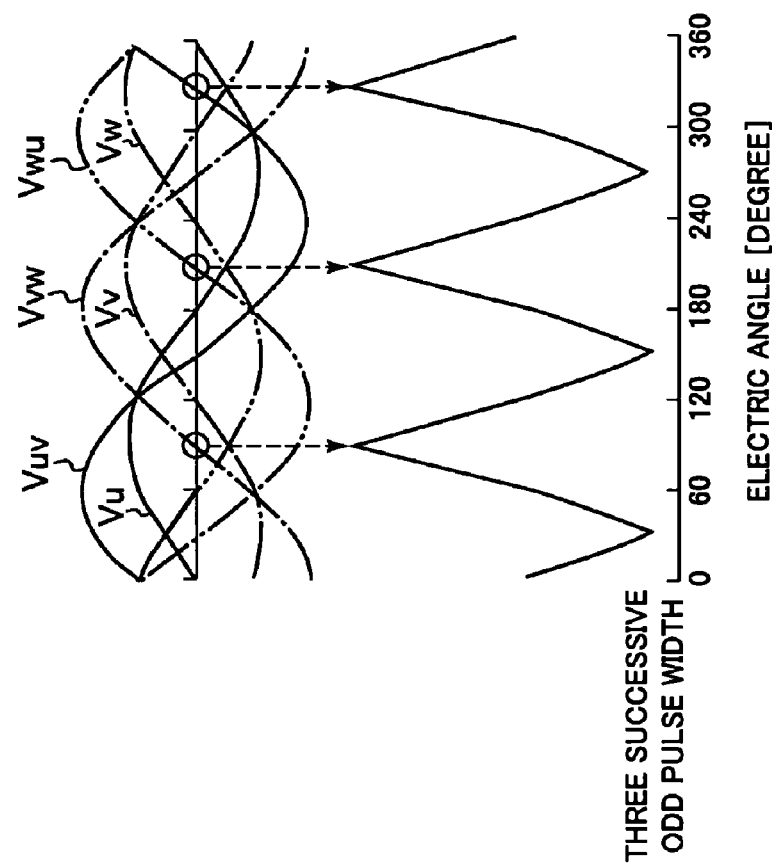
FIG. 22A is a time chart schematically illustrating a relationship between the V0 pulse width and zero crossing of line-to-line induced voltages as a parameter of an electrical angular position of rotation of the rotor according to the sixth embodiment.
Figure 22B:
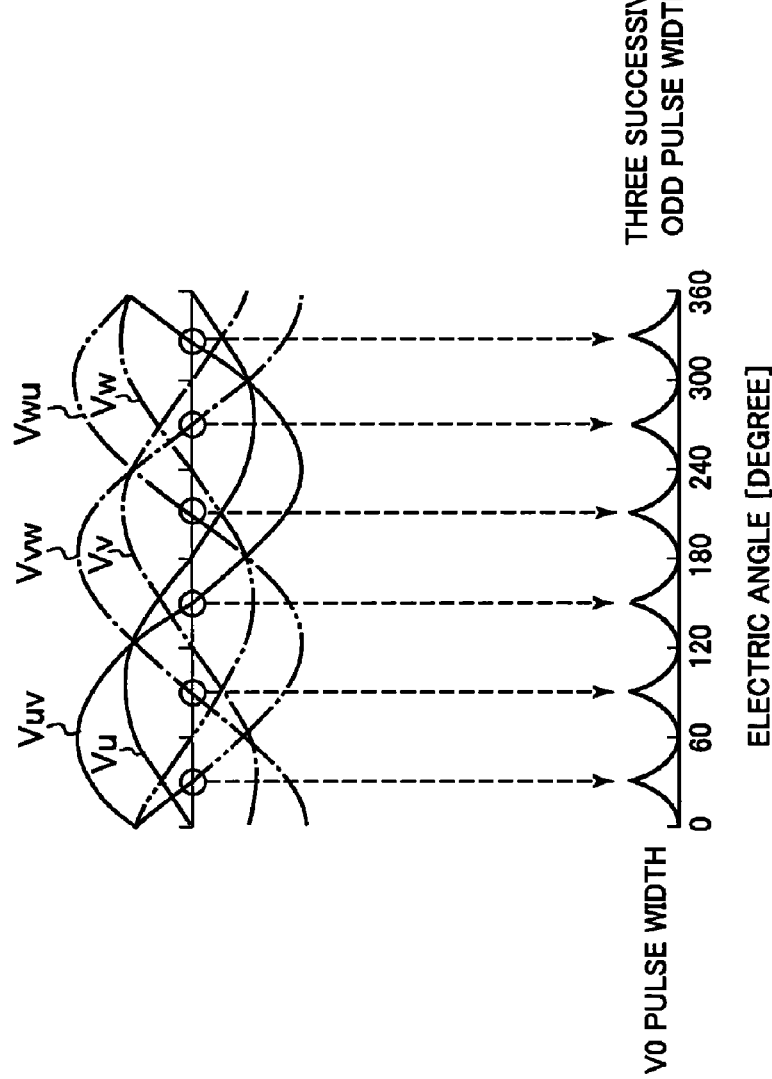
FIG. 22B is a time chart schematically illustrating a relationship between the three-successive odd pulse width and zero crossing of the line-to-line induced voltages as a parameter of the electrical angular position of rotation of the rotor according to the sixth embodiment.

Note that FIG. 22A schematically illustrates a relationship between V0 pulse width and zero crossing of each of the line-to-line induced voltages Vuv, Vvw, and Vwu as a parameter of an electrical angular position of rotation of the rotor. FIG. 22B schematically illustrates a relationship between three-successive odd pulse width and zero crossing of each of the line-to-line induced voltages Vuv, Vvw, and Vwu as a parameter of an electrical angular position of rotation of the rotor. Referring to FIGS. 22A and 22B, the V0 pulse width and the three-successive odd pulse width vary with change in the rotational position of the rotor. Thus, in FIG. 21B, each of the pulse widths of the graphs is detected at the corresponding zero crossing at one rotational position of the rotor.

The control system 11 according to the sixth embodiment is configured to switch between the switching mode V0 and successive odd switching modes across the switching mode V0 as a period of time allowed for detection of a target line-to-line current and the amount of change therein based on an actual value of a corresponding pair of the duty signals Du, Dv, and Dw. This achieves, in addition to the first to the sixth effects, a thirteen effect of maintaining high the accuracy of detecting the zero crossings of the amount of a target line-to-line current and the amount of change therein independently of increase and decrease of the modulation factor.

Seventh Embodiment

A control system for a motor according to a seventh embodiment of the present invention will be described hereinafter.

Figure 23:
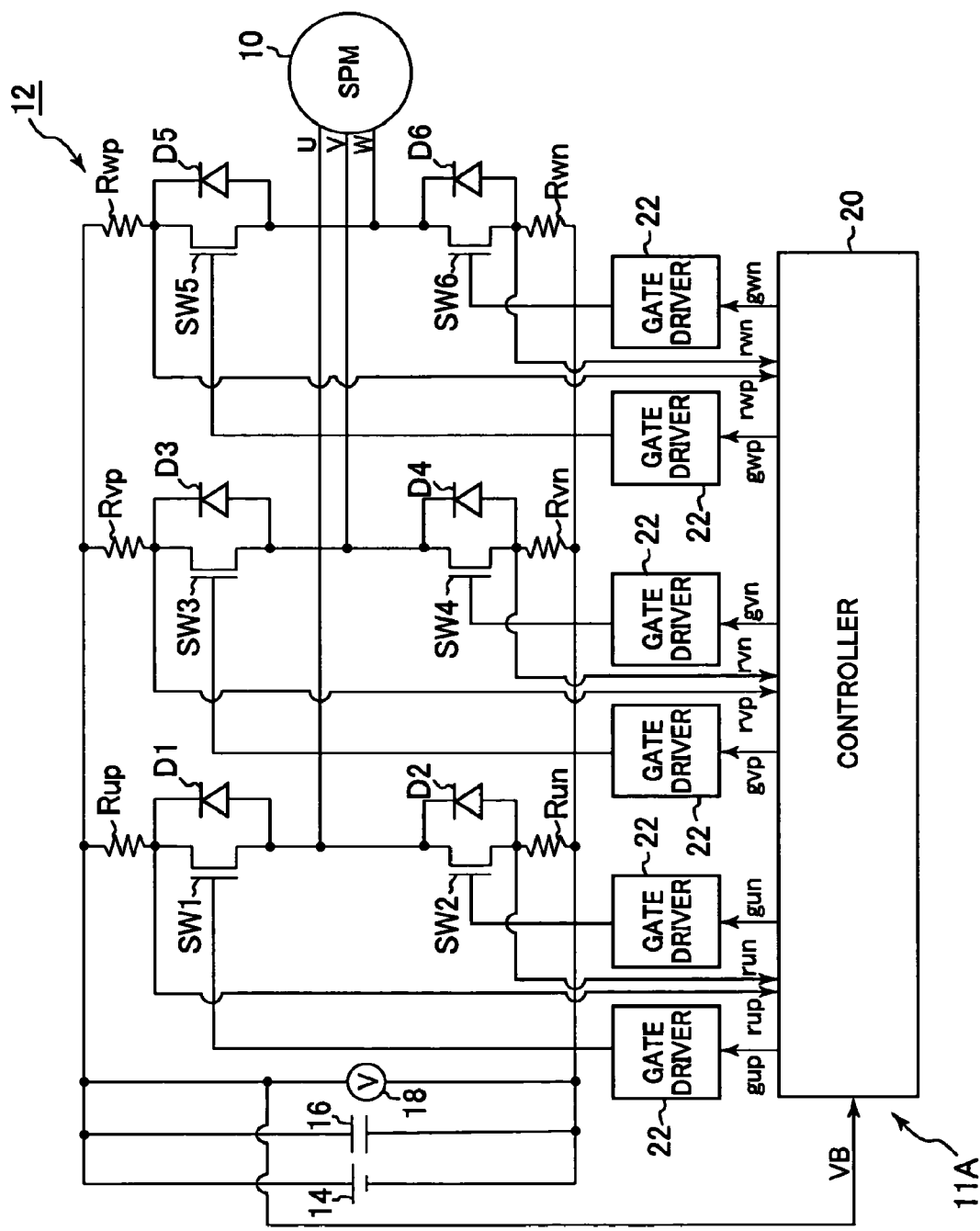
FIG. 23 is a circuit diagram of a control system for a motor according to a seventh embodiment of the present invention.

FIG. 23 schematically illustrates a circuit diagram of a control system 11A according to the seventh embodiment of the present invention. Like reference characters are assigned to like parts in the control systems according to the first and seventh embodiments, and therefore, descriptions of the same parts of the control system according to the seventh embodiment are simplified or omitted.

Specifically, the control system 11A further includes shunt resistors Rup, Rvp, and Rwp. The shunt resistor Rup is connected between the positive terminal of the battery 14 and the switching element SW1 so as to be in series with the switching element SW1 and operative to detect a current flowing through the switching element SW1 or the flywheel diode D1.

The shunt resistor Rvp is connected between the positive terminal of the battery 14 and the switching element SW3 so as to be in series with the switching element SW3 and operative to detect a current flowing through the switching element SW3 or the flywheel diode D3.

The shunt resistor Rwp is connected between the positive terminal of the battery 14 and the switching element SW5 so as to be in series with the switching element SW5 and operative to detect a current flowing through the switching element SW5 or the flywheel diode D5.

The controller 20 is designed to select the amount of voltage drop across each of the shunt resistors Ru, Rv, and Rw or that of voltage drop across each of the shunt resistors Rup, Rvp, and Rwp, and calculate the line-to-line currents and the amount of change in each of them based on the selected amount of voltage drop.

Figure 24:
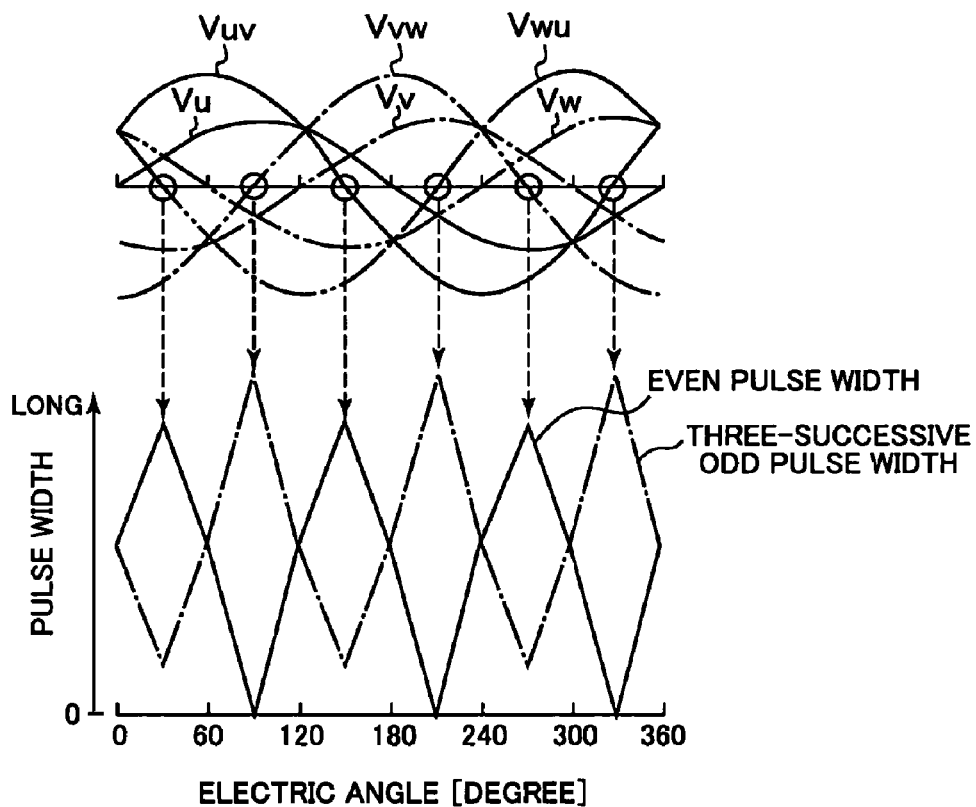
FIG. 24 is a time chart schematically illustrating, as a parameter of an electrical angular position of rotation of the rotor, a relationship between three-successive odd pulse width and zero crossing of line-to-line induced voltages, and a relationship between even pulse width and zero crossing of each of the line-to-line induced voltages according to the seventh embodiment.

FIG. 24 schematically illustrates, as a parameter of an electrical angular position of rotation of the rotor, a relationship between three-successive odd pulse width and zero crossing of each of the line-to-line induced voltages Vuv, Vvw, and Vwu. FIG. 24 also schematically illustrates a relationship between even pulse width (V2, V4, or V6) and zero crossing of each of the line-to-line induced voltages Vuv, Vvw, and Vwu.

FIG. 24 shows that a peak of the three-successive odd pulse width and that of the even pulse width are alternatively switched every rotation of the rotor at an electrical angular position of 60 degrees.

For this reason, in the seventh embodiment, in order to expand a period of time allowed for detection of a target line-to-line current and the amount of change therein as much as possible, the controller 20 is configured to:

select the amount of voltage drop across each of the shunt resistors Ru, Rv, and Rw or the amount of voltage drop across each of the shunt resistors Rup, Rvp, and Rwp depending on change in the electrical angular position of the rotor; and calculate the line-to-line currents and the amount of change in each of them based on the selected amount of voltage drop.

Figure 25:
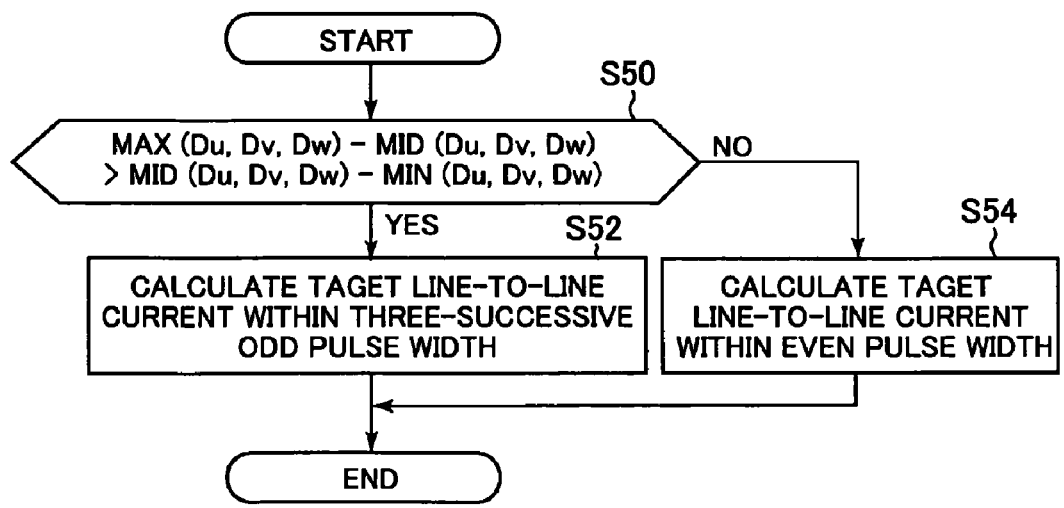
FIG. 25 is a flowchart schematically illustrating a switching routine to be executed by the controller according to the seventh embodiment.

FIG. 25 schematically illustrates such a switching routine to be executed by the controller 20. The routine is repeatedly executed every predetermined cycle.

Specifically, when starting the switching routine, the controller 20 calculates:

a first difference between a maximum one of the duty signals Du1, Dv1, and Dw1 and a median one thereof; and a second difference between the medial one of the duty signals Du1, Dv1, and Dw1 and a minimum one thereof.

Note that selection of a maximum one of "a", "b", and "c" can be given by the function max (a, b, c), and a medical one of "a", "b", and "c" can be given by the function mid (a, b, c).

The controller 20 determines whether the first difference is greater than the second difference in step S50.

The process in step S50 allows determination of whether the three-successive odd pulse width is greater than the even pulse width.

Specifically, as can be apparent from the comparison between FIG. 3 and FIG. 24, the three-successive odd pulse width is greater than the even pulse width at an electrical angular position of the rotor when the first difference is greater than the second difference (for example, an electrical angle of 90 degrees).

When the first difference is greater than the second difference (the determination in step S50 is YES), the controller 20 determines that, at an actual electrical angular position of the rotor, the three-successive odd pulse width is greater than the even pulse width.

Then, the controller 20 selects the amount of voltage drop across each of the shunt resistors Ru, Rv, and Rw. Thereafter, the controller 20 calculates a target line-to-line current and the amount of change in the target line-to-line current based on the selected amount of voltage drop across a corresponding one pair of the shunt resistors Ru, Rv, and Rw within the corresponding three-successive odd pulse width in step S52.

Otherwise when the second difference is equal to or greater than the first difference (the determination in step S50 is NO), the controller 20 determines that, at an actual electrical angular position of the rotor, the even pulse width is greater than the three-successive odd pulse width.

Then, the controller 20 selects the amount of voltage drop across each of the shunt resistors Rup, Rvp, and Rwp. Thereafter, the controller 20 calculates a target line-to-line current and the amount of change in the target line-to-line current based on the selected amount of voltage drop across a corresponding one pair of the shunt resistors Rup, Rvp, and Rwp within the corresponding even pulse width in step S54.

The control system 11 according to the seventh embodiment is configured to:

select the amount of voltage drop across each of the shunt resistors Ru, Rv, and Rw or that of voltage drop across each of the shunt resistors Rup, Rvp, and Rwp depending on change in the rotational position of the rotor; and calculate the line-to-line currents and the amount of change in each of them based on the selected amount of voltage drop. This achieves, in addition to the first to the sixth effects, a fourteen effect of ensuring proper period of time allowed for detection of a target line-to-line current and the amount of change in the target line-to-line current.

Eighth Embodiment

A control system for a motor according to an eighth embodiment of the present invention will be described hereinafter. The structure of the control system is substantially identical to that of the control system 11 according to the seventh embodiment except for some differences described hereinafter.

In the eighth embodiment, the controller 11 is configured to:

select the amount of voltage drop across each of the shunt resistors Ru, Rv, and Rw or that of voltage drop across each of the shunt resistors Rup, Rvp, and Rwp;

select a first two-phase modulation routine or a second two-phase modulation routine based on the result of the voltage-drop selection; and calculate the line-to-line currents and the amount of change in each of them based on the selected amount of voltage drop.

Figure 26:
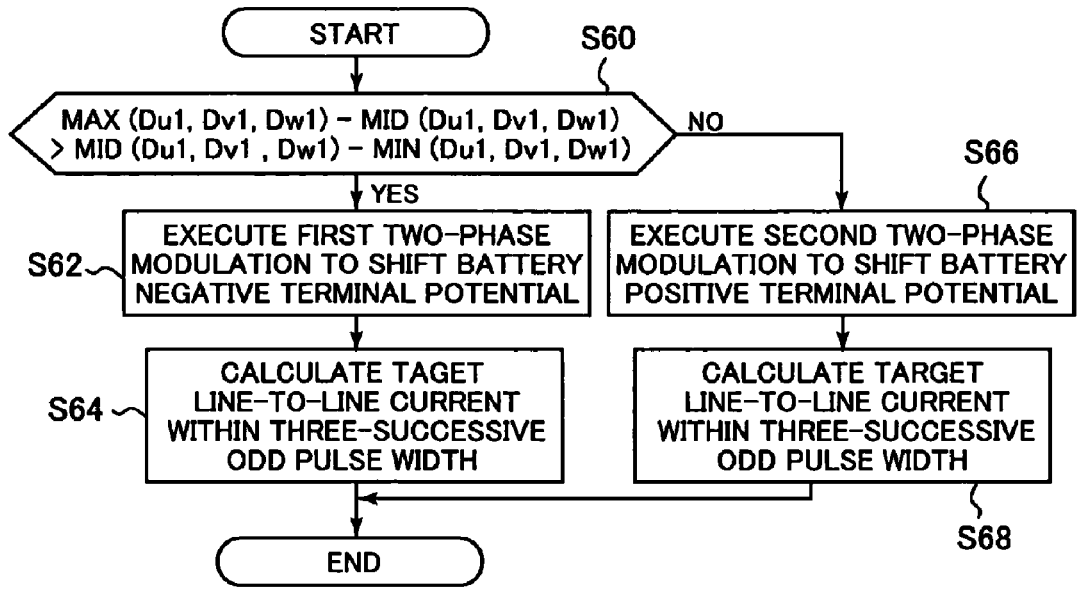
FIG. 26 is a flowchart schematically illustrating a switching routine to be executed by the controller according to an eighth embodiment of the present invention.

FIG. 26 schematically illustrates such a switching routine to be executed by the controller 20. The routine is repeatedly executed every predetermined cycle.

Specifically, when starting the switching routine, the controller 20 calculates:

a first difference between a maximum one of the duty signals Du1, Dv1, and Dw1 and a median value thereof; and a second difference between the medial one of the duty signals Du1, Dv1, and Dw1 and a minimum one thereof.

The controller 20 determines whether the first difference is greater than the second difference in step S60.

The process in step S60 allows determination of whether the three-successive odd pulse width is greater than the even pulse width.

Specifically, as can be apparent from the comparison between FIG. 3 and FIG. 24, as can be apparent from the comparison between FIG. 3 and FIG. 24, the three-successive odd pulse width is greater than the even pulse width at an electrical angular position of the rotor when the first difference is greater than the second difference (for example, an electrical angle of 90 degrees).

When the first difference is greater than the second difference (the determination in step S60 is YES), the controller 20 determines that, at an actual electrical angular position of the rotor, the three-successive odd pulse width is greater than the even pulse width. Then, the controller 20 proceeds to step S62.

In step S62, the controller 20 executes the first two-phase modulation of the normalized duty signals Du1, Dv1, and Dw1 as illustrated in FIG. 3.

Next, the controller 20 selects the amount of voltage drop across each of the shunt resistors Ru, Rv, and Rw. Thereafter, the controller 20 calculates a target line-to-line current and the amount of change in the target line-to-line current based on the selected amount of voltage drop across a corresponding one pair of the shunt resistors Ru, Rv, and Rw within the corresponding three-successive odd pulse width in step S64.

Otherwise when the second difference is equal to or greater than the first difference (the determination in step S60 is NO), the controller 20 determines that, at an actual electrical angular position of the rotor, the even pulse width is greater than the three-successive odd pulse width. Then, the controller 20 proceeds to step S66.

In step S66, the controller 20 executes the second two-phase modulation of the normalized duty signals Du1, Dv1, and Dw1 so as to match one of the duty signals Du1, Dv1, and Dw1 that is the highest in level therein with the potential of the positive terminal of the battery 14 while holding the difference in voltage among the duty signals Du1, Dv1, and Dw1.

Specifically, in step S66, the controller 20 calculates an offset correction level $\Delta 1$ each of the duty signals Du1, Dv1, and Dw1. The offset correction level $\Delta 1$ represents the deviation of a maximum one of the duty signals Du1, Dv1, and Dw1 in level from the level at the positive terminal of the battery 14 at each electrical angular position of rotation of the rotor.

In other words, the offset correction level $\Delta 1$ represents the deviation of a maximum one of the duty signals Du1, Dv1, and Dw1 in level from "+1". The offset correction level $\Delta 1$ can be given by the following equation "$\Delta = +1 - \max(Du1, Dv1, \text{ and } Dw1)$". The function max (a, b, c) works to output a maximum one of the "a", "b", and "c".

Next, in step S66, the controller 20 adds the calculated offset correction level $\Delta 1$ to each of the duty signals Du1, Dv1, and Dw1 to calculate corrected duty signals Du, Dv, and Dw, and executes the process in step S14 illustrated in FIG. 3, thus obtaining the duty signals Du, Dv, and Dw.

Thereafter, the controller 20 selects the amount of voltage drop across each of the shunt resistors Rup, Rvp, and Rwp. Then, the controller 20 calculates a target line-to-line current and the amount of change in the target line-to-line current based on the selected amount of voltage drop across a corresponding one pair of the shunt resistors Rup, Rvp, and Rwp within the duration of corresponding successive even switching modes (V2, V4, or V6) across the switching mode V7 in step S68. The duration of the successive even switching modes (V2, V4, and V6) across the switching mode V7 will be also referred to as "three-successive even pulse width" hereinafter.

The control system 11 according to the eighth embodiment is configured to:

select the amount of voltage drop across each of the shunt resistors Ru, Rv, and Rw or that of voltage drop across each of the shunt resistors Rup, Rvp, and Rwp depending on change in the rotational positions of the rotor; and select the first two-phase modulation or second two-phase modulation based on the selected amount of voltage drop. This achieves, in addition to the effects achieved in the seventh embodiment, a fifteen effect of expanding, to the duration of the three-successive odd pulse width or three-successive even pulse width, a period of time allowed for detection of one pair of the phase currents Iu, Iv, and Iw as compared with the duration of the switching mode V0.

Ninth Embodiment

A control system for a motor according to a ninth embodiment of the present invention will be described hereinafter. The structure of the control system is substantially identical to that of the control system 11 according to the first embodiment except for some differences.

Thus, like reference characters are assigned to like parts in the control systems according to the first and ninth embodiments, and therefore, descriptions of the structure of control system, except for some differences, according to the ninth embodiment are simplified or omitted.

The control system according to the ninth embodiment is specially designed to carry out maximum efficiency control in place of the maximum torque control.

Figure 27:
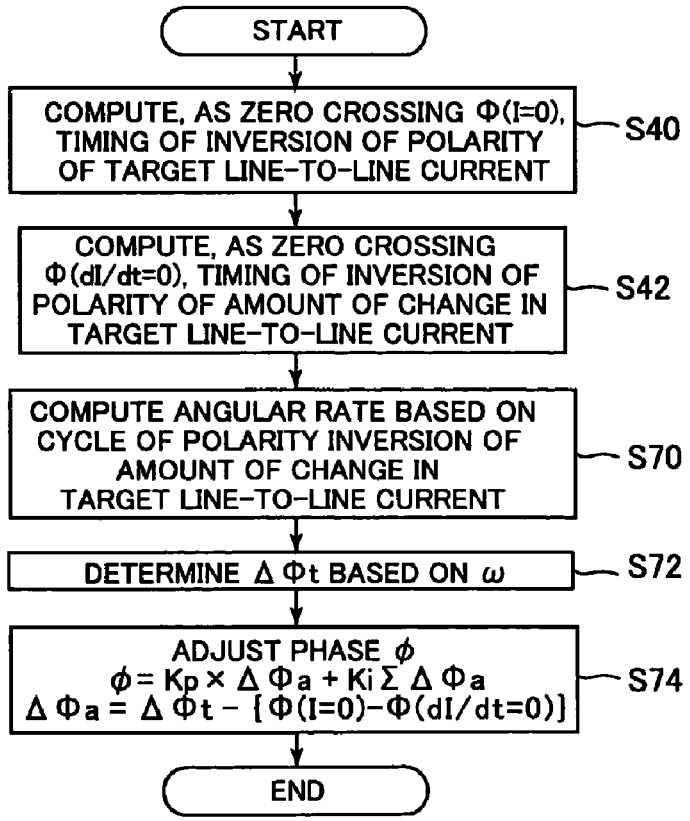
FIG. 27 is a flowchart schematically illustrating a maximum efficiency control routine to be executed by the controller according to a ninth embodiment of the present invention.

FIG. 27 schematically illustrates a maximum efficiency control routine to be executed by the phase adjuster 34 of the controller 20. The maximum efficiency control routine is repeatedly executed every predetermined cycle.

Specifically, when starting the maximum efficiency control routine, the phase adjuster 34 executes steps S40 and S42 illustrated in FIG. 11.

Next, in step S70, the phase adjuster 34 computes the electric angular rate ω of the rotor based on the cycle of the polarity inversion of the amount of change in a target line-to-line current. Thereafter, in step S72, the phase adjuster 34 computes, based on the computed electric angular rate ω, a target temporal difference ΔΦt for the temporal difference ΔΦ.

The process in step S72 determines, as the target temporal difference ΔΦt, a proper phase difference for the maximum efficiency control between the command voltages Vuc1, Vvc1, and Vwc1 and the magnetic flux B of the rotor. Specifically, the temporal difference ΔΦ of the phase of the target line-to-line current at the zero crossing Φ(I=0) with respect to the phase of polarity inversion of the amount of change in the target line-to-line current at the zero crossing Φ(dI/dt=0) varies with change in the electric angular rate ω of the rotor even with the same phase difference between the command voltages Vuc1, Vvc1, and Vwc1 and the magnetic flux B of the rotor.

For this reason, in the ninth embodiment, the phase adjuster 34 determines the target temporal difference ΔΦt based on the calculated electric angular rate ω of the rotor.

Next, in step S74, the phase adjuster 34 adjusts the phase φ of each of the command voltages Vuc1, Vvc1, and Vwc1 using the proportional term Kp and the integral term Ki of the proportional integral feedback algorithm for determination of the phase φ. Specifically, in the proportional integral feedback algorithm, the phase φ is expressed by the following equation:

$$\phi = Kp \times \Delta\Phi a + Ki(\Sigma\Delta\Phi a)$$

where reference character ΔΦa represents a corrected temporal difference defined by the difference between the target temporal difference ΔΦt and the temporal difference ΔΦ given by the following equation:

$$\Delta\Phi a = \Delta\Phi t - \Delta\Phi$$

The proportional term "Kp×ΔΦa" contributes to change in the phase φ of each of the command voltages Vuc1, Vvc1, and Vwc1 in proportion to the corrected temporal difference ΔΦa, and the integral term Ki(ΣΔΦa) is proportional to an accumulated offset (ΣΔΦa) of instantaneous values of the corrected temporal difference ΔΦa over time to reset the accumulated offset (steady-state deviation) over time to zero.

The control system 11 according to the ninth embodiment is configured to determine the target temporal difference ΔΦt for the maximum efficiency control based on the calculated electrical angular rate ω of the rotor. This achieves, in addition to the first to seventh effects, a sixteenth effect of matching, with the target temporal difference ΔΦt, the temporal difference ΔΦ that varies with change in the electrical angular velocity ω of the rotor.

Tenth Embodiment

A control system for a motor according to a tenth embodiment of the present invention will be described hereinafter.

Figure 28:
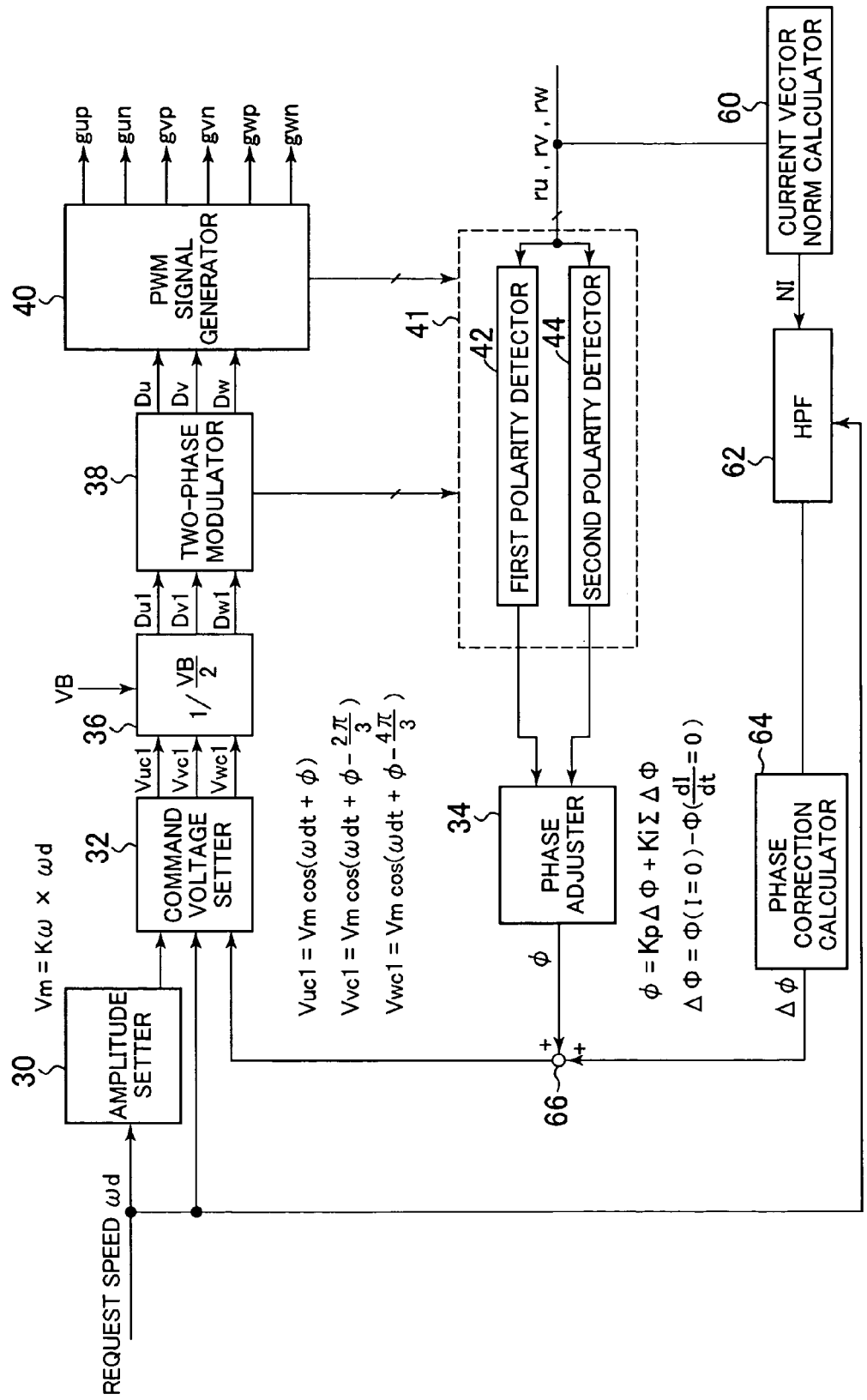
FIG. 28 is a block diagram schematically illustrating functional modules of the controller according to a tenth embodiment of the present invention.

FIG. 28 schematically illustrates functional modules of the controller 20 according to the tenth embodiment.

In addition to the functional modules illustrated in FIG. 2, the controller 20 further includes a current vector norm calculator 60, a high-pass filter 62, a phase correction calculator 64, and a phase corrector 66.

The current vector norm calculator 60 is operatively connected with the first and second polarity detectors 42 and 44 and operative to calculate the length of vectors of currents flowing through the three-phase windings of the motor 10.

In the tenth embodiment, the current vector norm calculator 60 works to calculate an α current component and a β current component on respective α-axis and β-axis of a stationary coordinate system defined in the stator of the motor 10. In the tenth embodiment, the α axis of the stationary coordinate system is defined to coincide with the U-phase current iu in phase, and the β axis is defined to be orthogonal to the α axis.

The current vector norm calculator 60 also works to calculate the length (norm) NI of an α current vector created by the α current component on the α axis and that of a β current vector created by the β current component on the β axis. The calculated current vector norm NI of each of the α current vector and β current vector is passed to the high-pass filter 62 from the current vector norm calculator 60.

The high-pass filter 62 is operatively connected with the phase correction calculator 64 and the request speed input device 75. The high-pass filter 62 works to permit high-frequency components contained in the current vector norm NI of each of the α current vector and β current vector to pass therethrough; these high-frequency components each have a frequency higher than a predetermined threshold frequency equivalent to the electrical angular rate of the rotor. Preferably, the high-pass filter 62 works to adjust the threshold frequency depending on the change in the request speed ωd for the motor 10.

Note that the output of the high-pass filter 62 provides high-frequency components of the change in the amplitude of each of the α current vector and β current vector.

The phase correction calculator 64 is operatively connected with the phase corrector 66. The phase correction calculator 64 works to calculate a correction amount Δφ of phase of each of the command voltages Vuc1, Vvc1, and Vwc1 based on the high-frequency components of the change in the amplitude of each of the α current vector and β current vector.

The phase corrector 66 is operatively connected with the phase adjuster 34, the phase correction calculator 64, and the command voltage setter 32. The phase corrector 66 works to correct the phase φ determined by the phase adjuster 34 based on the correction amount Δφ of phase by, for example, adding the amount Δφ of phase to the phase φ determined by the phase adjuster 34. The corrected phase is passed from the phase corrector 66 to the voltage setter 32 as the phase φ determined by the phase adjuster 32.

The configuration of the phase corrector 66 allows, even within a time interval of the zero crossing of a corresponding one of the line-to-line currents, adjustment of the phase φ of each of the command voltages Vuc1, Vvc1, and Vwc1.

Figure 29:
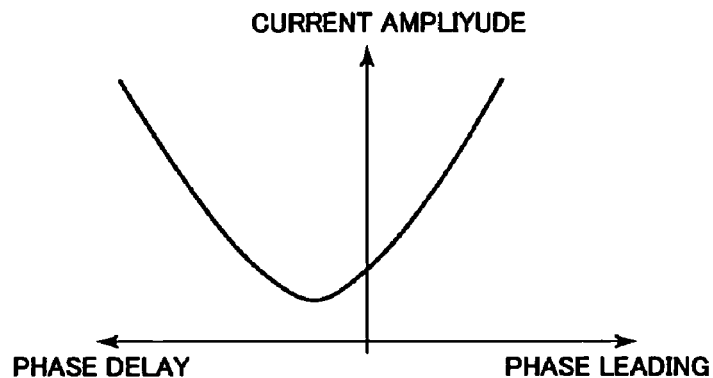
FIG. 29 is a graph of amplitude of current vector versus phase thereof according to the tenth embodiment.

Specifically, referring to FIG. 29, the amplitude of each of the α current vector and β current vector parabolically varies with change in the phase of a corresponding one of the α current vector and β current vector. In the tenth embodiment, information associated with rapid change in the phase of each of the α current component and β current component flowing through the three-phase windings of the motor 10 is included in the output of the high-pass filter 62.

Thus, even if the phase of at least one of the α current component and β current component is rapidly changed, the phase corrector 66 corrects the phase φ of each of the command voltages Vuc1, Vvc1, and Vwc1 based on the information passed from the high-pass filter 62 to thereby reduce the rapid change in the phase of at least one of the phase currents flowing through the respective windings of the motor 10.

It is preferable that the threshold frequency of the high-pass filter 62 be determined to such a value as to prevent the adjustment of the phase φ by the phase adjuster 34 from being cancelled by the amount Δφ of phase. This results that high-frequency components caused by the change in the amplitude of at least one of the α current component and β current component will not completely pass through the high-pass filter 62. Accordingly, it is possible to effectively reduce the interference between adjustment of the phase φ and the correction amount Δφ of phase.

The control system 11 according to the tenth embodiment is configured to correct the phase φ of each of the command voltages Vuc1, Vvc1, and Vwc1 based on high-frequency components caused by the change in the amplitude of at least one of the phase currents Iu, Iv, and Iw. This achieves, in addition to the first to seventh effects, a seventeen effect of monitoring the change in the phase of at least one of the phase currents Iu, Iv, and Iw depending on change in the amplitude thereof to thereby adjust the phase φ each of the command voltages Vuc1, Vvc1, and Vwc1 even within a time interval of the zero crossing of a corresponding one of the line-to-line currents.

Eleventh Embodiment

A control system for a motor according to an eleventh embodiment of the present invention will be described hereinafter. The structure of the control system is substantially identical to that of the control system 11 according to the first embodiment except for some differences.

Thus, like reference characters are assigned to like parts in the control systems according to the first and eleventh embodiments, and therefore, descriptions of the structure of control system, except for some differences, according to the eleventh embodiment are simplified or omitted.

Figure 30:
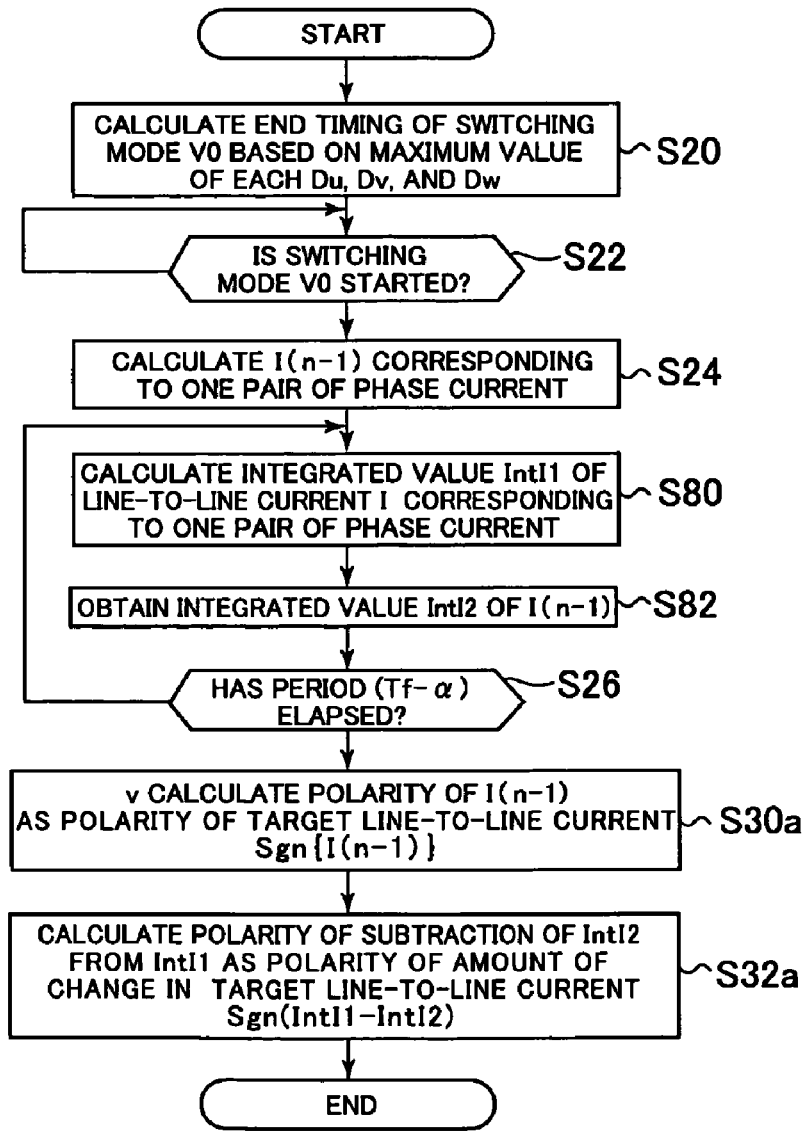
FIG. 30 is a flowchart schematically illustrating a polarity detecting routine to be executed by the controller according to an eleventh embodiment of the present invention.

FIG. 30 schematically illustrates a polarity detecting routine to be executed by the polarity detecting module 41 (first and second polarity detectors 42 and 44) according to the eleventh embodiment. The routine is repeatedly executed every predetermined cycle.

Specifically, when starting the polarity detecting routine, the first polarity detector 42 executes steps S20, S22, and S24 illustrated in FIG. 10. This results that the line-to-line current I(n−1) corresponding to one pair of the phase currents Iu, Iv, and Iw at the start timing of the switching mode V0 is calculated.

Next, in step S80, the first polarity detector 42 integrates the line-to-line current I corresponding to one pair of phase currents Iu, Iv, and Iw over a predetermined time interval until close to the end timing Tf to thereby obtain an integrated value IntI1. Subsequently, the first polarity detector 42 integrates the line-to-line current I(n−1) at the start timing of the switching mode V0 over the predetermined time interval until close to the end timing Tf to thereby obtain an integrated value IntI2 in step S82.

Thereafter, when the period has elapsed since the start timing of the switching mode V0 (the determination in step S26 is YES), the first polarity detector 42 calculates a polarity of the line-to-line current I(n−1) as represented by "sgn {I(n−1)}" in step S30a.

Next, in step S32a, the second polarity detector 44 calculates, as a polarity of the amount of change in the target line-to-line current, a polarity of the subtraction of the integrated value IntI2 from the integrated value IntI1.

The control system 11 according to the eleventh embodiment is configured to determine the polarity of the amount of change in the target line-to-line current based on the subtraction of the product of the line-to-line current I(n−1) and the predetermined time interval from the integrated value IntI1 of the line-to-line current I over the predetermined time interval. This achieves, in addition to the first to seventh effects, an eighteenth effect of limiting the influence of noise components that can enter into a target line-to-line current when the polarity of the amount of change in the target line-to-line current is detected.

Twelfth Embodiment

A control system for a motor according to a twelfth embodiment of the present invention will be described hereinafter. The structure of the control system is substantially identical to that of the control system 11 according to the first embodiment except for some differences.

Thus, like reference characters are assigned to like parts in the control systems according to the first and twelfth embodiments, and therefore, descriptions of the structure of control system, except for some differences, according to the eleventh embodiment are simplified or omitted.

In the twelfth embodiment, the motor 10 is applied to a three-phase rotary electric machine designed to rotate an in-vehicle cooling fan. In this application, as well as each of the first to eleventh embodiments, the control system 11 works to operate in the power running control mode to supply the three-phase AC command voltages Vuc, Vvc, and Vwc to the respective U-, V-, and W-phase windings of the motor 10.

In the twelfth embodiment, when the flow of air acting to the cooling fan increases in velocity with increase in the vehicle speed, external force created by the airflow causes the cooling fan to rotate. In this case, the control system 11 is operating in regenerative control mode to serve the motor 10 as a generator to thereby convert mechanical power based on the rotation of the motor 10 into electrical power.

During the control system 11 operating in the regenerative control mode, even when adjusting the phase φ to reduce the temporal difference ΔΦ between the phase of a target line-to-line current and the amount of change in the target line-to-line current, the control system 11 cannot match the zero crossing of the target line-to-line current with that of the amount of change therein. The reason will be described hereinafter with reference to FIG. 31.

Figure 31:
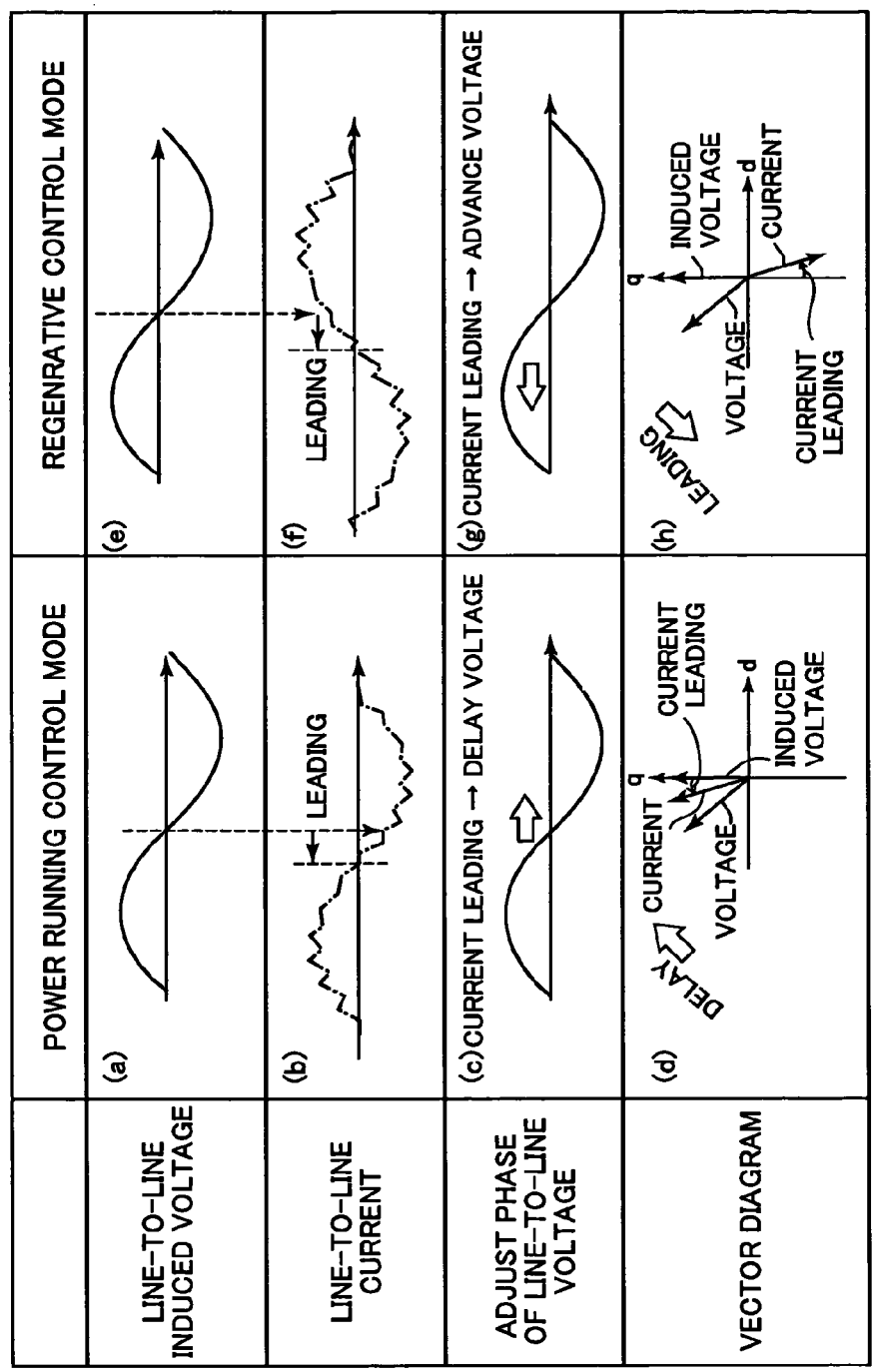
FIG. 31 is a view schematically illustrating how to adjust a phase of a line-to-line voltage in each of power running control mode and regenerative control mode according to a twelfth embodiment of the present invention.

FIG. 31 schematically illustrates the transition of a line-to-line induced voltage in each of the power running control mode and the regenerative control mode. FIG. 31 also schematically illustrates the discrete transition of a line-to-line current corresponding thereto. Note that the behavior of the line-to-line current within the duration of the switching mode V0 is illustrated as solid lines, and that thereof within the duration of another switching mode is illustrated as broken lines.

As illustrated in (a) and (b) of FIG. 31, the relationship between line-to-line induced voltage and line-to-line current in the power running control mode is different from that between line-to-line induced voltage and line-to-line current in the regenerative control mode. In other words, the relationship between line-to-line induced voltage and the amount of change in line-to-line current in the power running control mode is different from that between line-to-line induced voltage and the amount of change in line-to-line current in the regenerative control mode.

For this reason, during the control system 11 operating in the regenerative control mode, even when adjusting the phase φ to reduce the temporal difference ΔΦ between the phase of a target line-to-line current and the amount of change in the target line-to-line current, the control system 11 cannot match the zero crossing of the target line-to-line current with that of the amount of change therein.

Specifically, in the power running control mode, it is assumed that a line-to-line current vector on a d-q coordinate system defined in the rotor of the motor 10 as a rotor coordinate system advances in phase with respect to a corresponding line-to-line induced voltage vector on the d-q coordinate system (see (a), (b), and (d) in FIG. 31).

In this situation, delaying a line-to-line voltage vector corresponding to the line-to-line current vector allows the line-to-line current vector to be in phase with the line-to-line induced voltage vector (see (c) and (d) of FIG. 13).

In contrast, in the regenerative control mode, it is assumed that a line-to-line current vector on the d-q coordinate system advances in phase with respect to a corresponding line-to-line induced voltage vector on the d-q coordinate system (see (e), (f), and (h) in FIG. 31).

In this situation, advancing a line-to-line voltage vector corresponding to the line-to-line current vector allows the line-to-line current vector to be in phase with the line-to-line induced voltage vector (see (g) and (h) of FIG. 31).

For this reason, even if the phase φ of each of the command voltages Vuc1, Vvc1, and Vwc1 is identically adjusted by the controller 20 in both the power running control mode and the regenerative control mode, the maximum torque control cannot be carried out in both the power running control mode and the regenerative control mode.

In order to achieve the maximum torque control in both the power running control mode and the regenerative control mode, the controller 20 is specially designed to:

identify whether its actual control mode is the power running mode or the regenerative mode; and determine how to adjust the phase φ of each of the command voltages Vuc1, Vvc1, and Vwc1 based on the result of the identification.

Specifically, first, a method of identifying whether the controller 20 is operating in the power running mode or the regenerative mode according to the twelfth embodiment will be described hereinafter with reference to FIG. 32.

In the power running control mode, at the falling zero crossing of, for example, the U-V line-to-line induced voltage, the polarity of the remaining one phase current, such as the W-phase current, is negative.

In contrast, in the regenerative control mode, at the falling zero crossing of, for example, the U-V line-to-line induced voltage, the polarity of the remaining one phase current, such as the W-phase current, is positive. When one line-to-line induced voltage is zero crossing, the polarity of the remaining one phase current is reversed between the power running control mode and the regenerative control mode. For this reason, checking the polarity of the remaining one phase current allows identification of whether the control system 11 is operating in the power running control mode or the regenerative control mode.

Note that the twelfth embodiment assumes that the control system 11 drives the motor 10 when the RPM thereof is equal to or higher than a predetermined RPM, in other words, when a line-to-line induced voltage is markedly higher. For this reason, in the relationship of the equation [c3], the term of a line-to-line current can be negligible as compared with the term of a corresponding line-to-line induced voltage. Thus, the polarity of the amount of change in a line-to-line current at or near its zero crossing is probably reversed from that of a corresponding line-to-line induced voltage at or near its zero crossing. For this reason, at the rising or falling zero crossing of a line-to-line current, the controller 20 identifies whether the control system 11 is operating in the power running control mode or regenerative control mode based on the polarity of the remaining phase current.

Figure 33:
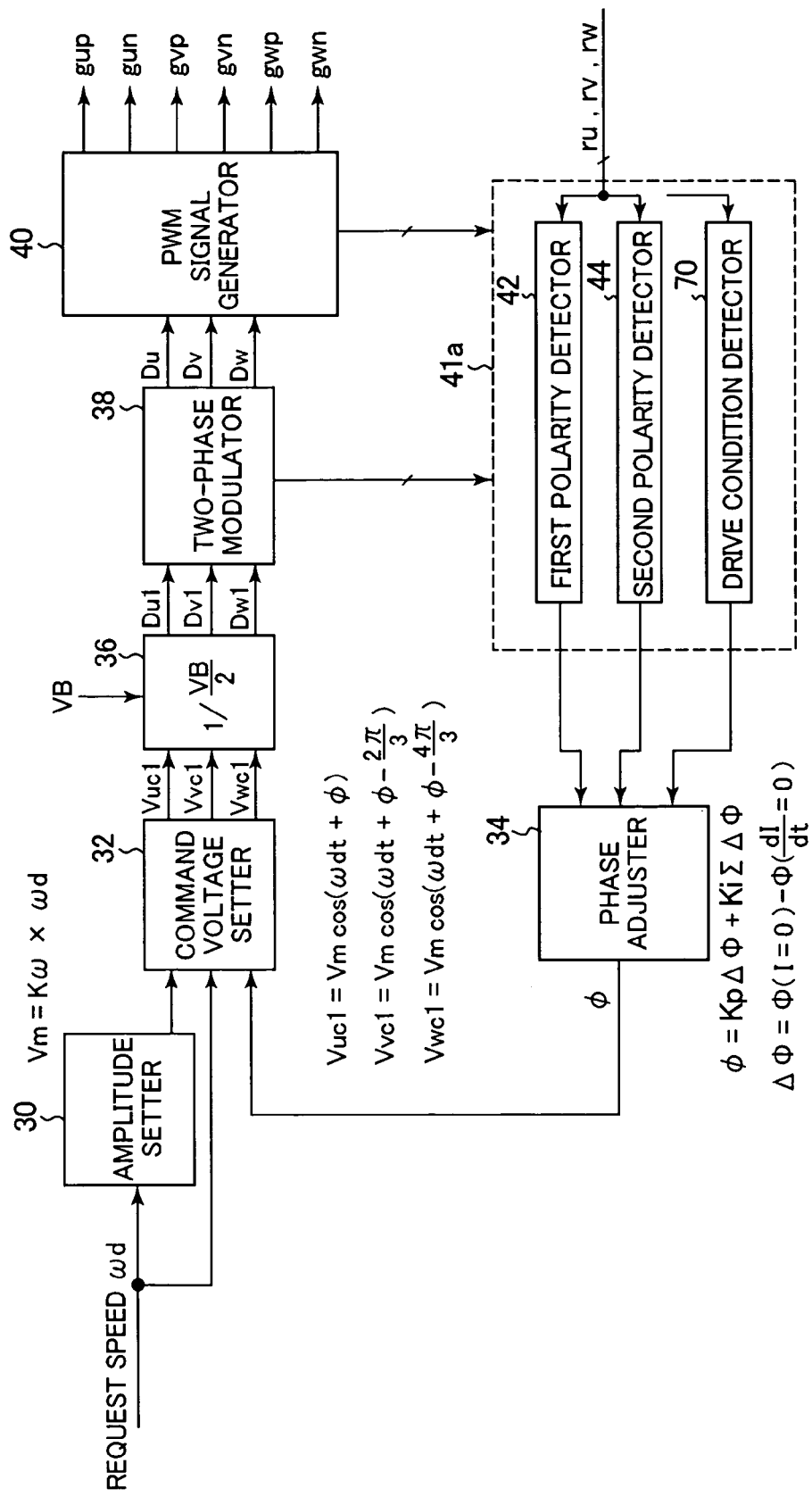
FIG. 33 is a block diagram schematically illustrating functional modules of the controller according to the twelfth embodiment.

FIG. 33 schematically illustrates functional modules of the controller 20 according to the twelfth embodiment.

In addition to the functional modules illustrated in FIG. 2, a polarity detecting module 41a of the controller 20 further includes a drive condition detector 70.

The drive condition detector 70 is operatively connected with the phase adjuster 34 and operative to detect whether the control system 11 is operating in the power running control mode or the regenerative control mode based on the polarity of one phase current determined by the amount ru of voltage drop across the shunt resistor Ru, the amount rv of voltage drop across the shunt resistor Rv, and the amount rw of voltage drop across the shunt resistor Rw.

The phase adjuster 34 is operative to adjust the phase φ of each of the command voltages Vuc1, Vvc1, and Vwc1 based on:

a timing of inversion of the detected polarity of each of the line-to-line currents Iuv, Ivw, and Iwu as the zero crossing thereof;

a timing of inversion of the detected polarity of the amount of change of each of the line-to-line currents Iuv, Ivw, and Iwu as the zero crossing of the amount of change thereof; and the result of the detection of the drive condition detector 70.

Figure 34:
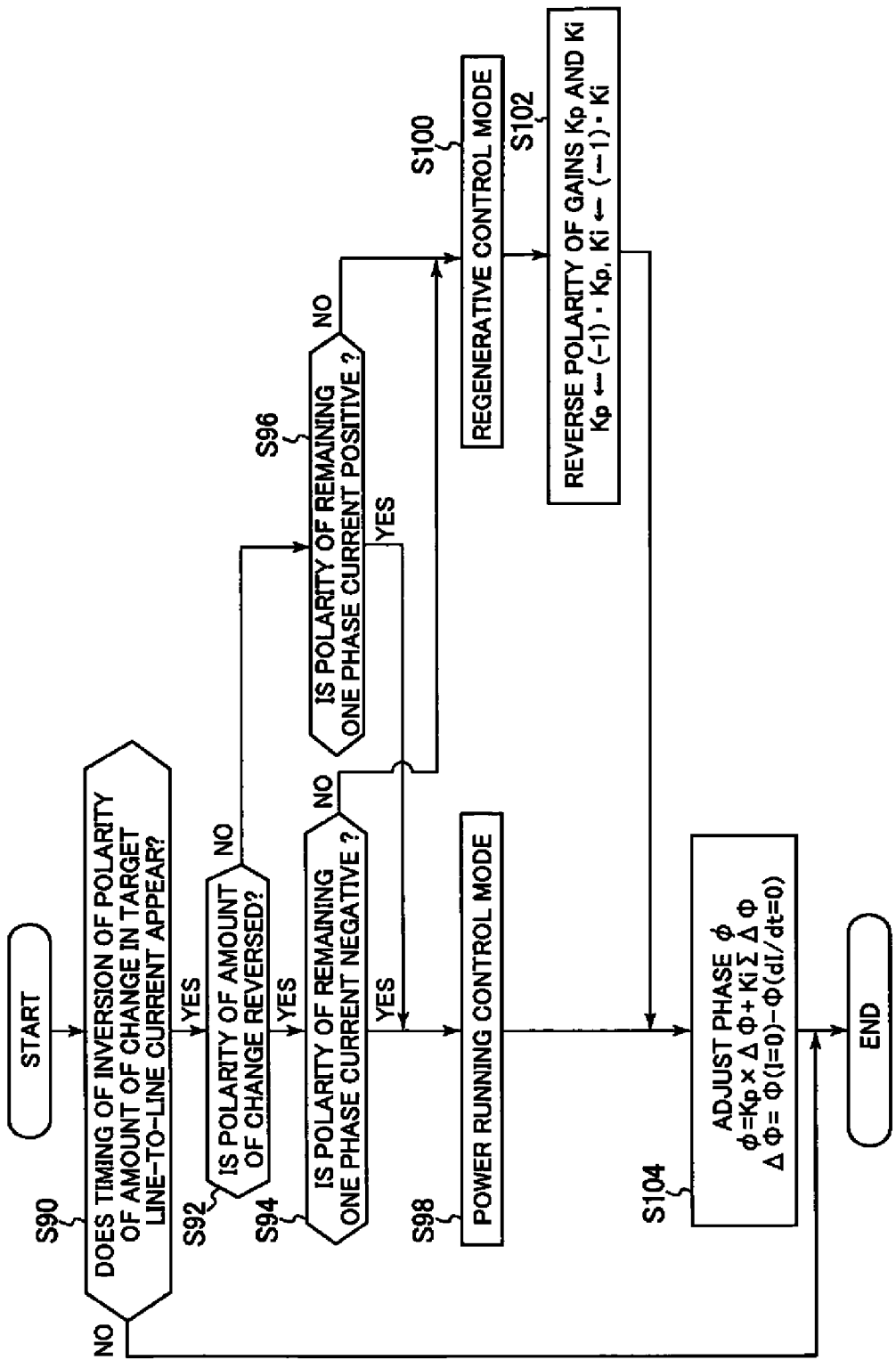
FIG. 34 is a flowchart schematically illustrating a phase adjusting routine to be executed by the controller according to the twelfth embodiment.

FIG. 34 schematically illustrates a phase adjusting routine to be executed by the controller 20 (drive condition detector 70 and the phase adjuster 34) according to the twelfth embodiment. The phase adjusting routine is repeatedly executed every predetermined cycle.

Specifically, when starting the phase adjusting routine, the controller 20 receives the polarity of the target line-to-line current and that of the amount of change therein passed from the first and second polarity detectors 42 and 44 every time the polarity detecting routine is executed by them in step S40.

Next, the controller 20 determines whether a timing of inversion of the received polarity of the amount of change in the target line-to-line current appears in step S90.

When it is determined that a timing of inversion of the received polarity of the amount of change in the target line-to-line current does not appear (the determination in step S90 is NO), the controller 20 terminates the phase adjusting routine.

Otherwise, when it is determined that a timing of inversion of the received polarity of the amount of change in the target line-to-line current appears (the determination in step S90 is YES), the controller 20 proceeds to step S92. In step S92, the controller 20 determines whether the received polarity of the amount of change in the target line-to-line current is reversed from its negative to its positive.

As described above, in the twelfth embodiment, the control system 11 is assumed to drive the motor 10 when the RPM thereof is equal to or higher than the predetermined RPM. For this reason, the zero crossing of the amount of change in a line-to-line current is close to that of a corresponding line-to-line induced voltage, and the polarity of the amount of change in the line-to-line current at or near its zero crossing is probably reversed from that of a corresponding line-to-line induced voltage at or near its zero crossing.

For this reason, the controller 20 can determine whether a line-to-line induced voltage is zero crossing from its positive to its negative based on the polarity of a corresponding line-to-line current before and after its zero crossing.

When it is determined that the received polarity of the amount of change in the target line-to-line current is reversed from its negative to its positive (the determination in step S92 is YES), the controller 20 proceeds to step S94. In step S94, the controller 20 determines whether the polarity of the remaining one phase current is negative.

Otherwise, when it is determined that the received polarity of the amount of change in the target line-to-line current is reversed from its positive to its negative (the determination in step S92 is NO), the controller 20 proceeds to step S96. In step S96, the controller 20 determines whether the polarity of the remaining one phase current is positive.

When it is determined that the polarity of the remaining one phase current is negative in step S94 or that the polarity of the remaining one phase current is positive in step S96, the controller 20 determines that the control system 11 is operating in the power running control mode in step S98. Thereafter, the controller 20 proceeds to step S104.

Otherwise, when it is determined that the polarity of the remaining one phase current is positive in step S94 or that the polarity of the remaining one phase current is negative in step S96, the controller 20 determines that the control system 11 is operating in the regenerative control mode in step S100. After the determination in step S100, the controller 20 reverses the polarity of the proportional gain Kp of the proportional integral feedback algorithm for determination of the phase φ, and the polarity of the integral gain Ki thereof in step S102, proceeding to step S104.

In step S104, the controller 20 computes the phase φ of each of the command voltages Vuc1, Vvc1, and Vwc1 using the proportional gain Kp and the integral gain Ki of the proportional integral feedback algorithm for determination of the phase φ. Specifically, in the proportional integral feedback algorithm, the phase φ is expressed by the following equation:

$$\varphi = Kp \times \Delta\Phi + Ki(\Sigma\Delta\Phi)$$

After completion of the process in step S104, the controller 20 exits the phase adjusting routine.

Figure 35:
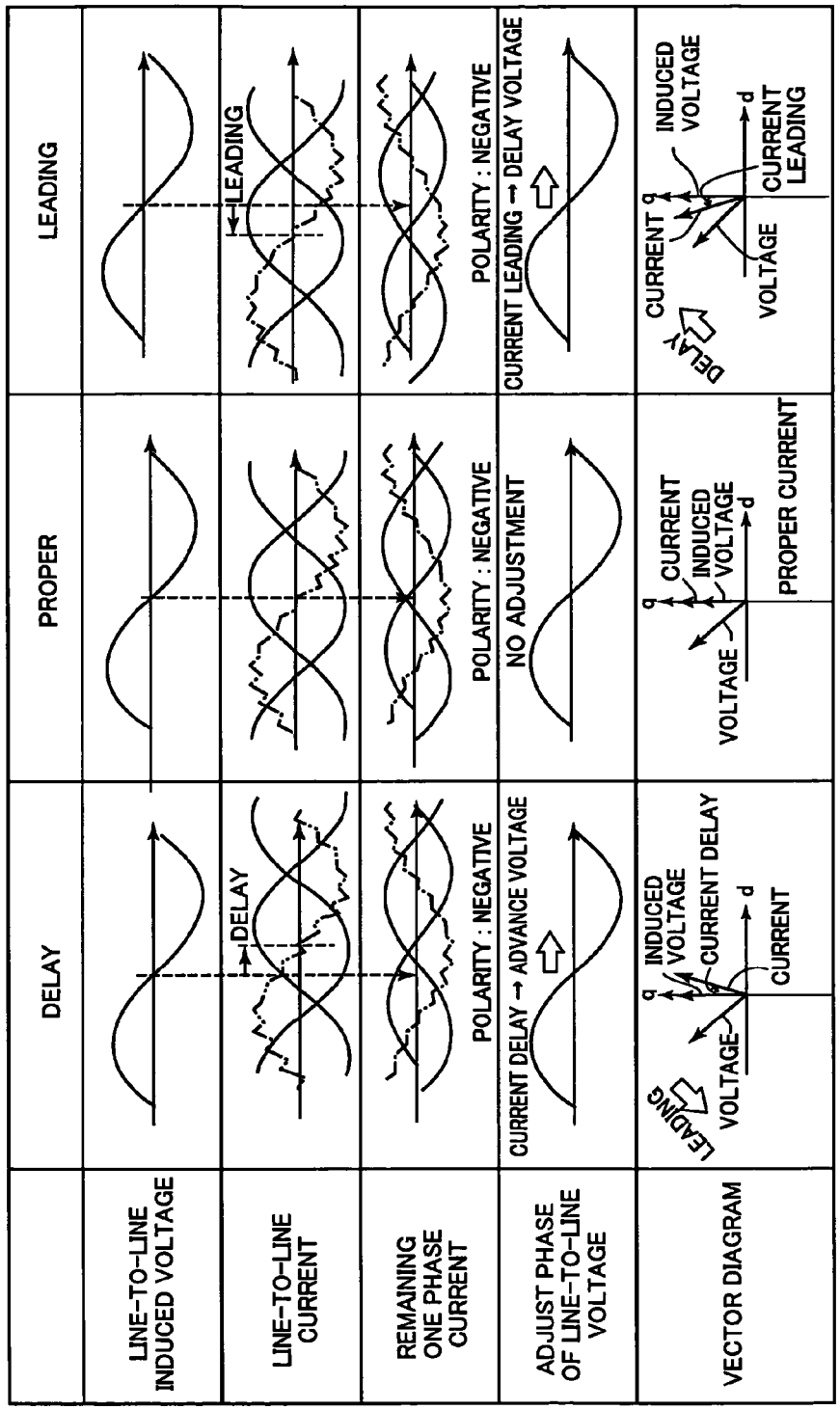
FIG. 35 is a view schematically illustrating examples of adjustment of a phase of each of command voltages in the power running control mode according to the twelfth embodiment.

FIG. 35 schematically illustrates examples of the adjustment of the phase φ of each of the command voltages Vuc1, Vvc1, and Vwc1 in the power running control mode.

When the zero crossing Φ(I=0) of the target line-to-line current delays with respect to the zero crossing Φ(dI/dt=0) of the amount of change in the target line-to-line current, the controller 20 advances the phase φ of each of the command voltages Vuc1, Vvc1, and Vwc1.

In contrast, when the zero crossing Φ(I=0) of the target line-to-line current leads with respect to the zero crossing Φ(dI/dt=0) of the amount of change in the target line-to-line current, the phase adjuster 34 delays the phase φ of each of the command voltages Vuc1, Vvc1, and Vwc1.

Figure 36:
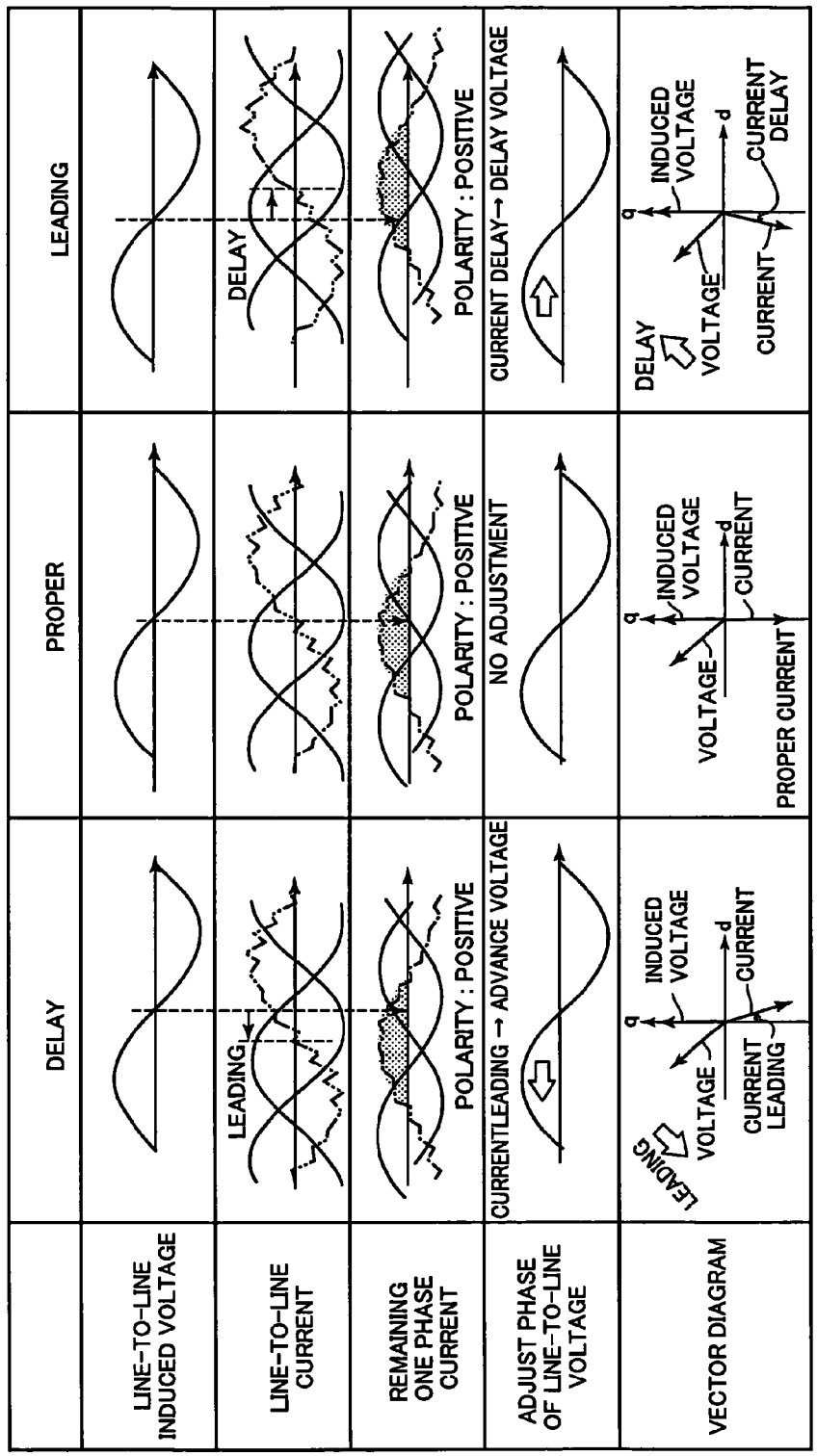
FIG. 36 is a view schematically illustrating examples of adjustment of the phase of each of the command voltages in the regenerative control mode according to the twelfth embodiment.

FIG. 36 schematically illustrates examples of the adjustment of the phase φ of each of the command voltages Vuc1, Vvc1, and Vwc1 in the regenerative control mode.

When the zero crossing Φ(I=0) of the target line-to-line current leads with respect to the zero crossing Φ(dI/dt=0) of the amount of change in the target line-to-line current, the controller 20 advances the phase φ of each of the command voltages Vuc1, Vvc1, and Vwc1.

In contrast, when the zero crossing Φ(I=0) of the target line-to-line current delays with respect to the zero crossing Φ(dI/dt=0) of the amount of change in the target line-to-line current, the phase adjuster 34 delays the phase φ of each of the command voltages Vuc1, Vvc1, and Vwc1.

The control system 11 according to the twelfth embodiment is configured to change the adjustment of the phase φ of each of the command voltages Vuc1, Vvc1, and Vwc1 based on the determination of whether it is operating in the power running control mode or the regenerative control mode. This achieves, in addition to the first to seventh effects, a nineteenth effect of properly adjusting the phase φ of each of the command voltages Vuc1, Vvc1, and Vwc1 in both the power running control mode and the regenerative control mode.

In addition, the control system 11 according to the twelfth embodiment is configured to:

advance the phase φ of each of the command voltages Vuc1, Vvc1, and Vwc1 with delay in the zero crossing of the target line-to-line current with respect to the zero crossing of the amount of change in the target line-to-line current in the power running control mode;

delay the phase φ of each of the command voltages Vuc1, Vvc1, and Vwc1 with delay in the zero crossing of the target line-to-line current with respect to the zero crossing of the amount of change in the target line-to-line current in the regenerative control mode;

delay the phase φ of each of the command voltages Vuc1, Vvc1, and Vwc1 with leading in the zero crossing of the target line-to-line current with respect to the zero crossing of the amount of change in the target line-to-line current in the power running control mode; and advance the phase φ of each of the command voltages Vuc1, Vvc1, and Vwc1 with leading in the zero crossing of the target line-to-line current with respect to the zero crossing of the amount of change in the target line-to-line current in the regenerative control mode.

This achieves, in addition to the first to seventh effects, a twentieth effect of allowing the controller 20 to properly execute the maximum torque control even if the control mode of the control system 11 changes between the power running control mode and regenerative control mode.

The control system 11 according to the twelfth embodiment is configured to determine whether the control system 11 is operating in the power running control mode or the regenerative control mode based on the change in the polarity of the amount of change in a target line-to-line current and the polarity of the remaining one phase current. This achieves, in addition to the first to seventh effects, a twenty-first effect of properly distinguishing between the power running control mode and regenerative control mode.

The control system 11 according to the twelfth embodiment is configured to determine whether the control system 11 is operating in the power running control mode or the regenerative control mode based on the change in the polarity of the amount of change in a target line-to-line current at the zero crossing thereof and the polarity of the remaining one phase current. This achieves, in addition to the first to seventh effects, a twenty-second effect of properly distinguishing between the power running control mode and regenerative control mode.

Thirteenth Embodiment

A control system for a motor according to a thirteenth embodiment of the present invention will be described hereinafter. The structure of the control system is substantially identical to that of the control system 11 according to the twelfth embodiment except for some differences.

Thus, like reference characters are assigned to like parts in the control systems according to the twelfth and eleventh embodiments, and therefore, descriptions of the structure of control system, except for some differences, according to the thirteenth embodiment are simplified or omitted.

Figure 37:
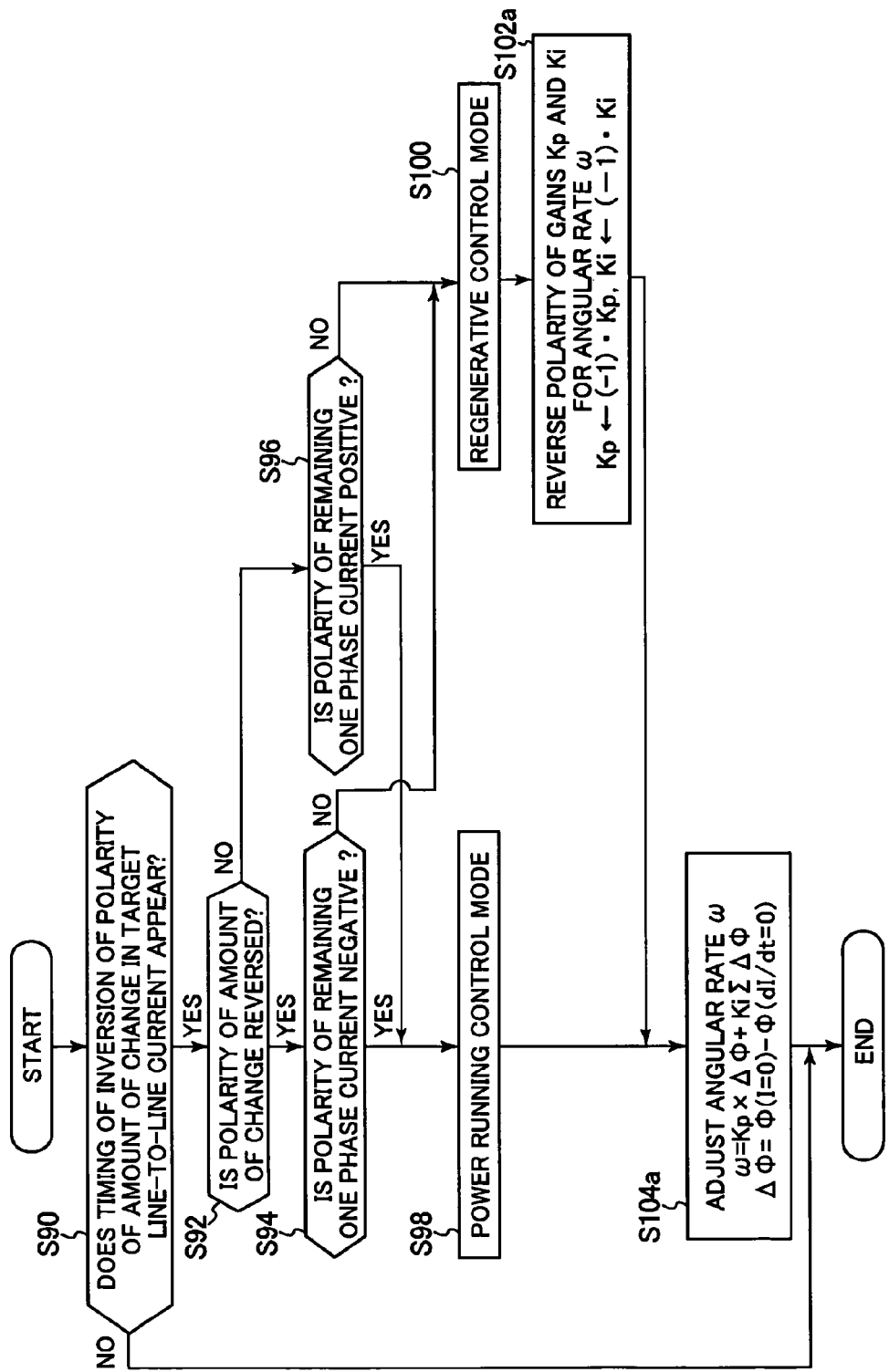
FIG. 37 is a flowchart schematically illustrating angular rate adjusting routine to be executed by the controller according to a thirteenth embodiment of the present invention.

FIG. 37 schematically illustrates angular rate adjusting routine to be executed by the controller 20 according to the thirteenth embodiment. The angular rate adjusting routine is repeatedly executed every predetermined cycle.

Specifically, when starting the angular rate adjusting routine, the controller 20 executes steps S90, S92, S94, S96, S98, and S100 illustrated in FIG. 34.

After the determination in step S100, the controller 20 reverses the polarity of the proportional gain Kp of the proportional integral feedback algorithm for determination of the electrical angular rate ω, and the polarity of the integral gain Ki thereof in step S102a, proceeding to step S104a.

In step S104a, the controller 20 computes the electrical angular rate ω of each of the command voltages Vuc1, Vvc1, and Vwc1 using the proportional gain Kp and the integral gain Ki of the proportional integral feedback algorithm for determination of the electrical angular rate ω. Specifically, in the proportional integral feedback algorithm, the electrical angular rate ω is expressed by the following equation:

$$\omega = Kp \times \Delta\Phi + Ki(\Sigma\Delta\Phi)$$

After completion of the process in step S104a, the controller 20 exits the angular rate adjusting routine.

The control system 11 according to the thirteenth embodiment is configured to:

increase the angular velocity ω of each of the command voltages Vuc1, Vvc1, and Vwc1 with delay in the zero crossing of the target line-to-line current with respect to the zero crossing of the amount of change in the target line-to-line current in the power running control mode;

reduce the angular velocity ω of each of the command voltages Vuc1, Vvc1, and Vwc1 with delay in the zero crossing of the target line-to-line current with respect to the zero crossing of the amount of change in the target line-to-line current in the regenerative control mode;

reduce the angular velocity ω of each of the command voltages Vuc1, Vvc1, and Vwc1 with leading in the zero crossing of the target line-to-line current with respect to the zero crossing of the amount of change in the target line-to-line current in the power running control mode; and increase the angular velocity ω of each of the command voltages Vuc1, Vvc1, and Vwc1 with leading in the zero crossing of the target line-to-line current with respect to the zero crossing of the amount of change in the target line-to-line current in the regenerative control mode.

This achieves the substantially same effects as the second embodiment and twelfth embodiment.

Fourteenth Embodiment

A control system for a motor according to a thirteenth embodiment of the present invention will be described hereinafter. The structure of the control system is substantially identical to that of the control system 11 according to the twelfth embodiment except for some differences.

Thus, like reference characters are assigned to like parts in the control systems according to the twelfth and fourteenth embodiments, and therefore, descriptions of the structure of control system, except for some differences, according to the fourteenth embodiment are simplified or omitted.

Figure 38:
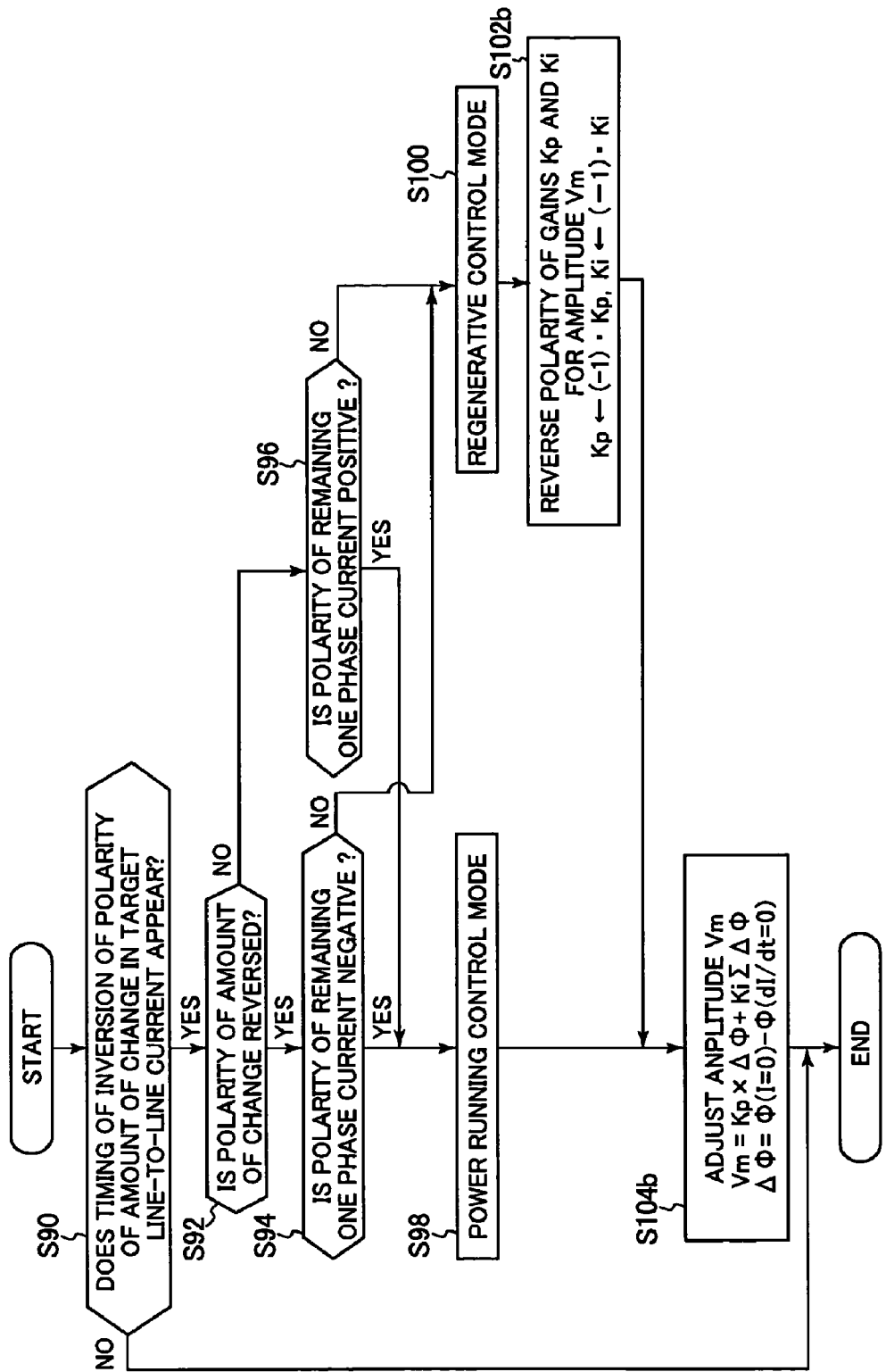
FIG. 38 is a flowchart schematically illustrating amplitude adjusting routine to be executed by the controller according to a fourteenth embodiment of the present invention.

FIG. 38 schematically illustrates amplitude adjusting routine to be executed by the controller 20 according to the fourteenth embodiment. The amplitude adjusting routine is repeatedly executed every predetermined cycle.

Specifically, when starting the amplitude adjusting routine, the controller 20 executes steps S90, S92, S94, S96, S98, and S100 illustrated in FIG. 34.

After the determination in step S100, the controller 20 reverses the polarity of the proportional gain Kp of the proportional integral feedback algorithm for determination of the amplitude Vm, and the polarity of the integral gain Ki thereof in step S102b, proceeding to step S104b.

In step S104b, the controller 20 computes the amplitude Vm of each of the command voltages Vuc1, Vvc1, and Vwc1 using the proportional gain Kp and the integral gain. Ki of the proportional integral feedback algorithm for determination of the amplitude Vm. Specifically, in the proportional integral feedback algorithm, the amplitude Vm is expressed by the following equation:

$$Vm = Kp \times \Delta\Phi + Ki(\Sigma\Delta\Phi)$$

After completion of the process in step S104b, the controller 20 exits the angular rate adjusting routine.

The control system 11 according to the fourteenth embodiment is configured to:

increase the amplitude Vm of each of the command voltages Vuc1, Vvc1, and Vwc1 with delay in the zero crossing of the target line-to-line current with respect to the zero crossing of the amount of change in the target line-to-line current in the power running control mode;

reduce the amplitude Vm of each of the command voltages Vuc1, Vuc1, and Vwc1 with delay in the zero crossing of the target line-to-line current with respect to the zero crossing of the amount of change in the target line-to-line current in the regenerative control mode;

reduce the amplitude Vm ω of each of the command voltages Vuc1, Vvc1, and Vwc1 with leading in the zero crossing of the target line-to-line current with respect to the zero crossing of the amount of change in the target line-to-line current in the power running control mode; and increase the amplitude Vm of each of the command voltages Vuc1, Vvc1, and Vwc1 with leading in the zero crossing of the target line-to-line current with respect to the zero crossing of the amount of change in the target line-to-line current in the regenerative control mode.

This achieves the substantially same effects as the third embodiment and twelfth embodiment.

Fifteenth Embodiment

A control system for a motor according to a thirteenth embodiment of the present invention will be described hereinafter. The structure of the control system is substantially identical to that of the control system 11 according to the twelfth embodiment except for some differences.

Thus, like reference characters are assigned to like parts in the control systems according to the twelfth and fifteenth embodiments, and therefore, descriptions of the structure of control system, except for some differences, according to the fifteenth embodiment are simplified or omitted.

In the fifteenth embodiment, as described in the Japanese Patent Application Publication No. 2005-102350, the controller 20 works to match the zero crossing of a target phase current and that of the amount of change in the target phase current to thereby execute the maximum torque control. In other words, the controller 20 works to match the zero crossing of a target phase current and that of a corresponding phase induced voltage to thereby execute the maximum torque control.

During execution of the maximum torque control according to the fifteenth embodiment, even if the phase φ of each of the command voltages Vuc1, Vvc1, and Vwc1 is identically adjusted by the controller 20 in both the power running control mode and the regenerative control mode, the maximum torque control cannot be carried out in both the power running control mode and the regenerative control mode.

In order to achieve the maximum torque control in both the power running control mode and the regenerative control mode, the controller 20 according to the fifteenth embodiment is specially designed to:

identify whether its actual control mode is the power running mode or the regenerative mode; and determine how to adjust the phase 4 of each of the command voltages Vuc1, Vvc1, and Vwc1 based on the result of the identification.

Figure 39:
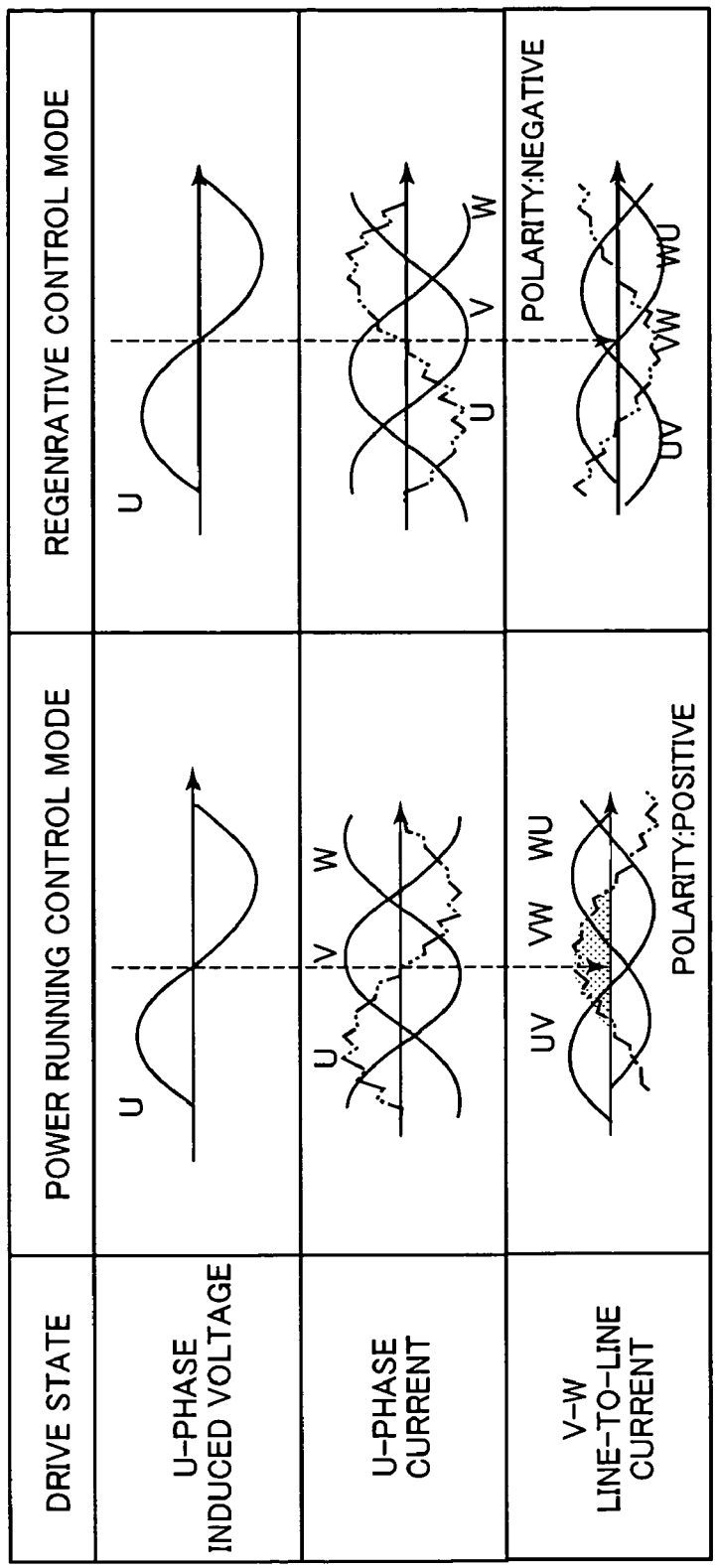
FIG. 39 is a view schematically illustrating a method of identifying whether the controller is operating in the power running mode or the regenerative mode according to a fifteenth embodiment of the present invention.

A method of identifying whether the controller 20 is operating in the power running mode or the regenerative mode according to the fifteenth embodiment will be described hereinafter with reference to FIG. 39.

In the power running control mode, at the falling zero crossing of, for example, the U phase induced voltage, the polarity of a line-to-line current of a pair of the remaining two phase currents (V-phase current and W-phase current) is positive.

In contrast, in the regenerative control mode, at the falling zero crossing of, for example, the U phase induced voltage, the polarity of the line-to-line current of the pair of the remaining two phase currents (V-phase current and W-phase current) is negative.

For the same reason as the twelfth embodiment, the controller 20 identifies whether the control system 11 is operating in the power running control mode or regenerative control mode based on the change in the polarity of the amount of change in a target phase current and the polarity of a line-to-line current based on the remaining two phase currents. Operations of determining the command voltages Vuc1, Vvc1, and Vwc1 based on the result of the identification will be described hereinafter.

Figure 40:
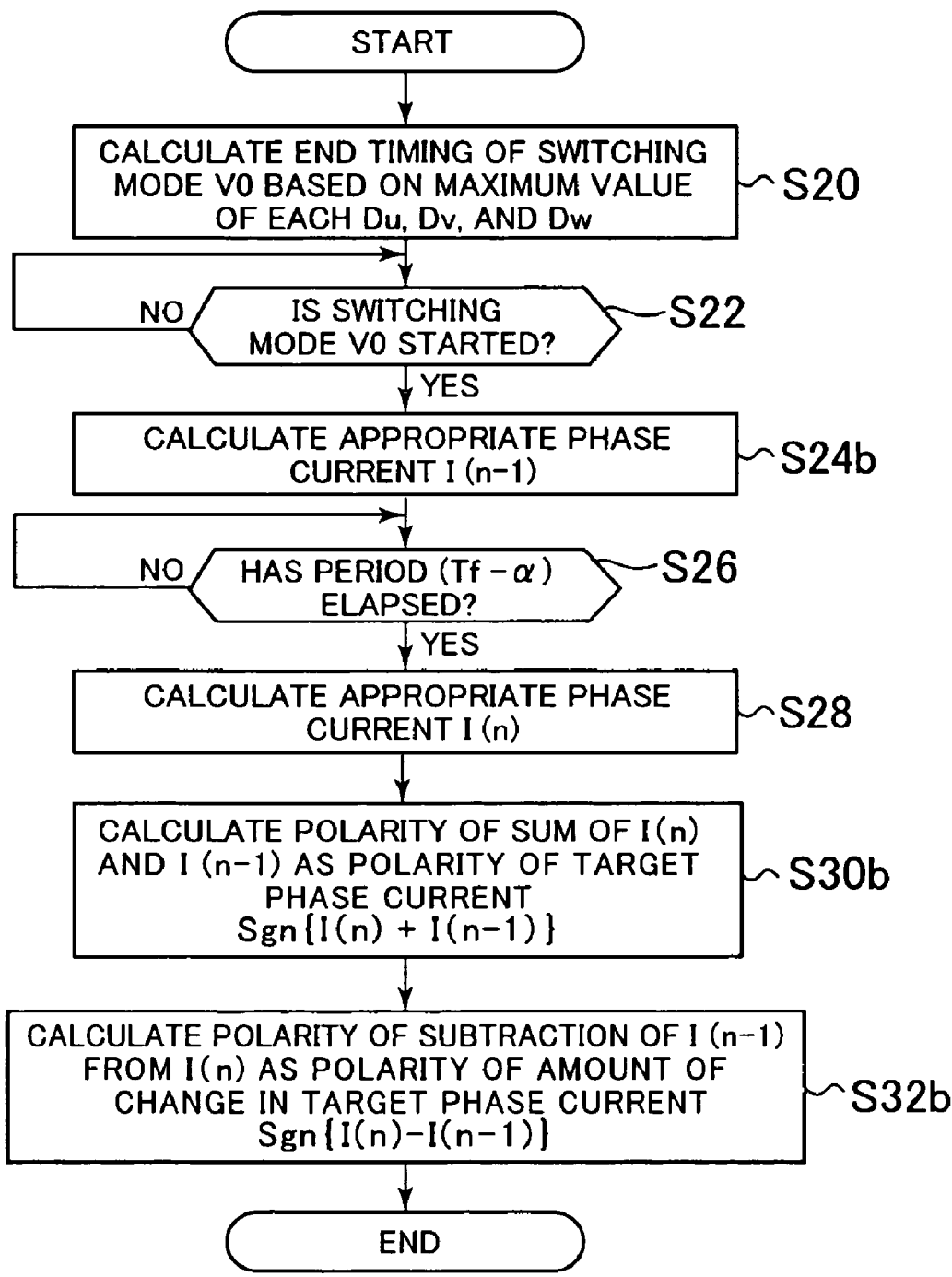
FIG. 40 is a flowchart schematically illustrating a polarity detecting routine to be executed by the controller according to the fifteenth embodiment.

First, a polarity detecting routine to be executed by the polarity detecting module 41 (first and second polarity detectors 42 and 44) according to the fifteenth embodiment will be described with reference to FIG. 40. The routine is repeatedly executed every predetermined cycle.

Specifically, when starting the polarity detecting routine, the first polarity detector 42 executes steps S20 and S22 illustrated in FIG. 10.

When the switching mode V0 is started in step S22, the first polarity detector 42 calculates an alternative phase current I(n−1) in step S24b. Note that an appropriate phase current is switched to an alternative phase current every rotation of the rotor at an electrical angular position of 60 degrees.

As illustrated in (b2) of FIG. 14, zero crossing of one phase current appears in each region of an electrical angular position of 60 degrees; these points of the zero crossings are illustrated in (b2) of FIG. 14 as circles. Specifically, an appropriate phase current is expected to be contained in one region of an electrical angular position of 60 degrees.

After completion of the detection of the one phase current I(n−1), the first polarity detector 42 waits until a period has elapsed since the start timing of the switching mode V0; this period is obtained by subtracting a predetermined period α from a time interval between the start timing of the switching mode V0 and the end timing Tf (NO in the determination of step S26).

When the period has elapsed since the start timing of the switching mode V0 (the determination in step S26 is YES), the first polarity detector 42 calculates the same appropriate phase current I(n) in step S28b. Then, the first polarity detector 42 calculates a polarity of the sum of the phase currents I(n−1) and I(n) as a polarity of a target phase current associated with the zero crossing contained in one region of an electrical angular position of 60 degrees in step S30b. This calculation is given by the following function "sgn {I(n)+I(n−1)}".

In step S32b, the second polarity detector 44 calculates a polarity of the subtraction of the phase current I(n−1) from the phase current I(n) as a polarity of the amount of change in the target phase current. After completion of the process in step S32b, the first polarity detector 42 terminates the polarity detecting routine.

Figure 41:
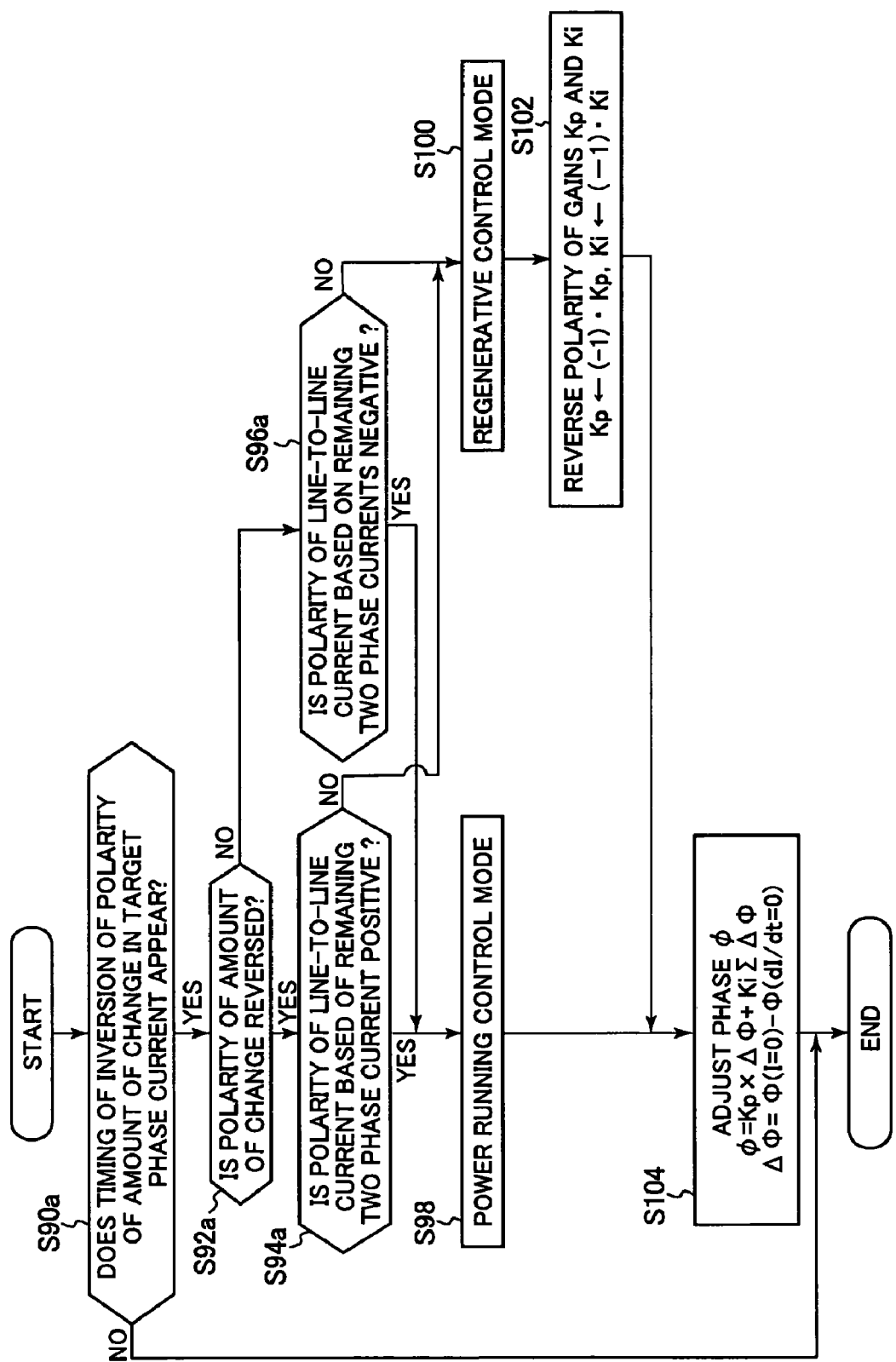
FIG. 41 is a flowchart schematically illustrating a phase adjusting routine to be executed by the controller according to the fifteenth embodiment.

FIG. 41 schematically illustrates a phase adjusting routine to be executed by the controller 20 (drive condition detector 70 and the phase adjuster 34) according to the fifteenth embodiment. The phase adjusting routine is repeatedly executed every predetermined cycle.

Specifically, when starting the phase adjusting routine, the controller 20 receives the polarity of the target phase current and that of the amount of change therein passed from the first and second polarity detectors 42 and 44 every time the polarity detecting routine is executed by them in step S40.

Next, the controller 20 determines whether a timing of inversion of the received polarity of the amount of change in the target phase current appear in step S90a.

When it is determined that a timing of inversion of the received polarity of the amount of change in the target phase current does not appear (the determination in step S90a is NO), the controller 20 terminates the phase adjusting routine.

Otherwise, when it is determined that a timing of inversion of the received polarity of the amount of change in the target phase current appears (the determination in step S90a is YES), the controller 20 proceeds to step S92a. In step S92a, the controller 20 determines whether the received polarity of the amount of change in the target line-to-line current is reversed from its negative to its positive.

When it is determined that the received polarity of the amount of change in the target phase current is reversed from its negative to its positive (the determination in step S92a is YES), the controller 20 proceeds to step S94a. In step S94a, the controller 20 determines whether the polarity of a line-to-line current based on the remaining two phase currents is positive.

Otherwise, when it is determined that the received polarity of the amount of change in the target current is reversed from its positive to its negative (the determination in step S92a is NO), the controller 20 proceeds to step S96a. In step S96a, the controller 20 determines whether the polarity of the line-to-line current based on the remaining two phase currents is negative.

When it is determined that the polarity of the line-to-line current based on the remaining two phase currents is positive in step S94a or that the polarity of the line-to-line current based on the remaining two phase currents is negative in step S96a, the controller 20 determines that the control system 11 is operating in the power running control mode in step S98.

Otherwise, when it is determined that the polarity of the line-to-line current based on the remaining two phase currents is negative in step S94a or that the polarity of the line-to-line current based on the remaining two phase currents is positive in step S96a, the controller 20 determines that the control system 11 is operating in the regenerative control mode in step S100.

Thereafter, as in the case of the twelfth embodiment, the controller 20 executes the processes in steps S102 and S104 to thereby adjust the phase φ of each of the command voltages Vuc1, Vvc1, and Vwc1 in both the power running control mode and the regenerative control mode.

Specifically, the control system 11 according to the fifteenth embodiment is configured to:

advance the phase φ of each of the command voltages Vuc1, Vvc1, and Vwc1 with delay in the zero crossing of the target phase current with respect to the zero crossing of the amount of change in the target phase current in the power running control mode;

delay the phase φ of each of the command voltages Vuc1, Vvc1, and Vwc1 with delay in the zero crossing of the target phase current with respect to the zero crossing of the amount of change in the target phase current in the regenerative control mode;

delay the phase φ of each of the command voltages Vuc1, Vvc1, and Vwc1 with leading in the zero crossing of the target phase current with respect to the zero crossing of the amount of change in the target phase current in the power running control mode; and advance the phase φ of each of the command voltages Vuc1, Vvc1, and Vwc1 with leading in the zero crossing of the target phase current with respect to the zero crossing of the amount of change in the target phase current in the regenerative control mode.

This achieves the substantially same effects as the twelfth embodiment.

Sixteenth Embodiment

A control system for a motor according to a sixteenth embodiment of the present invention will be described hereinafter. The structure of the control system is substantially identical to that of the control system 11 according to the fifteenth embodiment except for some differences.

Thus, like reference characters are assigned to like parts in the control systems according to the fifteenth and sixteenth embodiments, and therefore, descriptions of the structure of control system, except for some differences, according to the sixteenth embodiment are simplified or omitted.

Figure 42:
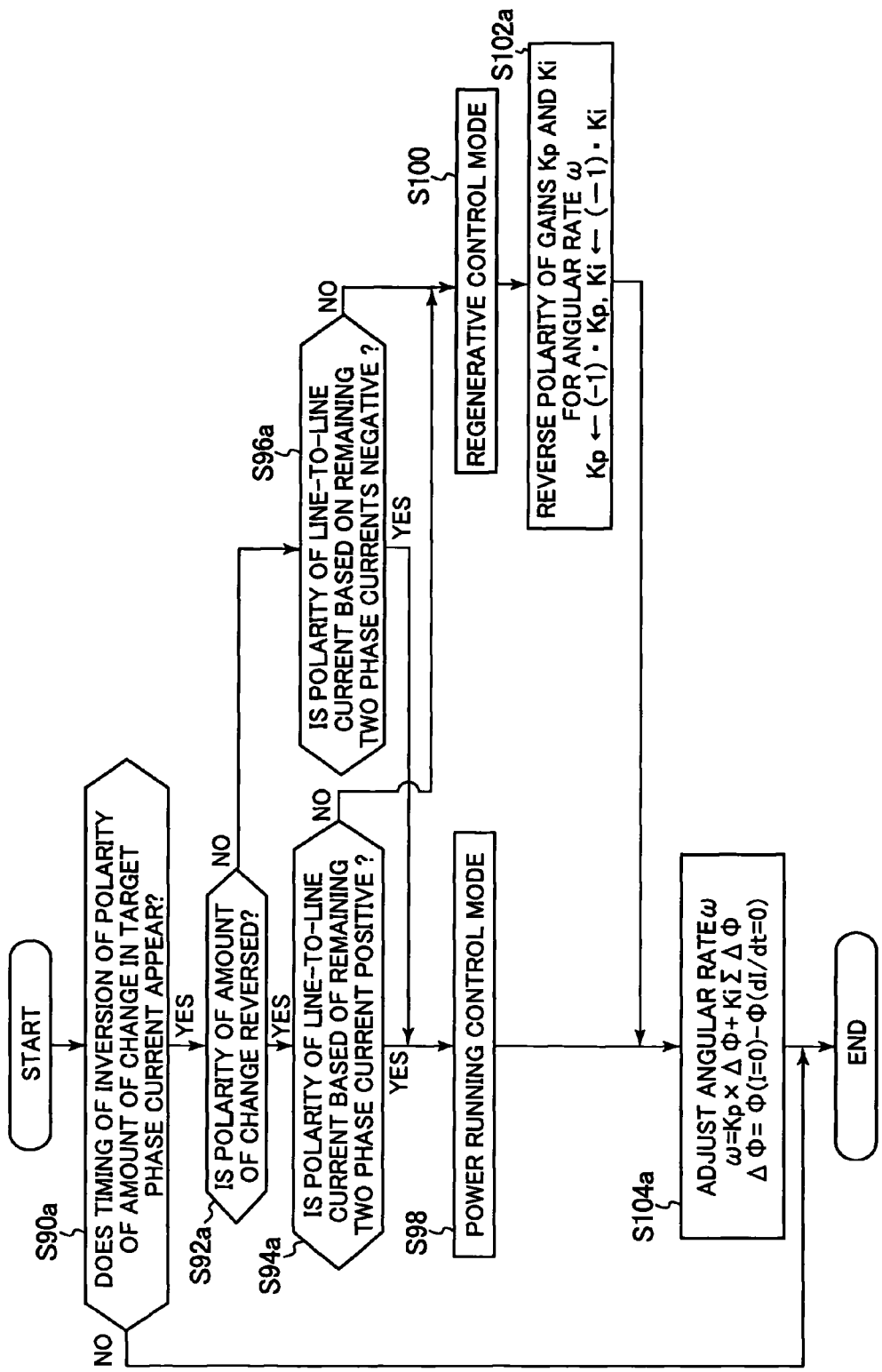
FIG. 42 is a flowchart schematically illustrating an angular rate adjusting routine to be executed by the controller according to a sixteenth embodiment of the present invention.

FIG. 42 schematically illustrates an angular rate adjusting routine to be executed by the controller 20 according to the sixteenth embodiment. The angular rate adjusting routine is repeatedly executed every predetermined cycle.

Specifically, when starting the angular rate adjusting routine, the controller 20 executes steps S90a, S92a, S94a, S96a, S98, and S100 illustrated in FIG. 41.

After the determination in step S100, the controller 20 reverses the polarity of the proportional gain Kp of the proportional integral feedback algorithm for determination of the electrical angular rate ω, and the polarity of the integral gain Ki thereof in step S102a, proceeding to step S104a.

In step S104a, the controller 20 computes the electrical angular rate ω of each of the command voltages Vuc1, Vvc1, and Vwc1 using the proportional gain Kp and the integral gain Ki of the proportional integral feedback algorithm for determination of the electrical angular rate ω. Specifically, in the proportional integral feedback algorithm, the electrical angular rate ω is expressed by the following equation:

$$\omega = Kp \times \Delta\Phi + Ki(\Sigma\Delta\Phi)$$

After completion of the process in step S104a, the controller 20 exits the angular rate adjusting routine.

The control system 11 according to the sixteenth embodiment is configured to:

increase the angular velocity ω of each of the command voltages Vuc1, Vvc1, and Vwc1 with delay in the zero crossing of the target phase current with respect to the zero crossing of the amount of change in the target phase current in the power running control mode;

reduce the angular velocity ω of each of the command voltages Vuc1, Vvc1, and Vwc1 with delay in the zero crossing of the target phase current with respect to the zero crossing of the amount of change in the target phase current in the regenerative control mode;

reduce the angular velocity ω of each of the command voltages Vuc1, Vvc1, and Vwc1 with leading in the zero crossing of the target phase current with respect to the zero crossing of the amount of change in the target phase current in the power running control mode; and increase the angular velocity ω of each of the command voltages Vuc1, Vvc1, and Vwc1 with leading in the zero crossing of the target phase current with respect to the zero crossing of the amount of change in the target phase current in the regenerative control mode.

This achieves the substantially same effects as the thirteenth embodiment.

Seventeenth Embodiment

A control system for a motor according to a seventeenth embodiment of the present invention will be described hereinafter. The structure of the control system is substantially identical to that of the control system 11 according to the fifteenth embodiment except for some differences.

Thus, like reference characters are assigned to like parts in the control systems according to the fifteenth and seventeenth embodiments, and therefore, descriptions of the structure of control system, except for some differences, according to the seventeenth embodiment are simplified or omitted.

Figure 43:
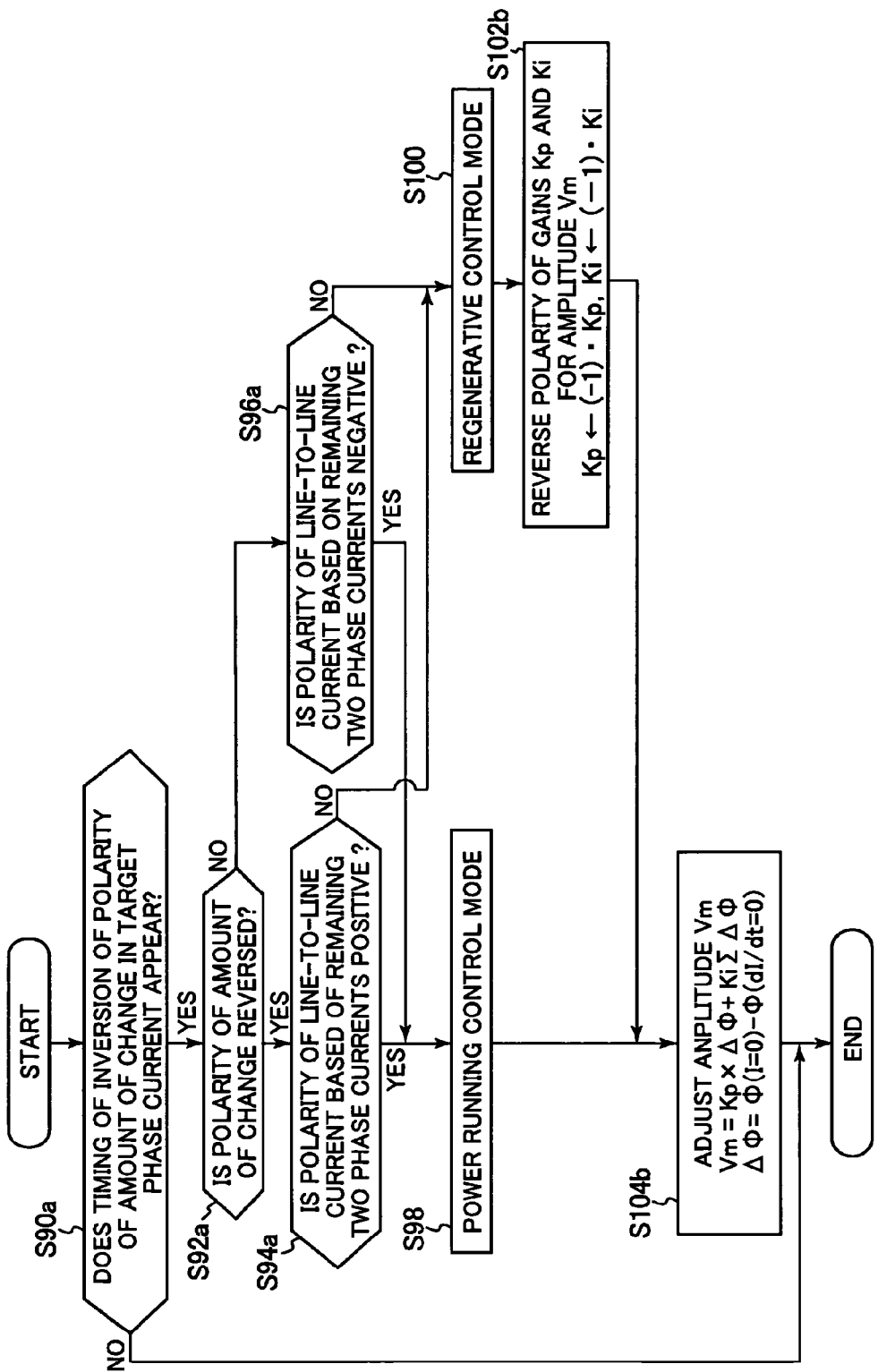
FIG. 43 is a flowchart schematically illustrating an amplitude adjusting routine to be executed by the controller according to a seventeenth embodiment of the present invention.

FIG. 43 schematically illustrates an amplitude adjusting routine to be executed by the controller 20 according to the seventeenth embodiment. The amplitude adjusting routine is repeatedly executed every predetermined cycle.

Specifically, when starting the amplitude adjusting routine, the controller 20 executes steps S90a, S92a, S94a, S96a, S98, and S100 illustrated in FIG. 41.

After the determination in step S100, the controller 20 reverses the polarity of the proportional gain Kp of the proportional integral feedback algorithm for determination of the amplitude Vm, and the polarity of the integral gain Ki thereof in step S102b, proceeding to step S104b.

In step S104b, the controller 20 computes the amplitude Vm of each of the command voltages Vuc1, Vvc1, and Vwc1 using the proportional gain Kp and the integral gain Ki of the proportional integral feedback algorithm for determination of the amplitude Vm. Specifically, in the proportional integral feedback algorithm, the amplitude Vm is expressed by the following equation:

$$Vm = Kp \times \Delta\Phi + Ki(\Sigma\Delta\Phi)$$

After completion of the process in step S104b, the controller 20 exits the amplitude adjusting routine.

The control system 11 according to the seventeenth embodiment is configured to:

increase the amplitude Vm of each of the command voltages Vuc1, Vvc1, and Vwc1 with delay in the zero crossing of the target phase current with respect to the zero crossing of the amount of change in the target phase current in the power running control mode;

reduce the amplitude Vm of each of the command voltages Vuc1, Vvc1, and Vwc1 with delay in the zero crossing of the target phase current with respect to the zero crossing of the amount of change in the target phase current in the regenerative control mode;

reduce the amplitude Vm of each of the command voltages Vuc1, Vvc1, and Vwc1 with leading in the zero crossing of the target phase current with respect to the zero crossing of the amount of change in the target phase current in the power running control mode; and increase the amplitude Vm of each of the command voltages Vuc1, Vvc1, and Vwc1 with leading in the zero crossing of the target phase current with respect to the zero crossing of the amount of change in the target phase current in the regenerative control mode.

This achieves the substantially same effects as the fourteenth embodiment.

Based on some different points of the control system according to the fifth embodiment as compared with that according to the first embodiment, the control systems according to the second to fourth embodiments and the seventh to eleventh embodiments can be modified.

Based on some different points of the control system according to the second embodiment as compared with that according to the first embodiment, the control systems according to the third to fourth embodiments and the sixth to eleventh embodiments can be modified.

Based on some different points of the control system according to the fourth embodiment as compared with that according to the first embodiment, the control systems according to the sixth to eleventh embodiments can be modified.

In the eleventh embodiment, in place of the line-to-line current I(n−1) at the start timing of the switching mode V0, a line-to-line current I(n) at the end timing of the switching mode V0 can be used.

In the fourteenth embodiment, the amplitude Vm of each of the command voltages Vuc1, Vvc1, and Vwc1 is adjusted to execute feedback control of the rotational speed of the rotor, but the present invention is not limited to the structure. Specifically, the angular rate of the electrical angular rate ω can be adjusted in place of the amplitude Vm, or each of the command voltages Vuc1, Vvc1, and Vwc can be adjusted.

In the sixth embodiment, the switching mode V0 and successive odd switching modes across the switching mode V0 are switched based on an actual value of a corresponding pair of the duty signals Du, Dv, and Dw. However, the switching mode V0 and successive odd switching modes across the switching mode V0 can be switched based on an electrical angular position of the rotor.

At least one of the command voltages Vuc1, Vvc1, and Vwc1 can be adjusted based on the zero crossing of a target line-to-line current and that of the amount of change in the target line-to-line current.

In the second to fourth embodiment, the ninth embodiment, and the like, the proportional integral feedback algorithm can be used to determine an operating parameter of each of the command voltages Vuc1, Vvc1, and Vwc1. However, a proportional-integral-derivative feedback control algorithm (PID algorithm) can be used to determine an operating parameter of each of the command voltages Vuc1, Vvc1, and Vwc1.

In each of the first to tenth embodiments, the polarity of a target line-to-line current can be detected as a plus or minus sign of the difference between a value of one of the phase currents and that of another one of the phase currents at a predetermined electrical angular position of the rotor.

In each of the first to seventeenth embodiments, the two-phase modulator 38 works to expand a period of time for which at least two phase windings have been short-circuited to a fixed potential, but the present invention is not limited to the structure. Specifically, the controller 20 can be configured to adjust each of the command voltages Vuc1, Vvc1, and Vwc1 as illustrated in FIGS. 11, 15, and/or 16 so as to forcibly expand the duration of the switching mode V0 when the switching mode V0 is started; this duration represents a minimum period of time required to detect the amount of change in a target line-to-line current with high accuracy.

An analog differentiator can be used to detect the amount of change in a target line-to-line current with high accuracy.

Based on some different points of the control system according to at least one of the fourth to eleventh embodiments as compared with that according to the first embodiment, the control systems according to the twelfth to seventeenth embodiments can be modified.

In the twelfth to seventeenth embodiments, the proportional integral feedback algorithm can be used to determine an operating parameter of each of the command voltages Vuc1, Vvc1, and Vwc1. However, a proportional-integral-derivative feedback control algorithm (PID algorithm) can be used to determine an operating parameter of each of the command voltages Vuc1, Vvc1, and Vwc1.

In each of the twelfth to seventeenth embodiments, the controller 20 executes the maximum torque control, but can execute an alternative control for the motor 10, such as the maximum efficiency control. For example, as illustrated in the ninth embodiment, the controller 20 can adjust:

the difference between the zero crossing of a target line-to-line current and that of the amount of change in the target line-to-line current to a predetermined target value unequal to zero, or the difference between the zero crossing of a target phase current and that of the amount of change in the target phase current to a predetermined target value unequal to zero.

During execution of the maximum efficiency control, the zero crossing of the amount of change in the target line-to-line current or target phase current is different from that of a corresponding induced voltage. For this reason, it is preferable that the target value be determined to be shifted from a value appropriate for the maximum efficiency control based on the difference between the zero crossing of the amount of change in the target line-to-line current or target phase current and a corresponding induced voltage. This makes it possible to properly execute the maximum efficiency control.

In each of the twelfth to seventeenth embodiments, the controller 20 identifies whether the control system 11 is operating in the power running control mode or the regenerative control mode based on:

the polarity of one phase current at a zero crossing of a line-to-line current based on the remaining two phase currents; or the polarity of a line-to-line current based on two phase currents at a zero crossing of the remaining one phase current.

The present invention however is not limited to the structure.

Specifically, the controller 20 can identify whether the control system 11 is operating in the power running control mode or the regenerative control mode based on:

the polarity of change in a line-to-line current in a predetermined electrical angular region of the rotor and the polarity of the remaining one phase current; or the polarity of change in a phase current in a predetermined electrical angular region of the rotor and the polarity of a line-to-line current based on the remaining two phase currents.

Figure 32:
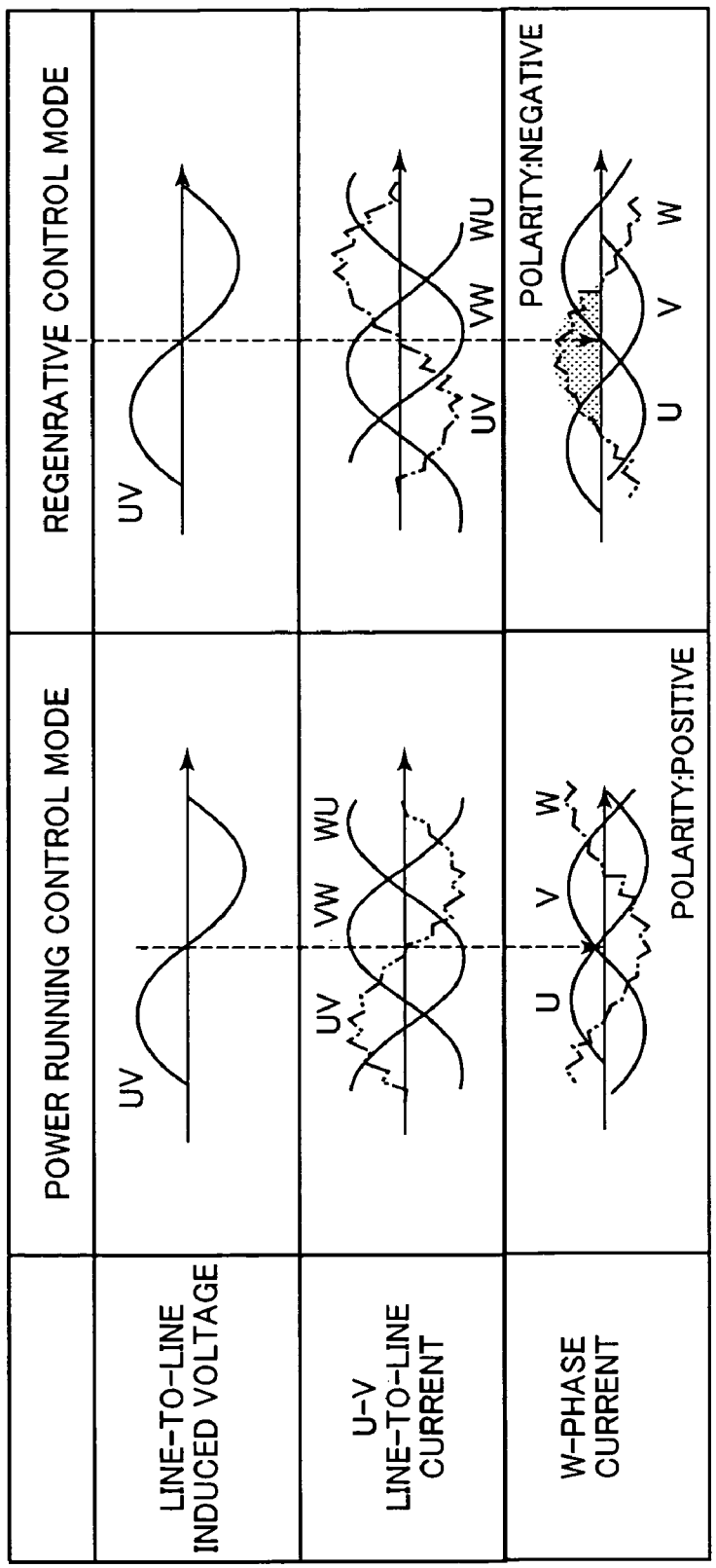
FIG. 32 is a view schematically illustrating how to identify whether the control system is operating in the power running control mode or the regenerative control mode according to the twelfth embodiment.

Specifically, as illustrated in FIG. 32, at or near a zero crossing of a line-to-line induced voltage, when the polarity of change in a line-to-line current is positive, and the polarity of the remaining one phase current is negative, the controller 20 can identify that the control system 11 is operating in the power running control mode.

In contrast, when the polarity of change in a line-to-line current is positive, and the polarity of the remaining one phase current is positive, the controller 20 can identify that the control system 11 is operating in the regenerative control mode.

To identify whether the control system 11 is running in the power running control mode or the regenerative control mode is not limited to the configuration set forth above.

Specifically, a current sensor connected with the controller 20 can be arranged to detect an input current to the inverter 12. For example, the controller 20 can identify that the control system 11 is running in the power running control mode when a current to be input to the controller 20 detected by the current sensor is directed toward the inverter 12.

Figure 44:
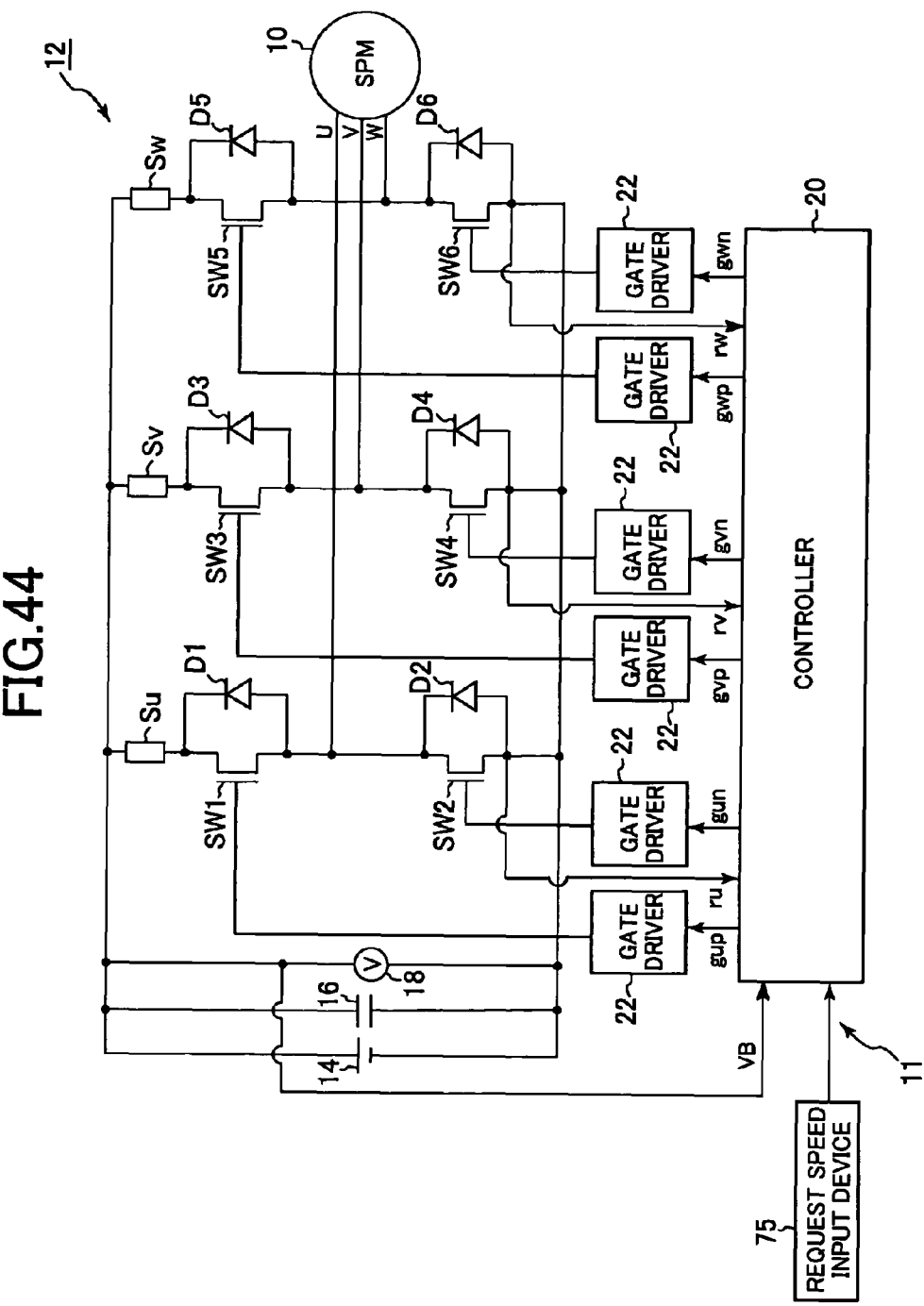
FIG. 44 is a circuit diagram of a control system for a motor according to one modification of each of the first to seventeenth embodiments of the present invention.

In place of the shunt resistors illustrated in FIG. 1 or FIG. 23, switching elements Su, Sv, and Sw can be arranged between the positive terminal of the battery 14 and the switching element SW1, between the positive terminal and the switching element SW3, and between the positive terminal and the switching element SW5, respectively (see FIG. 44).

The controller 20 can be arranged to measure an amount of voltage drop across the switching element Su, measure an amount of voltage drop across the switching element Sv, and measure an amount of voltage drop across the switching element Sw.

Note that, in this modification, it is preferable that the duty signals Du, Dv, and Dw be updated when the carrier signal becomes minimum. The duty signals Du, Dv, and Dw can be updated independently of the carrier signal.

Figure 45:
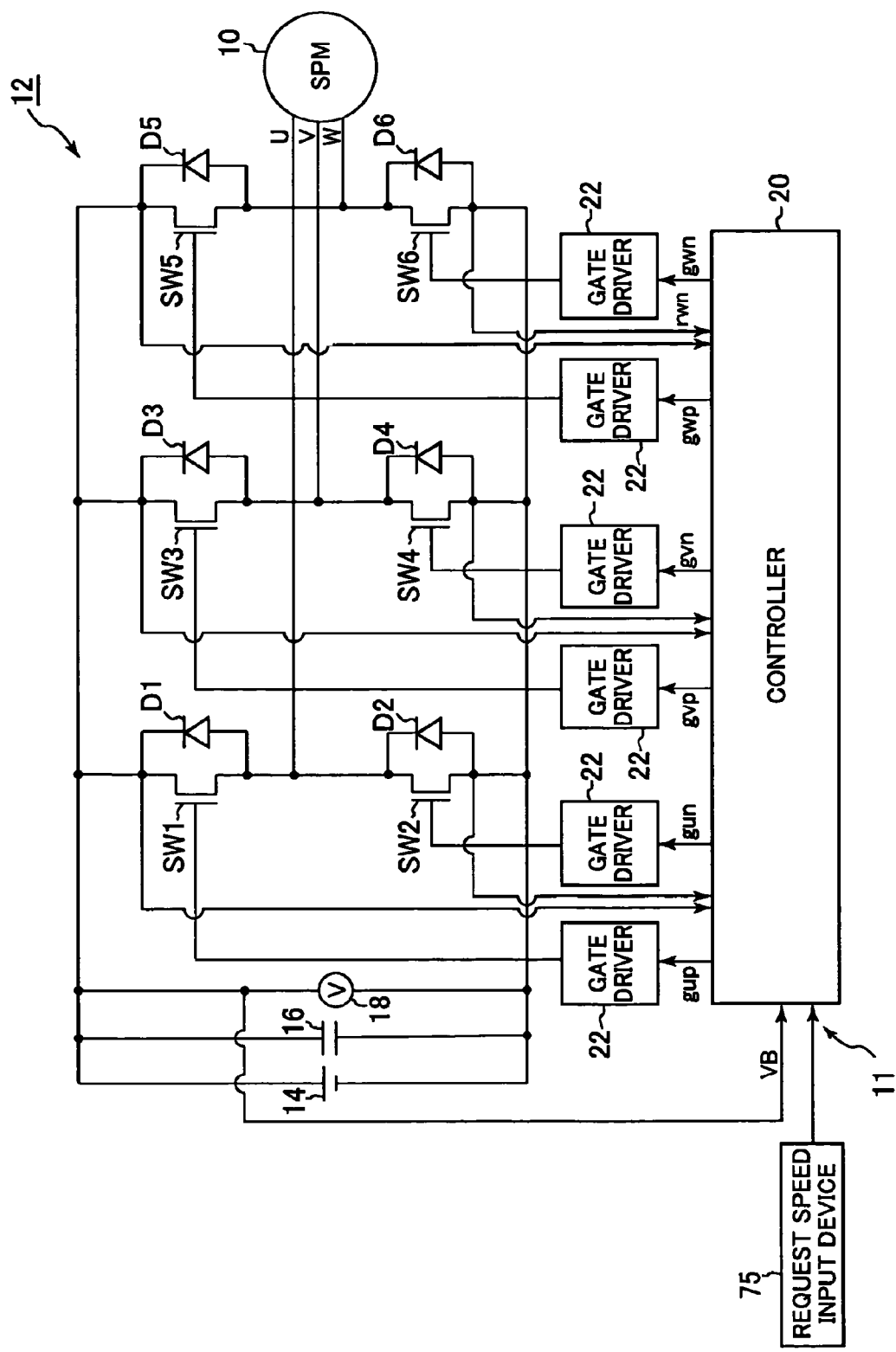
FIG. 45 is a circuit diagram of a control system for a motor according to another one modification of each of the first to seventeenth embodiments of the present invention.
Figure 46:
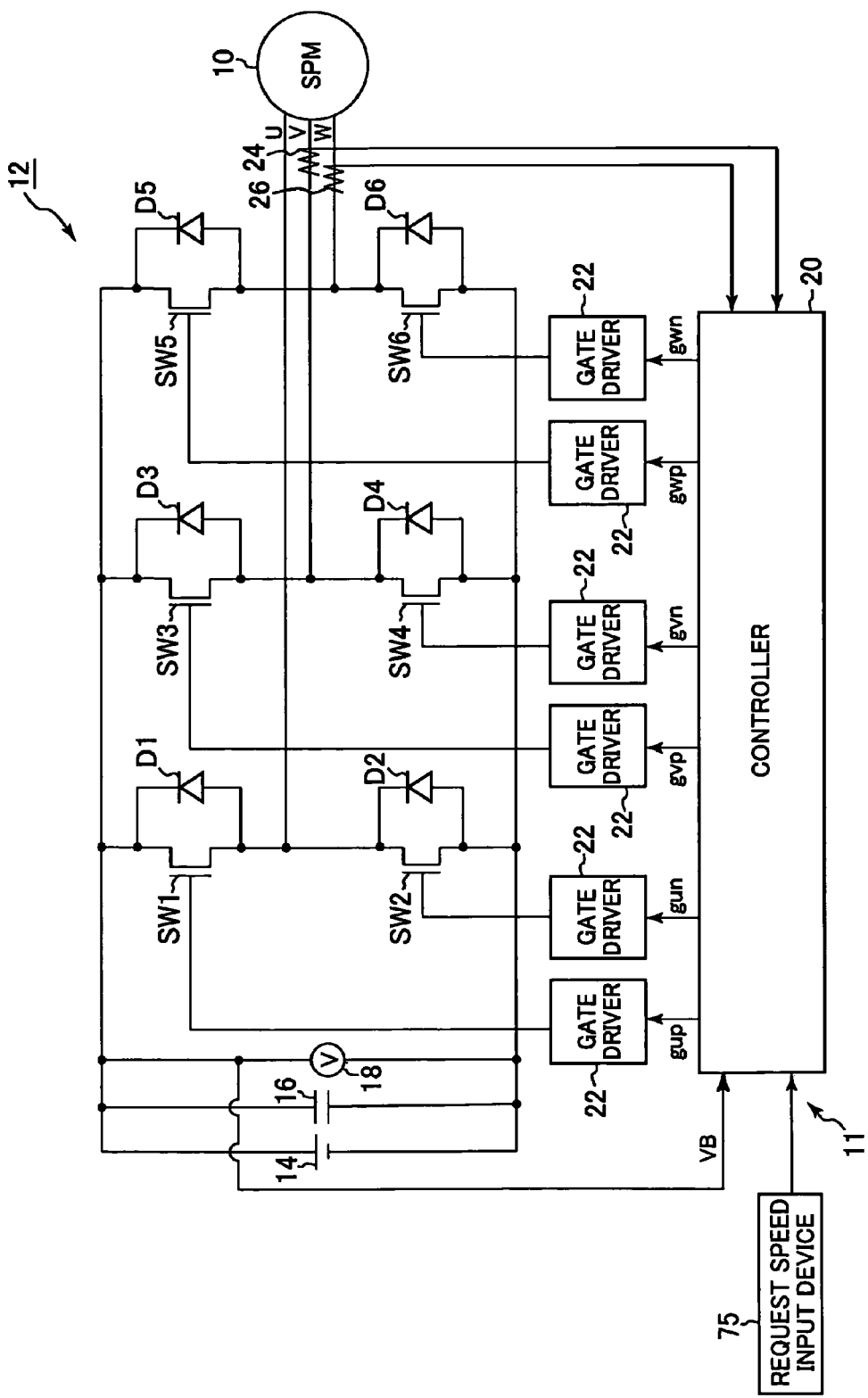
FIG. 46 is a circuit diagram of a control system for a motor according to a further modification of each of the first to seventeenth embodiments of the present invention.
Figure 47:
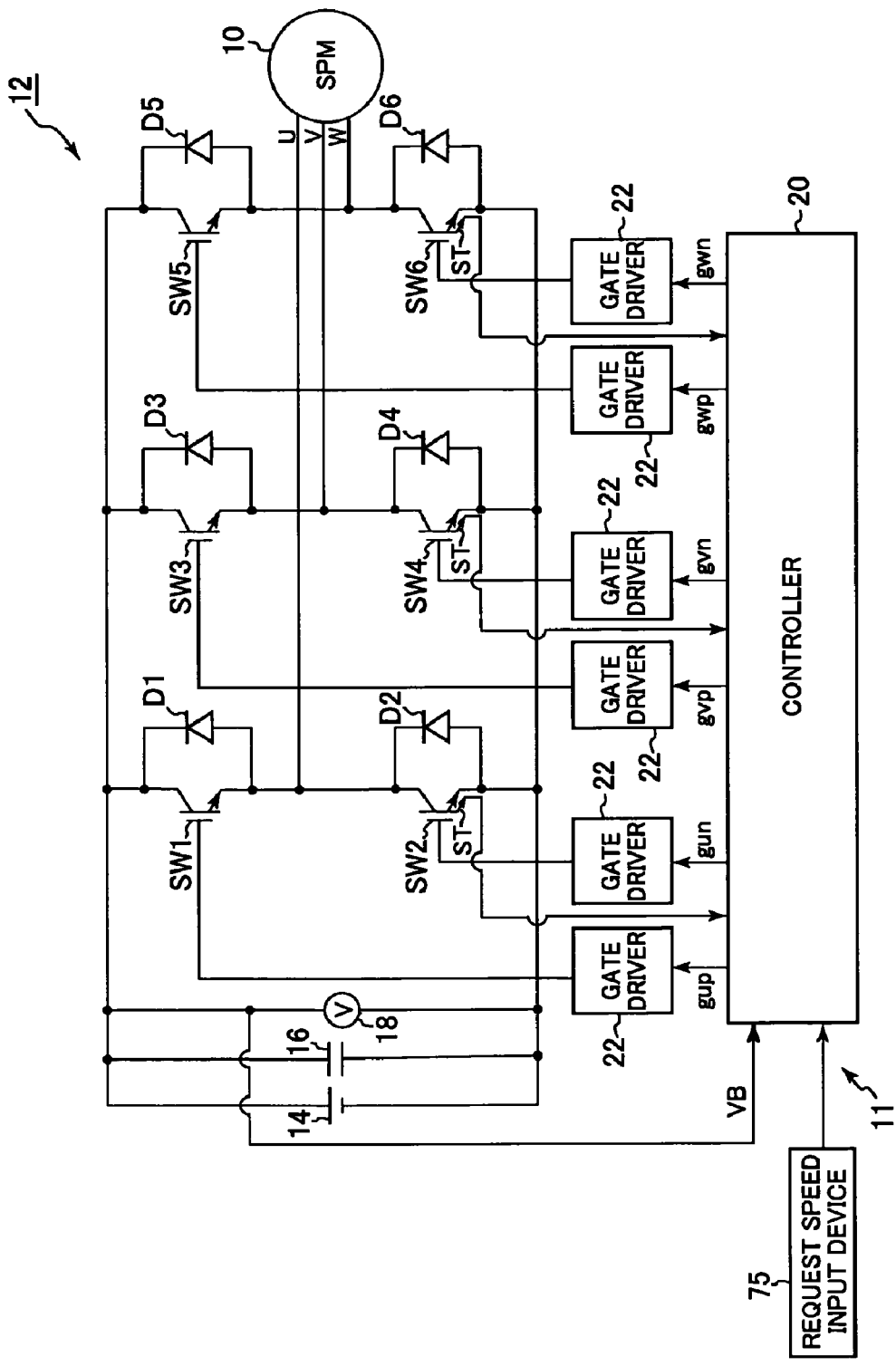
FIG. 47 is a circuit diagram of a control system for a motor according to a still further modification of each of the first to seventeenth embodiments of the present invention.

Referring to FIG. 45, in place of the shunt resistors illustrated in FIG. 1 or FIG. 23, the controller 20 can be connected across the switching elements SW2, SW4, and SW6. The controller 20 can measure an amount of voltage drop across the switching element SW2, an amount of voltage drop across the switching element SW4, and an amount of voltage drop across the switching element SW6.

In place of the shunt resistors illustrated in FIG. 1 or FIG. 23, the controller 20 can be connected across the switching elements SW1, SW3, and SW5. The controller 20 can measure an amount of voltage drop across the switching element SW1, an amount of voltage drop across the switching element SW3, and an amount of voltage drop across the switching element SW5.

In place of the shunt resistors illustrated in FIG. 1 or FIG. 23, the controller 20 can be connected across the switching elements SW1, SW2, SW3, SW4, SW5, and SW6. The controller 20 can measure an amount of voltage drop across each of the switching elements SW1 to SW6. This configuration allows the controller 20 to execute the operations described in the seventh and eighth embodiments.

As the switching elements SW1 to SW6, power MOS transistor can be used. In this case, an amount of voltage drop across input and output terminals (drain and source) of each of the power MOS transistors linearly increases with increase an amount of current to flow therethrough. For this reason, it is possible for the controller 20 to easily measure the current flowing through each of the power MOS transistors. When the power MOS transistors are used as the switching elements, the intrinsic diodes of the power MOS transistors can be used instead of the flywheel diodes.

As the switching elements SW1 to SW6, insulated gate bipolar transistors (IGBTs) can also be used. In this case, an amount of voltage drop across input and output terminals (collector and emitter) of each of the IGBTs and an amount of current to flow therethrough have a nonlinear relationship therebetween. However, in each of the first to tenth embodiments, because the polarity of a current flowing through each of the IGBTs or that of change in the current can be detected, using the IGBTs as the switching elements SW1 to SW6 have no problems.

In place of the shunt resistors illustrated in FIG. 1 or FIG. 23, a current sensor 24 can be arranged to allow measurement of a V-phase current flowing through the U-phase winding of the stator. Similarly, a current sensor 26 can be arranged to allow measurement of a W-phase current flowing through the W-phase winding of the stator. The first and second current sensors 24 and 26 are connected to the controller 20. In this case, a U-phase current can be calculated based on the V-phase current and W-phase current measured by the first and second current sensors 24 and 26, respectively.

As the switching elements SW2, SW4, and SW6, IGBTs each with a sense terminal ST can be used without using the shunt resistors illustrated in FIG. 1 or FIG. 23. The controller 20 is connected with the sense terminal ST of each of the switching elements SW2, SW4, and SW6 and operative to measure a current flowing between input and output terminals of each of the SW2, SW4, and SW6. Note that the sense terminal ST of an IGBT is a terminal designed to output a fine current in proportional to a current flowing between input and output terminals of the IGBT.

Similarly, as the switching elements SW1, SW3, and SW5, IGBTs each with a sense terminal ST can be used without using the shunt resistors illustrated in FIG. 1 or FIG. 23.

As the switching elements SW1 to SW6, IGBTs each with a sense terminal ST can be used without using the shunt resistors illustrated in FIG. 1 or FIG. 23. This configuration allows the controller 20 to execute the operations described in the seventh and eighth embodiments.

A single shunt resistor can be provided at least one of a positive input terminal and a negative input terminal of the inverter 12. For example, when a single shunt resistor is provided at the negative input terminal of the inverter 12, during the switching mode V2, it is possible to measure a W-phase current based on an amount of voltage drop across the single shut resistor. During the switching mode V1 temporally next to the switching mode V2, it is possible to measure the sum of a W-phase current and a V-phase current. A value of the W-phase current immediately after the switching from the switching mode V2 to the switching mode V1 is substantially equal to a value of the W-phase current measured during the switching mode V2. This can measure the value of the V-phase current during the switching mode V1; this allows a V-W line-to-line current to be measured.

The motor 10 can be installed in an in-vehicle cooking fan or an alternative device. In addition to various types motors, the control systems according to the present invention can be designed to control various types of rotary electric machines, such as power generators.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A control system for converting, via a switching circuit, a direct current voltage into an alternating current voltage to be applied to multiphase windings of a multiphase rotary machine to thereby control rotation of the multiphase rotary machine, the control system comprising:
   when at least first and second phase windings of the multiphase windings are short-circuited to a predetermined voltage, a first zero crossing detector configured to detect a zero crossing of an alternating line-to-line current in the multiphase rotary machine, the line-to-line phase current representing a difference between a first phase current flowing through the first phase winding and a second phase current flowing through the second phase winding based on the alternating current voltage;
   a second zero crossing detector configured to detect a zero crossing of an amount of change in the line-to-line current when the at least first and second phase windings of the multi-phase windings are short-circuited to the predetermined potential;
   a command voltage determiner configured to determine a command voltage value for the alternating current voltage to be applied to the multiphase windings based on the detected zero crossing of the line-to-line current and the detected zero crossing of the amount of change in the line-to-line current; and
   a driving unit configured to drive the switching circuit on and off based on the determined command voltage value to thereby modulate the direct current voltage to the alternating current Voltage to be applied to the multiphase windings:
   wherein the command voltage determiner is configured to adjust, to a target value, a temporal difference between the zero crossing of the line-to-line current and the zero crossing of the amount of change in the line-to-line current.

2. A control system according to claim 1, wherein the temporal difference between the zero crossing of the line-to-line current and the zero crossing of the amount of change in the line-to-line current is defined as a temporal difference between the zero crossing of the line-to-line current and the zero crossing of polarity inversion of the amount of change in the line-to-line current when the line-to-line current is in phase with the polarity inversion of the amount of change in the line-to-line current.

3. A control system according to claim 1, wherein the second zero crossing detector is configured to detect a plurality of the zero crossings of the amount of change in the line-to-line current, further comprising:
   a rotation speed calculator configured to calculate a rotation speed of the multiphase rotary electric machine based on a time interval between one of the zero crossings of the amount of change in the line-to-line current and another one thereof; and
   a target value determiner configured to determine the target value based on the calculated rotation speed of the multiphase rotary machine.

4. A control system according to claim 1, wherein the command voltage determiner is configured to adjust at least one of an amplitude, a phase, and an electrical angular rate of the command voltage value based on the temporal difference between the zero crossing of the line-to-line current and the zero crossing of the amount of change in the line-to-line current.

5. A control system according to claim 1, further comprising:
   a rotation speed calculator configured to calculate a rotation speed of the multiphase rotary electric machine based on a time interval between one of the zero crossings of the amount of change in the line-to-line current and another one thereof; and
   a feedback control unit configured to control the command voltage value so as to match the calculated rotation speed fed back from the rotation speed calculator with a request rotation speed for the rotary machine.

6. A control system according to claim 5, wherein the command voltage determiner comprises the feedback control unit and works to determine the command voltage value based on a difference between the calculated rotation speed and the request rotation speed.

7. A control system according to claim 1, further comprising:
   an expanding unit configured to change the command voltage value so as to expand a duration of the at least first and second phase windings being short-circuited,
   wherein the driving unit is configured to drive the switching circuit on and off to thereby modulate the direct current voltage to be matched with the changed command voltage value.

8. A control system according to claim 1, further comprising:
   a corrector configured to correct the command voltage value based on an amplitude of a current component created in at least one of the first and second phase currents, the current component having a frequency higher than an electrical angular rate of the rotation of the rotary machine.

9. A control system according to claim 1, wherein the second zero crossing detector is configured to execute the detection of the zero crossing based on at least one of:
   a difference between two different sampling values of the line-to-line current;
   a derivate of the line-to-line current; and
   a deviation between an integrated value of the line-to-line current over a predetermined time interval and a product of the predetermined time interval and a value of the line-to-line current at one of a start timing of the predetermined time interval and an end timing thereof.

10. A control system according to claim 1, wherein the switching circuit comprises multiphase higher switching elements connected with one ends of the multiphase windings, respectively, and multiphase lower switching elements connected in series with the multiphase higher switching elements, respectively, the one end of each of the multiphase windings being connected with a connecting point between one of the multiphase higher switching elements and a corresponding one of the multiphase lower switching elements, the switching circuit comprising a pair of higher and lower input terminals connected with a series connected pair of each of the multiphase higher switching elements and a corresponding one of the multiphase lower switching elements, the higher and lower input terminals of the switching circuit having higher and lower voltages, respectively, further comprising:
   a shunt resistor connected at least one of between each of the three-phase higher switching elements and the higher input terminal and between each of the three-phase lower switching elements and the lower input terminal, the first zero crossing detector being configured to:

measure an amount of voltage drop across the shunt resistor; and detect the zero crossing of the line-to-line current based on the measured amount of voltage drop across the shunt resistor, the second zero crossing detector being configured to:

measure the amount of voltage drop across the shunt resistor; and detect the zero crossing of the amount of change in the alternating line-to-line current based on the measured amount of voltage drop across the shunt resistor.

11. A control system according to claim 1, wherein the switching circuit comprises multiphase higher switching elements connected with one ends of the multiphase windings, respectively, and multiphase lower switching elements connected in series with the multiphase higher switching elements, respectively, the other end of each of the multiphase windings being connected with a connecting point between one of the multiphase higher switching elements and a corresponding one of the multiphase lower switching elements, the switching circuit comprising a pair of higher and lower input terminals connected with a series connected pair of each of the multiphase higher switching elements and a corresponding one of the multiphase lower switching elements, the higher and lower input terminals of the switching circuit having higher and lower voltages, respectively, the first zero crossing detector being configured to:

measure an amount of voltage drop across at least one of each of the multiphase higher switching elements and each of the multiphase lower switching elements; and detect the zero crossing of the line-to-line current based on the measured amount of voltage drop across at least one of each of the multiphase higher switching elements and each of the multiphase lower switching elements, the second zero crossing detector being configured to:

measure the amount of voltage drop across at least one of each of the multiphase higher switching elements and each of the multiphase lower switching elements; and detect the zero crossing of the amount of change in the alternating line-to-line current based on the measured amount of voltage drop across at least one of each of the multiphase higher switching elements and each of the multiphase lower switching elements.

12. A control system according to claim 1, wherein the rotary machine is a three-phase rotary machine with three-phase windings including the first and second phase windings, the first zero crossing detector is configured to detect the zero crossing of the line-to-line current when all of the three-phase windings are short-circuited to the predetermined voltage, and the second zero crossing detector is configured to detect the zero crossing of the amount of change in the line-to-line current when all of the three-phase windings are short-circuited to the predetermined voltage.

13. A control system according to claim 1, wherein the rotary machine is a three-phase rotary machine with three-phase windings including the first phase winding, the second phase winding, and a third phase winding, the first zero crossing detector is configured to detect the zero crossing of the line-to-line current during:

a first period for which all of the three-phase windings have been short-circuited to the predetermined voltage;

a second period for which any two of the three-phase windings have been short-circuited to the predetermined voltage, the second period being temporally just before the first period; and a third period for which any two of the three-phase windings have been short-circuited to the predetermined voltage, the third period being temporally just after the first period.

14. A control system according to claim 1, further comprising:

a control mode determiner configured to determine whether the control system is operating in any one of power running control mode for the rotary machine and regenerative control mode therefor, wherein the command voltage determiner is configured to determine the command voltage value for the alternating current voltage to be applied to the multiphase windings based on the detected zero crossing of the line-to-line current, the detected zero crossing of the amount of change in the line-to-line current, and the determination of the control mode determiner.

15. A control system for converting, via a switching circuit, a direct current voltage into an alternating current voltage to be applied to multiphase windings of a multiphase rotary machine to thereby control rotation of the multiphase rotary machine, the control system comprising:

when at least first and second phase windings of the multiphase windings are short-circuited to a predetermined voltage, a first zero crossing detector configured to detect a zero crossing of an alternating line-to-line current in the multiphase rotary machine, the line-to-line phase current representing a difference between a first phase current flowing through the first phase winding and a second phase current flowing through the second phase winding based on the alternating current voltage;

a second zero crossing detector configured to detect a zero crossing of an amount of change in the line-to-line current when the at least first and second phase windings of the multi-phase windings are short-circuited to the predetermined potential:

a command voltage determiner configured to determine a command voltage value for the alternating current voltage to be applied to the multiphase windings based on the detected zero crossing of the line-to-line current and the detected zero crossing of the amount of change in the line-to-line current; and a driving unit configured to drive the switching circuit on and off based on the determined command voltage value to thereby modulate the direct current voltage to the alternating current voltage to be applied to the multiphase windings;

wherein the rotary machine is a three-phase rotary machine with three-phase windings including the first phase winding, the second phase winding, and a third phase winding, the switching circuit comprises three-phase higher switching elements connected with one ends of the three-phase windings, respectively, and three-phase lower switching elements connected in series with the three-phase higher switching elements, respectively, the one end of each of the three-phase windings being connected with a connecting point between one of the three-phase higher switching elements and a corresponding one of the lower switching elements, the first zero crossing detector being configured to:

measure a current flowing each phase switching element of one of the three-phase higher switching elements and the three-phase lower switching elements;

detect the zero crossing of the line-to-line current based on the measured current; and switch, based on an amplitude of the command voltage value, a timing of the detection of the zero crossing between when only the first and second phase windings are short-circuited to the predetermined potential and when all of the first, second, and third phase windings are short-circuited to the predetermined potential, the second zero crossing detector being configured to:

measure the current flowing each phase switching element of one of the three-phase higher switching elements and the three-phase lower switching elements;

detect the zero crossing of the amount of change in the line-to-line current based on the measured current; and switch, based on the amplitude of the command voltage value, a timing of the detection of the zero crossing between when only the first and second phase windings are short-circuited to the predetermined potential and when all of the first, second, and third phase windings are short-circuited to the predetermined potential.

16. A control system for converting, via a switching circuit, a direct current voltage into an alternating current voltage to be applied to multiphase windings of a multiphase rotary machine to thereby control rotation of the multiphase rotary machine, the control system comprising:

when at least first and second phase windings of the multiphase windings are short-circuited to a predetermined voltage, a first zero crossing detector configured to detect a zero crossing of an alternating line-to-line current in the multiphase rotary machine, the line-to-line phase current representing a difference between a first phase current flowing through the first phase winding and a second phase current flowing through the second phase winding based on the alternating current voltage;

a second zero crossing detector configured to detect a zero crossing of an amount of change in the line-to-line current when the at least first and second phase windings of the multi-phase windings are short-circuited to the predetermined potential;

a command voltage determiner configured to determine a command voltage value for the alternating current voltage to he applied to the multiphase windings based on the detected zero crossing of the line-to-line current and the detected zero crossing of the amount of change the line-to-line current; and a driving unit configured to drive the switching circuit on and off based on the determined command voltage value to thereby modulate the direct current voltage to the alternating current voltage to be applied to the multiphase windings;

wherein the rotary machine is a three-phase rotary machine with three-phase windings including the first phase winding, the second phase winding, and a third phase winding, the switching circuit comprises three-phase higher switching elements connected with one ends of the three-phase windings, respectively, and three-phase lower switching elements connected in series with the three-phase higher switching elements, respectively, the other end of each of the three-phase windings being connected with a connecting point between one of the three-phase higher switching elements and a corresponding one of the lower switching elements, the first zero crossing detector being configured to:

measure a current flowing each phase switching element of each of the three-phase higher switching elements and the three-phase lower switching elements;

detect the zero crossing of the line-to-line current using any one of the measured current of each phase switching element of the three-phase higher switching elements and that of each phase switching element of the three-phase lower switching elements; and switch the use of any one of the measured current of each phase switching element of the three-phase higher switching elements and that of each phase switching element of the three-phase lower switching elements according to change in an electrical angular position of the rotation of the three-phase rotary machine, the second zero crossing detector being configured to:

measure the current flowing each phase switching element of each of the three-phase higher switching elements and the three-phase lower switching elements;

detect the zero crossing of the amount of change in the line-to-line current using any one of the measured current of each phase switching element of the three-phase higher switching elements and that of each phase switching element of the three-phase lower switching elements; and switch the use of any one of the measured current of each phase switching element of the three-phase higher switching elements and that of each phase switching element of the three-phase lower switching elements according to change in the electrical angular position of the rotation of the three-phase rotary machine.

17. A control system according to claim 16, wherein the command voltage value includes a first command voltage value of the alternating current voltage for the first phase winding, a second command voltage value of the alternating current voltage for the second phase winding, and a third command voltage value of the alternating current voltage for the third phase winding, and the switching circuit comprises a pair of higher and lower input terminals connected with a series connected pair of each of the three-phase higher switching elements and a corresponding one of the three-phase lower switching elements, the higher and lower input terminals of the switching circuit having higher and lower voltages, respectively, further comprising:

a two-phase modulator configured to two-phase modulate the first, second, and third command voltage values by matching any one of the first, second, and third command voltage values with any one of the higher and lower voltages while maintaining a difference in voltage among the first, second, and third command voltage values, a deviation in voltage between any one of the first, second, and third command voltage values and any one of the higher and lower voltages being minimum, wherein the driving unit is configured to individually drive the three-phase higher switching elements and three-phase lower switching elements on and off to thereby modulate the direct current voltage to be matched with the two-phase modulated first, second, and third command voltage values, and the two-phase modulator is configured to:

use the higher voltage of the higher input terminal when the first zero crossing detector and the second zero crossing detector use the measured current of each phase switching element of the three-phase higher switching elements; and use the lower voltage of the lower input terminal when the first zero crossing detector and the second zero crossing detector use the measured current of each phase switching element of the three-phase lower switching elements.

18. A control system for converting, via a switching circuit, a direct current voltage into an alternating current voltage to be applied to multiphase windings of a multiphase rotary machine to thereby control rotation of the multiphase rotary machine, the control system comprising:

when at least first and second phase windings of the multiphase windings are short-circuited to a predetermined voltage, a first zero crossing detector configured to detect a zero crossing of an alternating line-to-line current in the multiphase rotary machine, the line-to-line phase current representing a difference between a first phase current flowing through the first phase winding and a second phase current flowing through the second phase winding based on the alternating current voltage;

a second zero crossing detector configured to detect a zero crossing of an amount of change in the line-to-line current when at least first and second phase windings of the multi-phase windings are short-circuited to the predetermined potential;

a command voltage determiner configured to determine a command voltage value for the alternating current voltage to be applied to the multiphase windings based on the detected zero crossing of the line-to-line current and the detected zero crossing of the amount of change in the line-to-line current: and a driving unit configured to drive the switching circuit on and of based on the determined command voltage value to thereby modulate the direct current voltage to the alternating current voltage to be applied to the multiphase windings;

wherein the rotary machine is a three-phase rotary machine with three-phase windings including the first phase winding, the second phase winding, and a third phase winding, the switching circuit comprises three-phase higher switching elements connected with one ends of the three-phase windings, respectively, and three-phase lower switching elements connected in series with the three-phase higher switching elements, respectively, the one end of each of the three-phase windings being connected with a connecting point between one of the three-phase higher switching elements and a corresponding one of the lower switching elements, the switching circuit having first and second input terminals to which the direct current voltage is applied, further comprising:

a two-phase modulator configured to two-phase modulate the first, second, and third command voltage values by matching any one of the first, second, and third command voltage values with any one of higher and lower voltages at the first and second input terminals while maintaining a difference in voltage among the first, second, and third command voltage values, a deviation in voltage between any one of the first, second, and third command voltage values and any one of the higher and lower voltages being minimum, the driving unit working to individually drive the three-phase higher switching elements and three-phase lower switching elements on and off to thereby modulate the direct current voltage to be matched with the two-phase modulated first, second, and third command voltage values.

19. A control system for converting, via a switching circuit, a direct current voltage into an alternating current voltage to be applied to multiphase windings of a multiphase rotary machine to thereby control rotation of the multiphase rotary machine, the control system comprising:

when at least first and second phase windings of the multiphase windings are short-circuited to a predetermined voltage, a first zero crossing detector configured to detect a zero crossing of an alternating line-to-line current in the multiphase rotary machine, the line-to-line phase current representing a difference between a first, phase current flowing through the first phase winding and a second phase current flowing through the second phase winding based on the alternating current voltage;

a second zero crossing detector configured to detect a zero crossing of an amount of change in the line-to-line current when the at least first and second phase windings of the multi-phase windings are short-circuited to the predetermined potential;

a command voltage determiner configured to determine a command voltage value for the alternating current voltage to be applied to the multiphase windings based on the detected zero crossing of the line-to-line current and the detected zero crossing of the amount of change in the line-to-line current;

a driving unit configured to drive the switching circuit on and off based on the determined command voltage value to thereby modulate the direct current voltage to the alternating current voltage to he applied to the multiphase windings; and a control mode determiner configured to determine whether the control system is operating in any one of power running control mode for the rotary machine and regenerative control mode therefor, wherein the command voltage determiner is configured to determine the command voltage value for the alternating current voltage to be applied to the multiphase windings based on the detected zero crossing of the line-to-line current, the detected zero crossing of the amount of change in the line-to-line current, and the determination of the control mode determiner;

wherein the command voltage determiner is configured to:

adjust at least one of an amplitude, a phase, and an electrical angular rate of the command voltage value based on the temporal difference between the zero crossing of the line-to-line current and the zero crossing of the amount of change in the line-to-line current so as to match the temporal difference therebetween with a target value; and invert a direction of the adjustment of the at least one of the amplitude, phase, and electrical angular rate of the command voltage value between when it is determined that the control system is operating in the power running control mode and when it is determined that the control system is operating in the regenerative control mode.

20. A control system according to claim 19, wherein the command voltage determiner is configured to:

adjust the phase of the command voltage value based on the temporal difference between the zero crossing of the line-to-line current and the zero crossing of the amount of change in the line-to-line current so as to match the temporal difference therebetween with the target value;

advance the phase of the command voltage value with delay in the temporal difference with respect to the target value when it is determined that the control system is operating in the power running control mode; and delay the phase of the command voltage value with delay in the temporal difference with respect to the target value when it is determined that the control system is operating in the regenerative control mode.

21. A control system according to claim 19, wherein the command voltage determiner is configured to:

adjust the amplitude of the command voltage value based on the temporal difference between the zero crossing of the line-to-line current and the zero crossing of the amount of change in the line-to-line current so as to match the temporal difference therebetween with the target value;

increase the amplitude of the command voltage value with delay in the temporal difference with respect to the target value when it is determined that the control system is operating in the power running control mode; and reduce the phase of the command voltage value with delay in the temporal difference with respect to the target value when it is determined that the control system is operating in the regenerative control mode.

22. A control system according to claim 19, wherein the command voltage determiner is configured to:

adjust the electrical angular rate of the command voltage value based on the temporal difference between the zero crossing of the line-to-line current and the zero crossing of the amount of change in the line-to-line current so as to match the temporal difference therebetween with the target value;

increase the electrical angular rate of the command voltage value with delay in the temporal difference with respect to the target value when it is determined that the control system is operating in the power running control mode; and reduce the electrical angular rate of the command voltage value with delay in the temporal difference with respect to the target value when it is determined that the control system is operating in the regenerative control mode.

23. A control system according to claim 19, wherein the rotary machine is a three-phase rotary machine with three-phase windings including the first phase winding, the second phase winding, and a third phase winding, and the control mode determiner is configured to determine whether the control system is operating in any one of power running control mode for the rotary machine and regenerative control mode therefor based on a polarity of the amount of change in the line-to-line current and a polarity of a phase current flowing through the third phase winding based on the alternating current voltage.

24. A control system according to claim 23, wherein the control mode determiner is configured to determine whether the control system is operating in any one of power running control mode for the rotary machine and regenerative control mode therefor based on a polarity of the line-to-line current at the zero crossing of the amount of change in the line-to-line current and the polarity of the phase current flowing through the third phase winding based on the alternating current voltage.

* * * * *